United States Patent
Fujiwara et al.

(10) Patent No.: US 8,716,157 B2
(45) Date of Patent: *May 6, 2014

(54) OPTICAL GLASS, GLASS MATERIAL FOR PRESS MOLDING, AND OPTICAL ELEMENT

(75) Inventors: Yasuhiro Fujiwara, Shinjuku-ku (JP); Yoshio Nojima, Shizuoka (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,696

(22) Filed: Feb. 23, 2012

(65) Prior Publication Data

US 2012/0238433 A1    Sep. 20, 2012

(30) Foreign Application Priority Data

Feb. 23, 2011   (JP) .................................. 2011-037349

(51) Int. Cl.
C03C 3/21 (2006.01)
C03C 3/16 (2006.01)
C03C 3/19 (2006.01)
C03B 5/027 (2006.01)

(52) U.S. Cl.
USPC .......... 501/46; 501/45; 501/47; 65/64; 65/66; 65/61

(58) Field of Classification Search
USPC ......... 501/45, 46, 47, 901, 903; 65/61, 64, 66
See application file for complete search history.

(56) References Cited

U.S. PATENT DOCUMENTS

| | | | |
|---|---|---|---|
| 7,309,670 B2 * | 12/2007 | Fujiwara et al. | 501/46 |
| 7,531,474 B2 * | 5/2009 | Shiraishi | 501/46 |
| 7,553,785 B2 * | 6/2009 | Ritter et al. | 501/46 |
| 7,638,448 B2 * | 12/2009 | Wolff et al. | 501/45 |
| 8,207,074 B2 * | 6/2012 | Kitaoka | 501/45 |
| 8,389,428 B2 * | 3/2013 | Wada et al. | 501/48 |
| 2005/0192174 A1 * | 9/2005 | Yamamoto et al. | 501/45 |
| 2010/0273633 A1 * | 10/2010 | Kitaoka | 501/46 |
| 2011/0278622 A1 * | 11/2011 | Wada et al. | 257/98 |
| 2012/0142516 A1 * | 6/2012 | Fujiwara | 501/46 |
| 2012/0272684 A1 * | 11/2012 | Fujiwara | 65/66 |

FOREIGN PATENT DOCUMENTS

| | | |
|---|---|---|
| EP | 1 493 720 A1 | 1/2005 |
| EP | 2 497 756 A1 | 9/2012 |
| JP | 2006-111499 A | 4/2006 |
| JP | 2009132610 A * | 6/2009 |
| JP | 2010275182 A | 12/2010 |
| WO | WO 2010084922 A1 * | 7/2010 |
| WO | WO 2010084925 A1 * | 7/2010 |

OTHER PUBLICATIONS

International Search Report and Written Opinion corresponding to PCT Application No. PCT/JP2012/053962, dated Apr. 24, 2012.
International Preliminary Report on Patentablility issued in corresponding PCT Application No. PCT/JP2012/053962 dated Apr. 24, 2012.
Office Action issued in corresponding Japanese Patent Application No. 2011-037349 dated Feb. 4, 2014.
Extended European Search Report issued in corresponding European Patent Application No. 12749495.3 dated Dec. 11, 2013.

* cited by examiner

*Primary Examiner* — Karl Group
*Assistant Examiner* — Elizabeth A Bolden
(74) *Attorney, Agent, or Firm* — Sughrue Mion, PLLC

(57) ABSTRACT

An optical glass in the form of an oxide glass, characterized by comprising, denoted as cation percentages:
$P^{5+}$ 14 to 36%;
$Bi^{3+}$ 12 to 34%;
$Nb^{5+}$ 12 to 34%;
$Ti^{4+}$ 5 to 20%; and
$W^{6+}$ 0 to 22%;
wherein the total content of $Bi^{3+}$, $Nb^{5+}$, $Ti^{4+}$, and $W^{6+}$ is equal to or greater than 50%; and in that the Knoop hardness is equal to or higher than 370, the refractive index nd is equal to or higher than 2.02, and the Abbé number vd is equal to or lower than 19.0. A glass material for press molding and an optical element comprised of this optical glass. A method for manufacturing a glass material for press molding comprising the step of mechanically processing this optical glass.

10 Claims, 2 Drawing Sheets

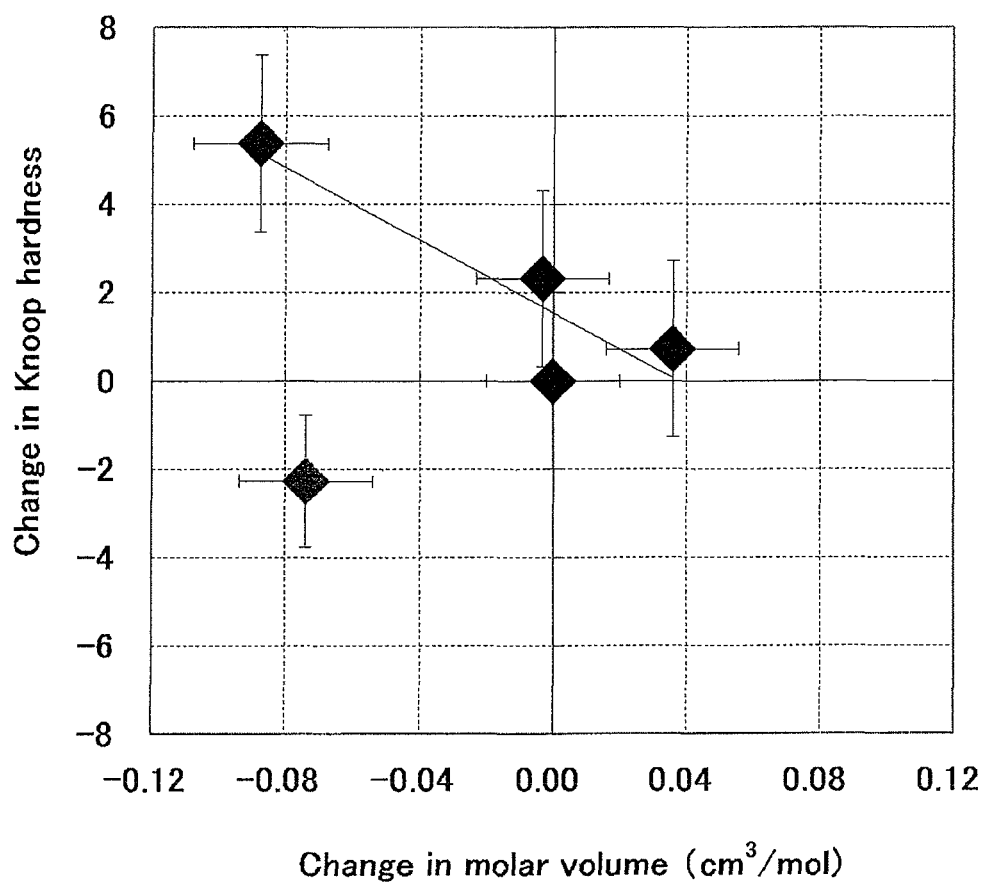
Fig. 1 Relation between molar volume and Knooop hardness (Network-forming components)

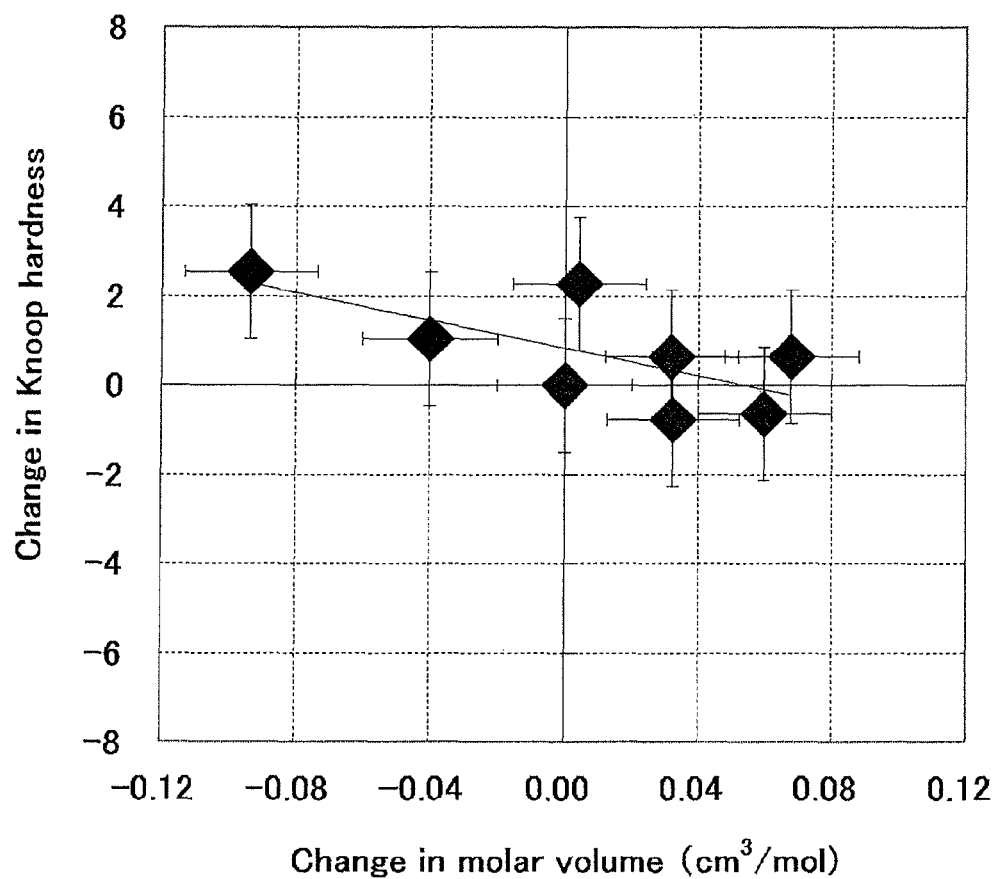
Fig. 2 Relation between molar volume and Knoop hardness (Modifing components)

OPTICAL GLASS, GLASS MATERIAL FOR PRESS MOLDING, AND OPTICAL ELEMENT

CROSS-REFERENCE TO RELATED PATENT APPLICATIONS

The present invention claims priority under Japanese Patent Application 2011-037349 filed on Feb. 23, 2011, the entire contents of which are hereby incorporated by reference.

TECHNICAL FIELD

The present invention relates to an optical glass, a glass material for press molding and to an optical element.

BACKGROUND ART

As image pickup devices have grown more compact in recent years, the demand for lenses made of high refractive index, high dispersion glasses has increased. High refractive index, high dispersion optical glasses based on the phosphate compositions disclosed in Japanese Unexamined Patent Publication (KOKAI) Nos. 2006-111499 (Patent Document 1) and Japanese Unexamined Patent Publication (KOKAI) No. 2007-15904 (Patent Document 2) are being employed as such lens materials.

SUMMARY OF THE INVENTION

Ultra high refractive index, high dispersion glasses with a refractive index nd of 2.02 or higher and an Abbé number of 19 or lower are effective for providing high zoom ratio, wide-angle lenses.

In addition, the optical characteristics that are demanded by camera designers, users, and the like, such as refractive index characteristics and transmittance characteristics are examples of the characteristics that are demanded of optical glasses. To manufacture optical glass with high productivity in the form of industrial products, it is essential that the mechanical characteristics determining the resistance to scratching during conveyance of the glass in the manufacturing process be increased to a certain level.

For example, when forming the optically functional surfaces of an optical element by polishing, the mechanical steps of cutting and grinding are used to remove the glass surface while imparting elastic or plastic distortion, generating cracks, or the like. Next, a polishing step or etching step that removes a small portion of the surface is used to form a smooth optically functional surface.

When the optical glass lacks adequate mechanical strength, excessive scoring of the surface occurs during the cutting and grinding steps, and scratches that cannot be removed by the polishing step end up remaining on the optical surface. In polishing steps that remove relatively little of the surface and ultrasonic cleaning steps that clean the glass, due to the softness of the glass, the possibility of scoring due to slight mechanical effects such as the tumbling of coarse abrasive particles and ultrasonic cavitation being imparted to the lens surface increases. For these reasons, it is necessary to increase the mechanical strength of glass that is subjected to a polishing step.

When forming the optically functional surface by precision press molding or the like, similar improvement in mechanical strength is required. When the molding precursor (preform) that is employed in precision press molding is prepared by polishing, scoring of the preform occurs for the same reasons as in lenses fabricated by polishing, and some or all of the scoring remains on the optically functional surface of the lens after precision press molding.

When the preform is molded by dripping molten glass or the like without polishing the preform, the step of polishing the preform can be omitted. However, in the course of cleaning the preform and conveying it to and positioning it within the pressing mold, the number of steps in which the surface of the preform comes into contact with a cleaning jig, conveying apparatus, positioning apparatus, and the like increases. As a result, there is a high possibility of the preform surface being physically scored. When a preform that has been scored in this manner is employed in precision press molding, part or all of the scoring remains on the optically functional surface of the optical element.

In the course of gradually cooling, cleaning, centering and edging, forming films on, and inspecting glass in which an optically functional surface has been molded to obtain a lens product without a polishing step or precision press molding step, contact with the apparatus used in these steps sometimes scores the optically functional surface.

Such problems have become pronounced as the refractive index and dispersion of optical glasses have increased.

The present invention has for its object to provide an optical glass having mechanical characteristics suited to the manufacturing of high-quality optical elements while having the high refractive index and high dispersion characteristic of a refractive index nd of 2.02 or higher and an Abbé number vd of 19.0 or lower that solves the above problems. A further object of the present invention is to provide a glass for press molding and an optical element comprised of this optical glass. A still further object of the present invention is to provide a method for manufacturing a glass material for press molding from this optical glass.

The present invention provides the following means of solving the problems set forth above.

[1]

An optical glass in the form of an oxide glass, characterized by comprising, denoted as cation percentages:

| | |
|---|---|
| $P^{5+}$ | 14 to 36%; |
| $Bi^{3+}$ | 12 to 34%; |
| $Nb^{5+}$ | 12 to 34%; |
| $Ti^{4+}$ | 5 to 20%; and |
| $W^{6+}$ | 0 to 22%; | wherein the total content of $Bi^{3+}$, $Nb^{5+}$, $Ti^{4+}$, and $W^{6+}$ is 50% or greater; and in that the Knoop hardness is 370 or higher, the refractive index nd is 2.02 or higher, and the Abbé number vd is 19.0 or lower.

[2]

The optical glass according to [1], wherein the total content of $K^+$ and $Ba^{2+}$ is 16% or lower.

[3]

The optical glass according to [1] or [2], wherein the total content of $K^+$, $Ba^2$, and $B^{3+}$ is 22% or lower.

[4]

The optical glass according to any one of [1] to [3], wherein the cation ratio ($Bi^{3+}/(Bi^{3+}+Nb^{5+}+Ti^{4+}+W^{6+})$) of the content of $Bi^{3+}$ to the total content of $Bi^{3+}$, $Nb^{5+}$, $Ti^{4+}$, and $W^{6+}$ ($Bi^{3+}+Nb^{5+}+Ti^{4+}+W^{6+}$) is 0.6 or lower.

[5]

A glass material for press molding comprised of the optical glass according to any one of [1] to [4].

[6]
An optical element comprised of the optical glass according to any one of [1] to [4].

[7]
A method for manufacturing a glass material for press molding comprising the step of mechanically processing the optical glass according to any one of [1] to [4].

[8]
A method for manufacturing an optical element comprising the step of press molding the glass material for press molding according to [5].

[9]
A method for manufacturing an optical element comprising the step of mechanical processing the optical glass according to any one of [1] to [4].

The present invention provides an optical glass having mechanical characteristics suited to the manufacturing of high-quality optical elements while having a high refractive index and high dispersion characteristic in the form of a refractive index nd of 2.02 or higher and an Abbé number vd of 19.0 or lower. The present invention further provides a glass material for press molding and an optical element comprised of the optical glass.

BRIEF DESCRIPTION OF THE DRAWINGS

FIG. 1 is a graph showing the change in molar volume and Knoop hardness with 1 cation % substitution of the cation components of Ti, Nb, W, P, and Bi based on P.

FIG. 2 is a graph showing the change in molar volume and Knoop hardness with 1 cation % substitution of the cation components of Li, Na, K, B, Mg, Ca, Sr, and Ba based on Mg.

MODES OF CARRYING OUT THE INVENTION

The present inventors conducted extensive research into the problems set forth above and learned the following.

When the glass components that are essential for achieving a high refractive index optical glass are categorized from the perspective of the characteristics they impart to the glass, they can be sorted into the categories of high refractive index, high dispersion-imparting components that impart desired optical characteristics to the glass; glass network-forming components that promote formation of the glass network but lower the refractive index; and modifying components that enhance the meltability of the glass but somewhat lower the refractive index.

In a high refractive index, high dispersion glass, it is necessary to incorporate large quantities of high refractive index, high dispersion glass components such as Bi, Ti, W, and Nb. In particular, there has recently been a tendency to incorporate a large content of Bi, which inhibits crystallization of the glass, while imparting a high refractive index and high dispersion. Additionally, there has also been a tendency to reduce components that strengthen the glass network, such as P, B, and Si. These changes in glass components have led to a decrease in the mechanical strength of the glass that cannot be ignored.

In the atomic structure of glass, the elements Bi and P are present as cations. Multiple anions in the form of oxygen ions and fluorine ions of corresponding valence are coordinated with them. Some of the ion groups are crosslinked by ion groups of opposite charge. Alternatively, this can be thought of as specific ion groups terminating bonds. Small amounts of ion groups such as $OH^-$, $CO_3^-$, and $SO_4^{2-}$ and $H_2O$ are thought to also be present in the structure. However, the main structure is thought to be comprised of bonds between cations and anions. Accordingly, the structural unit of the glass structure can be thought of as sets of chemical bonds such as Bi—O, Bi—F, and Bi—($SO_4$). Accordingly, the bonding state within the glass becomes the factor that determines the mechanical strength of the glass. The substitution of cations $M_1$ having a valence of $n_1$ with cations $M_2$ having a valence of $n_2$ reduces the density of average $n_1$ member $M_1$-O bonds and increases average $n_2$ member $M_2$-O bonds in the glass if the glass is an oxide.

The present inventors conceived the model of a glass structure in the form of a bismuth-phosphoric acid glass of high refractive index and high dispersion, comprised of a random network structure in which octahedrons of $MO_6$ (M=Bi, Nb, W, Ti) and tetrahedrons of $MO_4$ (M=P, B, Si, and the like) are primarily bonded at their vertices, with alkali metal components or alkaline earth metal components being bonded to the unbonded oxygen. They thus paid careful attention to the correlation between the hardness and the molar volume of the glass, and discovered how to increase the hardness of the glass using the molar volume of the glass as an index.

For example, among glass network-forming components, by replacing P, which occupies a large volume, with B, which has a smaller volume; by replacing K, which has a large ionic radius among alkali metal components, with Na and Li, which have smaller ionic radii; and by replacing W, which has a large ionic radius among high refractive index components, with Ti, which has a smaller ionic radius, the hardness was increased as the molar volume decreased. Further, the hardness was increased by replacing Na, which is an alkali metal component, with B, which is a network-forming component, or with a high refractive index network-forming component such as Nb.

It was also discovered that when Bi was added in a high refractive index, high dispersion glass, there was a tendency for the hardness to decrease despite a reduction in the molar volume. That tendency can be described as follows. In the course of the formation of Bi—O bonds in an oxide glass by incorporating Bi, the relativistic effect of Bi, a heavy element, causes the energy level of the Bi 6 $s^2$ electron pair to rise, isolating the Bi 6 $s^2$ electron pair on the nucleus and weakening mixing of the Bi—O bonding orbital consisting primarily of the p orbital (see K. Balasubramanian, "Relativistic Effects in Chemistry Part A", John Wiley & Sons, New York, 1997 (Nonpatent Reference 1)). As a result, the distance between atoms in a specified direction increases, the bond angle increases, and the like, distorting the polyhedral structure of BiO and creating a so-called stereochemically active chemical state. Due to such peculiar characteristics of heavy elements, in the course of introducing Bi into the glass, due to the deforming effect of the BiO polyhedron, the number of elements contained per unit volume increases and the molar volume decreases. Simultaneously, the increased distance between atoms accompanying the presence of isolated atom pairs severs bonds, which can be thought of as forming bonds that require little energy, that is, that tend not to contribute to increasing mechanical strength.

For these reasons, the following causal relationships were discovered between the glass components and hardness.

Ti, Nb, W, P and Bi, which are thought to form a cation oxide polyhedron serving as the skeleton of high refractive index, high dispersion bismuth-phosphoric acid glasses, are considered to be network-forming components, and FIG. 1 shows the change in molar volume and Knoop hardness when 1 cation % of these cations are substituted based on P.

Li, Na, K, B, Mg, Ca, Sr, and Ba are thought to function as modifying components in the above glass skeleton, and FIG.

2 shows the change in molar volume and Knoop hardness when 1 cation % of these components was substituted based on Mg.

From FIGS. 1 and 2, it will be understood that the hardness enhancing effect tends to be Ti≅>Nb>W>>Bi, Nb>Na, Li>Na>K, Na≅Ba≅B, Ca≅Sr>Mg>Ba, B>P, P>Bi. The symbol "≅" means "nearly or equal".

Here, when classifying the hardness of glass materials, there are four types: the indentation depth, the scratching depth, the abrasive grinding hardness, and the abrasion hardness. The Knoop hardness, in the same manner as the Vickers hardness, is an index of the indentation hardness of a glass. In all glasses, such as in relatively hard, fragile materials such as optical glasses, the cracks of depressions are considered to be small and the variation in test results is considered to be low. Thus, in the present invention, the hardness of the glass was evaluated by the Knoop hardness.

The optical glass of the present invention, devised based on the above knowledge, is an oxide glass characterized by comprising, denoted as cation percentages:

| | |
|---|---|
| $P^{5+}$ | 14 to 36%; |
| $Bi^{3+}$ | 12 to 34%; |
| $Nb^{5+}$ | 12 to 34%; |
| $Ti^{4+}$ | 5 to 20%; and |
| $W^{6+}$ | 0 to 22%; | wherein the total content of $Bi^{3+}$, $Nb^{5+}$, $Ti^{4+}$, and $W^{6+}$ is 50% or greater; and in that the Knoop hardness is 370 or higher, the refractive index nd is 2.02 or higher, and the Abbé number vd is 19.0 or lower.

The optical glass of the present invention, while having an ultra high refractive index and high dispersion characteristic in the form of a refractive index nd of 2.02 or higher and an Abbé number of 19.0 or lower, affords the advantage of having mechanical strength suited to the manufacturing of glass products.

The unit of Knoop hardness is MPa. In the technical field to which the present invention belongs, the convention is to omit the unit of Knoop hardness. Thus, the unit of Knoop hardness has been omitted in the present invention.

[The Glass Composition]

The optical glass of the present invention is basically an oxide glass the main anionic component of which is $O^{2-}$. Ninety to 100 anion percent can be thought of as a yardstick for the $O^{2-}$ content. When the $O^{2-}$ content is within this range, other anionic components can be incorporated, such as $F^-$, $Cl^-$, $Br^-$, $I^-$, $S^{2-}$, $Se^{2-}$, $N^{3-}$, $NO_3^-$, and $SO_4^{2-}$. In that case, the total content of $F^-$, $Cl^-$, $Br^-$, $I^-$, $S^{2-}$, $Se^{2-}$, $N^{3-}$, $NO_3^-$, and $SO_4^{2-}$ is, for example, 0 to 10 anion %. The $O^{2-}$ content can exceed 95 anion %, exceed 98 anion %, or exceed 99 anion %. It can be 99.5 anion percent or higher, even 100 anion %.

The cation components of the optical glass of the present invention will be described next. Unless specifically stated otherwise, the contents and total contents of cation components given below denote cation percentages.

$P^{5+}$ is a glass network-forming component. Within an oxide glass, it forms highly covalent P—O bonds, having the effects of contributing to diversification of the bond distances between ions and thermally stabilizing the state of the glass. It is a component that maintains the mechanical strength of the glass by forming crosslinking bonds with Ti, Nb, W and the like through oxygen and the like. Since it tends to produce a glass structure that is less dense than that produced by Ti, Nb, and W, it serves to lower the hardness relative to Ti, Nb, and W. When the content of $P^{5+}$ is less than 14%, the above effects become difficult to achieve. When the $P^{5+}$ content exceeds 36%, the refractive index drops, and there is a tendency for crystallization of the glass to increase. Thus, the $P^{5+}$ content is specified as 14 to 36%. In terms of achieving the above effects through the incorporation of $P^{5+}$, the lower limit of the content of $P^{5+}$ is desirably 18%, preferably 20%, more preferably 22%, still more preferably 24%, and yet still more preferably, 26%. In terms of maintaining a high refractive index, the upper limit of the content of $P^{5+}$ is desirably 31%, preferably 30%, more preferably 29%, and still more preferably, 28%.

$P^{5+}$ also has the effects of improving the thermal stability of the glass and thus lowering the liquidus temperature, increasing the viscosity at the liquidus temperature, and facilitating the production of high-quality optical glass.

$Bi^{3+}$ is an essential component for obtaining a high refractive index, high dispersion glass. The incorporation of a suitable quantity functions to improve the thermal stability of the glass. It also has the effect of changing the polarity of the glass. However, Bi—O bonds form within the glass. Deformation of the oxygen polyhedron increases the ion packing rate, but the presence of the inner shell electrons of Bi itself increases the polarizability of Bi, weakening the Bi—O bonds within the glass. Thus, Bi has the greatest hardness-reducing effect among high refractive index components. When the content of $Bi^{3+}$ is less than 12%, it becomes difficult to achieve the above $Bi^{3+}$ incorporation effects. When the content of $Bi^{3+}$ exceeds 34%, thermal stability diminishes, the liquidus temperature rises, and the viscosity at the liquidus temperature tends to drop, which are undesirable in terms of obtaining a high-quality optical glass. Further, the glass develops a yellow or brown coloration, and the wavelengths of the absorption edges lengthen in the spectral transmittance characteristics. Accordingly, the $Bi^{3+}$ content is specified as 12 to 34%. In terms of achieving the effects of $Bi^{3+}$ incorporation, the lower limit of the $Bi^{3+}$ content is desirably 14%, preferably 16%, more preferably 18%, still more preferably 20%, yet still more preferably 22%, even more preferably 23%, and yet even more preferably, 24%. In terms of maintaining the thermal stability of the glass, the upper limit of the $Bi^{3+}$ content is desirably 32%, preferably 30%, more preferably 29%, still more preferably 28%, yet still more preferably 27%, and even more preferably, 26%.

$Nb^{5+}$ is a component that functions to impart a high refractive index and high dispersion to the glass. After $Ti^{4+}$, it is a component that forms strong Nb—O bonds that increase the strength of the glass. However, it also somewhat lowers the ion packing rate. Thus, the glass strength-enhancing effect achieved by incorporating $Nb^{5+}$ is inferior to that of $Ti^{4+}$. When in the co-presence of $Bi^{3+}$ and $Ti^{4+}$, it functions to maintain the thermal stability of the glass. It also functions to enhance the chemical durability of the glass and increase the mechanical strength of the glass. When the content of $Nb^{5+}$ is less than 12%, it becomes difficult to adequately achieve the effects of $Nb^{5+}$ incorporation. When the content of $Nb^{5+}$ exceeds 34%, the thermal stability of the glass diminishes, the liquidus temperature rises sharply, and the viscosity at the liquidus temperature drops, making it difficult to produce a high-quality optical glass. Although not to the extent of $Bi^{3+}$, $Ti^{4+}$, and $W^{6+}$, the incorporation of $Nb^{5+}$ causes the wavelengths of the absorption edges to lengthen somewhat in the spectral transmittance characteristics. In terms of achieving the incorporation effect of $Nb^{5+}$, the lower limit of the content of $Nb^{5+}$ is desirably 14%, preferably 16%, more preferably 17%, still more preferably 18%, and yet still more preferably, 19%. In terms of maintaining the thermal stability of the glass, the upper limit of the $Nb^{5+}$ content is desirably 30%, preferably 27%, more preferably 25%, still more preferably 24%, yet still more preferably 23%, and even more preferably, 22%.

Along with $Bi^{3+}$, $Nb^{5+}$, and $W^{3+}$, $Ti^{4+}$ is a component that imparts a high refractive index and high dispersion. However, since it raises the ion packing rate while forming strong Ti—O bonds, it functions the most strongly to strengthen the glass among the components that impart a high refractive index and high dispersion. In addition to functioning to enhance the chemical durability of the glass, in the co-presence of $Bi^{3+}$ and $Nb^{5+}$, it functions to increase the thermal stability of the glass. However, the incorporation of an excessive quantity raises the melting temperature, thereby compromising meltability, and causes coloration of the glass. When the content of $Ti^{4+}$ is less than 5%, it becomes difficult to adequately achieve the effects of $Ti^{4+}$ incorporation. When the content of $Ti^{4+}$ exceeds 20%, the thermal stability of the glass diminishes, the tendency to crystallize increases, the liquidus temperature rises sharply, and the viscosity at the liquidus temperature drops, making it difficult to produce a high-quality optical glass. Further, the wavelengths of the absorption edges lengthen in the spectral transmittance characteristics, and the glass exhibits a tendency to develop a yellow or brown coloration. Accordingly, the $Ti^{4+}$ content is specified as 5 to 20%. In terms of adequately achieving the effects of $Ti^{4+}$ introduction, the lower limit of the $Ti^{4+}$ content is desirably 6%, preferably 7%, and more preferably, 8%. From the perspectives of maintaining the thermal stability of the glass, inhibiting a rise in the liquidus temperature, maintaining the viscosity at the liquidus temperature, and inhibiting coloration of the glass, the upper limit of the $Ti^{4+}$ content is desirably 15%, preferably 13%, more preferably 12%, still more preferably 11%, and yet still more preferably, 10%.

$W^{6+}$ functions to impart a high refractive index and high dispersion to the glass and increase mechanical strength and chemical durability of the glass. However, since it lowers the ion packing rate more than $Nb^{5+}$ and since the enhancing effect on glass strength that is achieved by the incorporation of $W^{6+}$ is poorer than those of $Ti^{4+}$ and $Nb^{5+}$, $W^{6+}$ is an optional component in the present invention. When the content of $W^{6+}$ exceeds 22%, the thermal stability of the glass diminishes, the tendency to crystallize increases, the wavelengths of the absorption edges lengthen in the spectral transmittance characteristics of the glass, and the glass develops coloration. Accordingly, the content of $W^{6+}$ is specified as 0 to 22%. The incorporation of a suitable quantity of $W^{6+}$ has the effect of lowering the liquidus temperature of the glass. Thus, the lower limit of the $W^{6+}$ content is desirably 2%, preferably 3%, and more preferably, 4%. The upper limit of the $W^{6+}$ content is desirably 18%, preferably 15%, still more preferably 12%, yet still more preferably 10%, even more preferably 8%, and yet even more preferably, 6%.

To obtain an optical glass of desired high refractive index and high dispersion, in addition to keeping the individual contents of $Bi^{3+}$, $Nb^{5+}$, $Ti^{4+}$, and $W^{6+}$ to within the above ranges, the total content of $Bi^{3+}$, $Nb^{5+}$, $Ti^{4+}$, and $W^{6+}$ is specified as 50% or higher. The lower limit of the total content of $Bi^{3+}$, $Nb^{5+}$, $Ti^{4+}$, and $W^{6+}$ is desirably 55%, preferably 57%, still more preferably 58%, yet still more preferably 60%, even more preferably 62%, yet even more preferably 63%, yet still even more preferably 64%, and ideally, 65%. In terms of maintaining the meltability of the glass starting materials and the stability of the glass, the lower limit of the total content of $Bi^{3+}$, $Nb^{5+}$, $Ti^{4+}$, and $W^{6+}$ is desirably 90% or lower, preferably 80% or lower, and more preferably 70% or lower.

To further enhance the strength of the glass, it is desirable to limit the proportion of $Bi^{3+}$, which has the lowest glass strength-enhancing effect among components that impart a high refractive index and high dispersion in the form of $Bi^{3+}$, $Nb^{5+}$, $Ti^{4+}$, and $W^{6+}$, among components imparting a high refractive index and high dispersion. Specifically, the cation ratio $(Bi^{3+}/(Bi^{3+}+Nb^{5+}+Ti^{4+}+W^{6+}))$ of the content of $Bi^{3+}$ to the total content of $Bi^{3+}$, $Nb^{5+}$, $Ti^{4+}$, and $W^{6+}$ $(Bi^{3+}+Nb^{5+}+Ti^{4+}+W^{6+})$ is desirably kept to 0.6 or lower. The lower limit of this ratio is desirably 0.25. When this ratio exceeds 0.6, the viscosity of the glass increases, the thermal stability of the glass diminishes, devitrification tends to occur, the mechanical strength of the glass decreases, the absorption edges of the glass shift to the long wavelength side, and visible light transparency tends to deteriorate. When this ratio is less than 0.25, the liquidus temperature of the glass rises, the tendency to crystallize increases, and it becomes difficult to form a high refractive index glass of high homogeneity. The upper limit of $(Bi^{3+}/(Bi^{3+}+Nb^{5+}+Ti^{4+}+W^{6+}))$ is desirably 0.55, preferably 0.5, more preferably 0.45, still more preferably, 0.42, yet still more preferably 0.40, and even more preferably, 0.38. The lower limit is desirably 0.25, preferably 0.28, more preferably 0.30, still more preferably 0.32, yet still more preferably 0.34, and even more preferably, 0.36.

From the perspectives of raising the refractive index relative to the density of the glass and lowering the Abbé number of the glass for a given refractive index to increase the high dispersion characteristic, and in terms of inhibiting a drop in viscosity at the liquidus temperature of the glass, the cation ratio $(Ti^{4+}/(Bi^{3+}+Nb^{5+}+Ti^{4+}+W^{6+}))$ of the $Ti^{4+}$ content to the total content of $Bi^{3+}$, $Nb^{5+}$, $Ti^{4+}$, and $W^{6+}$ is desirably 0.03 to 0.33. When this ratio is less than 0.03, the refractive index relative to the density of the glass drops, and the high dispersion characteristic diminishes, causing a rise in the liquidus temperature of the glass and a drop in viscosity. When this ratio exceeds 0.33, the meltability of the glass deteriorates markedly and the stability of the glass diminishes, causing a drop in the viscosity at the liquidus temperature. The lower limit of the ratio of $(Ti^{4+}/(Bi^{3+}+Nb^{5+}+Ti^{4+}+W^{6+}))$ is desirably 0.05, preferably 0.08, more preferably 0.10, still more preferably 0.12, yet still more preferably 0.14, and even more preferably, 0.16. The upper limit is desirably 0.33, preferably 0.30, more preferably 0.25, still more preferably 0.22, and yet still more preferably, 0.20. It is desirable to increase this cation ratio from the perspective of enhancing the strength of the glass. From the perspectives of inhibiting tendency of reduction of the glass and increasing the hardness of the glass without inducing coloration, the cation ratio $(Ti^{4+}+Nb^{5+})/(Bi^{3+}+Nb^{5+}+Ti^{4+}+W^{6+})$ of the total content of $Ti^{4+}$ and $Nb^{5+}$ to the total content of $Bi^{3+}$, $Nb^{5+}$, $Ti^{4+}$, and $W^{6+}$ is desirably kept to 0.375 to 0.70. The lower limit of the ratio of $(Ti^{4+}+Nb^{5+})/(Bi^{3+}+Nb^{5+}+Ti^{4+}+W^{6+})$ is desirably 0.40, preferably 0.42, more preferably 0.44, still more preferably 0.45, and yet still more preferably, 0.46. The upper limit is desirably 0.65, preferably 0.60, more preferably 0.55, still more preferably 0.53, and yet still more preferably, 0.50.

Other optional components will be described next. The content of each of the various optional components in the present invention can be zero or exceed 0%.

Alkali metal components are optional components. Since the smaller the ionic radius, the greater the tightening effect on the structure and the greater the increase in hardness, in terms of increasing hardness, the incorporation of $Na^+$ is preferable to that of $K^+$, and the incorporation of $Li^+$ is preferably to that of $Na^+$. In particular, $K^+$ tends to reduce hardness.

Li$^+$ functions to enhance meltability, lower the melting temperature, shorten the wavelengths of the absorption edges in the spectral transmittance characteristics, inhibit reduction of the above high refractive index-imparting components in the glass melt, and inhibit coloration. Among the alkali metal components, it functions to increase hardness. Thus, to the extent that the object of the present invention is not spoiled, it can be incorporated. However, when the Li$^+$ content exceeds 7%, the refractive index drops, thermal stability diminishes, and the viscosity at the liquidus temperature tends to decrease. Thus, the Li$^+$ content is desirably 0 to 7%. The Li$^+$ content preferably falls within a range of 0 to 5%, more preferably falls within a range of 0 to 4%, still more preferably falls within a range of 0 to 3%, yet still more preferably falls within a range of 0 to 2%, and even more preferably falls within a range of 0 to 1%. It is possible to incorporate none at all. Li$^+$ has a smaller ionic radius than the other alkali metal components Na$^+$ and K$^+$. Thus, due to a glass structure-tightening effect, it has a relatively weak function of lowering the refractive index among the alkali metal components.

Na$^+$ enhances meltability, lowers the melting temperature, and shortens the wavelengths of the absorption edges in the spectral transmittance characteristics without greatly compromising the thermal stability of the glass. It also functions to inhibit reduction of the above high refractive index-imparting components in the glass melt, and inhibit coloration. Although it somewhat lowers the viscosity at the liquidus temperature, it functions to lower the liquidus temperature. However, when the Na$^+$ content exceeds 20%, the refractive index drops and the thermal stability and the viscosity at the liquid phase temperature tend to decrease somewhat. Thus, the Na$^+$ content is desirably kept to 0 to 20%. The upper limit of the Na$^+$ content is, in order of increasing preference, 18%, 16%, 14%, 12%, 10%, 8%, 7%, 6%, and 5%. The most preferable upper limit is 4%. Na$^+$ has an ionic radius between those of Li$^+$ and K$^+$. Thus, it functions to lower the Knoop hardness and to lower refractive index more than Li$^+$ and less than K$^+$. The lower limit of the Na$^+$ content is desirably 0.1%, preferably 0.5%, more preferably 1%, still more preferably 2%, and yet still more preferably, 3%.

K$^+$ also functions to enhance meltability and lower the melting temperature. If further functions to shorten the wavelengths of the absorption edges in the spectral transmittance characteristics, inhibit the reduction of the above high refractive index-imparting components in the glass melt, and inhibit coloration. In the co-presence of Li$^+$ and Na$^+$, it functions to enhance thermal stability and lower the liquidus temperature. However, when the content of K$^+$ exceeds 10%, the refractive index drops, and the thermal stability and viscosity at the liquidus temperature tend to decrease. Since K$^+$ functions to decrease the hardness of the glass, the content of K$^+$ is desirably kept to 0 to 10%. The upper limit of the K$^+$ content is preferably 7%, more preferably 5%, still more preferably 4%, yet still more preferably 3%, even more preferably 2%, and yet even more preferably, 1%. It is also possible to incorporate none at all.

In terms of inhibiting a drop in the viscosity at the liquidus temperature and coloration of the glass due to reduction of high refractive index-imparting components, the total content of Li$^+$, Na$^+$, and K$^+$ desirably falls within a range of 0 to 20%. The upper limit of the total content of Li$^+$, Na$^+$, and K$^+$ is desirably 15%, preferably 12%, more preferably 10%, still more preferably 7%, yet still more preferably 5%, even more preferably 4%, and yet even more preferably, 3%. When shortening the wavelengths of the absorption edges in the spectral transmittance characteristics and inhibiting coloration due to the reduction of high refractive index-imparting components are priorities, alkali metal components are desirably incorporated within the above-stated ranges. In that case, the upper limit of the total content of Li$^+$, Na$^+$, and K$^+$ is desirably 1%, preferably 2%. When any one of Li$^+$, Na$^+$, and K$^+$ is not incorporated, it is desirable to incorporate B$^{3+}$ and/or an alkaline earth metal component as set forth further below to shorten the wavelengths of the absorption edges and enhance viscosity. Even when incorporating an alkali metal component, it is still possible to incorporate B$^{3+}$ and/or an alkaline earth metal component. The B$^{3+}$ content is described further below.

Alkali metal components and alkaline earth metal components sever crosslinking bonds such as covalent . . . O—P—O—Nb—O . . . , terminating covalent bonds in the manner of . . . O—P—O—Na. Thus, they function to lower the viscosity of the glass melt. The degree to which the glass structure is terminated is roughly given by the product of the number of moles of the modifying component with its valence. The smaller this value, the greater the increase in the viscosity of the glass in a molten state at a given temperature. Accordingly, the total content of alkali metal components and alkaline earth metal components (R$_2$O+R'O: here, R$_2$O denotes the total content of alkali metal components based on oxides, and R'O denotes the total content of alkaline earth metal components, with R=Li, Na, K and R'=Mg, Ca, Sr, Ba) is desirably 20 mole % or lower, preferably 15 mole % or lower, more preferably 13 mole % or lower, still more preferably 11 mole %, yet still more preferably 10 mole % or lower, even more preferably 8 mole % or lower, yet even more preferably 6 mole % or lower, even still more preferably 4 mole % or lower, and yet even still more preferably, 3 mole % or lower. It is also possible for the total content of alkali metal components and alkaline earth metal components based on oxides to be 0 mole %. However, the smaller the total content of alkali metal components and alkaline earth metal components, the more difficult it becomes to inhibit coloration due to the reduction of readily-reducing Ti, Nb, Bi, and W ions. Thus, the total content of alkali metal components and alkaline earth metal components based on oxides is desirably 0.5 mole % or higher, preferably 1 mole % or higher, and more preferably, 2 mole % or higher.

When incorporating alkali metal components (when the total content of Li$^+$, Na+, and K$^+$ exceeds 0%), in terms of enhancing the thermal stability of the glass, raising the viscosity at the liquidus temperature, and improving the moldability of the glass, while keeping the Li$^+$ content to 7% or lower, the Na$^+$ content to 20% or lower, and the K$^+$ content to 10% or lower, the range of the cation ratio ((Li$^+$+Na$^+$)/(Li$^+$+Na$^+$+K$^+$) of the Li$^+$ and Na$^+$ content to the total content of Li$^+$, Na$^+$, and K$^+$ is desirably kept to 0.2 to 1. The cation ratio ((Li$^+$+Na$^+$)/(Li$^+$+Na$^+$+K$^+$)) preferably falls within a range of 0.5 to 1, more preferably falls within a range of 0.7 to 1, still more preferably falls within a range of 0.8 to 1, yet still more preferably falls within a range of 0.85 to 1, even more preferably falls within a range of 0.9 to 1, and yet even more preferably, falls within a range of 0.95 to 1. It can also be 1.

The incorporation of a suitable quantity of B$^{3+}$ increases the hardness more than the incorporation of alkali metal components and the like. It also functions to enhance the thermal stability of the glass, lower the liquidus temperature, and increase the viscosity at the liquidus temperature.

However, the incorporation of an excessive quantity lowers the ion packing rate, weakens the structure tightening effect, thereby decreasing the hardness, lowers the thermal stability, raises the liquidus temperature, and tends to increase coloration of the glass. Thus, the B$^{3+}$ content is desirably kept to 0 to 20%. The lower limit of the B$^{3+}$ content is desirably 1%, preferably 2%, more preferably 3%, still more preferably 4%, and yet still more preferably, 5%. The upper limit of the $B^{3+}$ content is desirably 18%, preferably 16%, more preferably 14%, still more preferably 13%, yet still more preferably 12%, even more preferably 10%, still even more preferably 9%, yet still even more preferably 8%, and the most preferably, 7%. $Si^{4+}$ functions to raise the liquidus viscosity of the glass quite well despite lowering the refractive index. However, the incorporation of an excessive quantity raises the liquidus temperature of the glass or makes phase separation of the glass. Thus, the upper limit of the $Si^{4+}$ content is desirably 5%, preferably 3%, more preferably 2%, still more preferably 1.5%, and yet still more preferably, 1.2%. The lower limit of the $Si^{4+}$ content is 0%, desirably more than 0%, preferably 0.1%, more preferably 0.2%, still more preferably 0.3%, yet still more preferably 0.4%, and even more preferably, 0.5%. $Si^{4+}$ is primarily incorporated based on the usual oxide starting materials. However, it can also be caused to mix in from a crucible made from a material comprised primarily of $SiO_2$.

Alkaline earth metal components are also optional components. The smaller the ionic radius, the more they increase the hardness. There are not major differences in terms of hardness. However, $Ba^{2+}$ is a component that tends to decrease hardness more than $Mg^{2+}$, $Ca^{2+}$, and $Sr^{2+}$. Additionally, $Ba^{2+}$ contributes to stabilizing the glass by inhibiting crystallization of the glass, allowing the glass to incorporate much more $Ti^{4+}$ and the like. Accordingly, $Ba^{2+}$ is a component that contributes indirectly to maintaining and raising the hardness so long as large quantities of $Ti^{4+}$, $Nb^{5+}$, and the like are incorporated.

$Ba^{2+}$ enhances the thermal stability of the glass and increases the viscosity at the liquidus temperature. It also functions to enhance meltability, shorten the wavelengths of the absorption edges in the spectral transmittance characteristics, and inhibit coloration of the glass due to reduction of high refractive index-imparting components. However, when the $Ba^{2+}$ content exceeds 15%, the refractive index drops and the Abbé number increases greatly, making it difficult to achieve the desired optical characteristics. Thus, the $Ba^{2+}$ content desirably falls within a range of 0 to 15%. The upper limit of the $Ba^{2+}$ content is desirably 12%, preferably 9 percent, more preferably 6%, still more preferably 0 to 4%, and yet still more preferably, 0 to 3%. The lower limit of the $Ba^{2+}$ content is 0%, preferably 0.2%, more preferably 0.5 percent, still more preferably 1.0%, and yet still more preferably, 2.0%. In terms of achieving the desired optical characteristics, it is possible not to incorporate any $Ba^{2+}$ at all.

From the perspective of keeping the Knoop hardness to within the range of the present invention, the total content of $K^+$ and $Ba^{2+}$, which function to reduce the hardness, is desirably kept to 16% or lower, preferably to 14% or lower, more preferably to 12% or lower, still more preferably to 10% or lower, yet still more preferably to 8% or lower, even more preferably to 6% or lower, and ideally, to 4% or lower. In terms of maintaining optical characteristics such as the refractive index, Abbé number, and viscosity at the liquidus temperature, and from the perspective of keeping the Knoop hardness within the range of the present invention, the total content of $K^+$, $Ba^{2+}$, and $B^{3+}$ is desirably 22% or lower, preferably 18% or lower, more preferably 15% or lower, still more preferably 12% or lower, yet still more preferably 10% or lower, even more preferably 8 percent or lower, and ideally, 6% or lower.

To inhibit a decrease in the viscosity at the liquidus temperature while maintaining a refractive index nd of 2.02 or higher, the total content of $P^{5+}$, $Bi^{3+}$, $Nb^{5+}$, $Ti^{4+}$, $W^{6+}$, $Li^+$, $Na^+$, $K^+$, $B^{3+}$, $Si^{4+}$, and $Ba^{2+}$ is desirably kept to 90 to 100%, preferably 95 to 100%, more preferably 98 to 100%, and still more preferably, 99 to 100%. The total content can be 100%.

From the same perspective, the total content of $P^{5+}$, $Bi^{3+}$, $Nb^{5+}$, $Ti^{4+}$, $W^{6+}$, $Li^+$, $Na^+$, $K^+$, $B^{3+}$, and $Si^{4+}$ is desirably kept to 90 to 100%, preferably 95 to 100%, more preferably 98 to 100%, and still more preferably 99 to 100%. The total content can be 100%.

Components that can be incorporated in addition to the above cation components include $Sr^{2+}$, $Ca^{2+}$, $Mg^{2+}$, $Zn^{2+}$, $Al^{3+}$ and the like. Of these, $Sr^{2+}$, $Ca^{2+}$, $Mg^{2+}$, and $Zn^{2+}$ all function to enhance the meltability of the glass, but also function to lower the refractive index. Thus, the content of each of $Sr^{2+}$, $Ca^{2+}$, $Mg^{2+}$, and $Zn^{2+}$ desirably falls within a range of 0 to 5%, preferably within a range of 0 to 3%, more preferably within a range of 0 to 2%, and still more preferably, within a range of 0 to 1%. It is also possible not to incorporate $Sr^{2+}$, $Ca^{2+}$, $Mg^{2+}$, or $Zn^{2+}$.

$Al^{3+}$ functions to lower the refractive index and raise the liquidus temperature of the glass. Thus, the content of $Al^{3+}$ desirably falls within a range of 0 to 5%, preferably within a range of 0 to 3%, more preferably within a range of 0 to 2%, and still more preferably, within a range of 0 to 1%. It is also possible not to incorporate $Al^{3+}$.

In addition, clarifying agents such as $Sb_2O_3$ and $SnO_2$ can be added as additives. To control the clarifying property and compatibility between the glass and the crucible material, various salts and the like comprised of highly polarizable anions such as $NO_3^-$, $CO_3^-$, $SO_4^{2-}$, $F^-$, $Cl^-$, $Br^-$, and $I^-$ and cations in the form of their counter ions can be added.

Of the above clarifying agents, $Sb_2O_3$ is preferred. When employing $Sb_2O_3$, the quantity of $Sb_2O_3$ added as a weight ratio based on the total amount of the glass components desirably falls within a range of 0 to 10,000 ppm. The term "quantity added based on the total amount of the glass components as a weight ratio" is the quantity added denoted based on the weight of the glass components. In addition to having a clarifying effect, $Sb_2O_3$ functions to place the above high refractive index-imparting components in a state of oxidation in the glass melt and stabilize the state of oxidation. However, when the quantity added based on the total amount of the glass components exceeds 10,000 ppm, Sb absorbs light itself, tending to cause the glass to develop coloration. From the perspective of enhancing the transmittance characteristic of the glass, the upper limit of the quantity of $Sb_2O_3$ added as a weight ratio based on the total amount of the glass components is desirably 5,000 ppm, preferably 2,000 ppm, more preferably 1,100 ppm, still more preferably 900 ppm, and yet still more preferably, 600 ppm. The lower limit is desirably 100 ppm, preferably 200 ppm, and still more preferably, 300 ppm. Since Sb is an additive, the quantity added is indicated as a value converted to an oxide, in contrast to the glass components.

Cations of Pb, As, Cd, Te, Tl, and Se all present the risk of burdening the environment and are thus desirably not incorporated or added to the optical glass of the present invention. Cations of V, Cr, Mn, Fe, Co, Ni, Cu, Pr, Nd, Eu, Tb, Ho, and Er all impart coloration to the glass or emit fluorescence when irradiated with ultraviolet light, and are thus desirably not incorporated or added. However, the term "not incorporated or added" does not exclude the mixing in as impurities derived from starting materials or the glass melting step.

$Ga^{3+}$, $Lu^{3+}$, $In^{3+}$, $Ge^{4+}$, and $Hf^{4+}$ can be contained in small quantities. However, no significant effect is achieved by these components and they are all expensive. Thus, the respective content of each is desirably kept to within a range of 0 to 2%, preferably to within a range of 0 to 1%, more preferably to 0% or greater but less than 0.5%, and still more preferably, to 0% or greater but less than 0.1%. To keep down the manufacturing cost of the glass, they are desirably not incorporated.

Additionally, various cations that are not expressly stated in the description of the optical glass of the present invention can also not be incorporated. That is, can be kept to 0%. However, the term "not incorporated or added" does not exclude the mixing in as impurities derived from starting materials or the glass melting step.

[The Refractive Index and Abbé Number]

The refractive index nd of the optical glass of the present invention is 2.02 or higher and the Abbé number vd is 19.0 or lower. Since the optical glass of the present invention has an ultra high refractive index and high dispersion characteristic, it is suitable as a material for optical elements for constituting high zoom ratio, wide angle, compact optical systems. From the perspective of providing an optical glass that can be employed in optical elements that are effective for achieving higher functionality and a greater degree of compactness in optical systems, the refractive index nd is desirably greater than 2.05, preferably 2.06 or higher, more preferably 2.07 or higher, still more preferably 2.08 or higher, and yet still more preferably, 2.09 or higher. The upper limit of the Abbé number vd is desirably 18.5, preferably 18.1, still more preferably 17.7, still more preferably 17.4, yet still more preferably 17.2, and even more preferably, 17.1.

The upper limit of the refractive index nd and the lower limit of the Abbé number vd are naturally established by the above composition ranges. Although not specifically limited, an upper limit of the refractive index nd of 3.0 and a lower limit of the Abbé number of 5 can serve as yardsticks. When emphasizing the moldability of the glass, increasing the refractive index nd and reducing the Abbé number vd tend to reduce the viscosity at the liquidus temperature. Thus, the upper limit of the refractive index nd and the lower limit of the Abbé number vd are established so that the viscosity of the liquidus temperature falls within a range of 1 dPa·s or higher within the above glass composition ranges.

[The Knoop Hardness]

From the perspective of preventing scratching during mechanical processing and handling of the high refractive index high dispersion bismuth-phosphoric acid optical glass as set forth above, the Knoop hardness of the optical glass of the present invention is 370 or higher. In a glass with a Knoop hardness of less than 370, as set forth above, scratching becomes a problem during mechanical processing such as grinding, polishing, and cutting, as well as during the handling of glass articles. The above scratching can be inhibited by controlling the Knoop hardness within the above mentioned range. The Knoop hardness in the present invention desirably falls within a range of 375 or higher, preferably falls within a range of 380 or higher, more preferably falls within a range of 385 or higher, still more preferably falls within a range of 390 or higher, yet still more preferably falls within a range of 395 or higher, even more preferably falls within a range of 400 or higher, still even more preferably falls within a range of 405 or higher, even yet more preferably falls within a range of 410 or higher, still even yet more preferably falls within a range of 415 or higher, and ideally, falls within a range of 420 or higher. The upper limit of the Knoop hardness is not specifically limited. Only from the perspective of avoiding the problem of scratching, the higher it is the better. However, since the glass composition is limited and the refractive index and Abbé number are limited, the Knoop hardness is, at maximum, for example, about 600, and desirably about 500 or less.

[The Degree of Abrasion]

From the perspective of inhibiting scratching during processing to polish the high refractive index, high dispersion glass and increase the control of polishing, the degree of abrasion of the optical glass of the present invention is 300 or less. In a glass with a degree of abrasion exceeding 300, as set forth above, in addition to scratching during mechanical processing such as grinding and cutting and during the handling of glass articles, scratching during the polishing step becomes pronounced. When employing a high efficiency polishing abrasive such as cerium oxide, it becomes difficult to conduct polishing while controlling the curvature of the lens and it becomes necessary to conduct polishing over an extended period with a zirconium oxide abrasive with a reduced polishing property or the like. Polishing efficiency thus decreases. In the present invention, the degree of abrasion desirably falls within a range of 280 or lower, preferably falls within a range of 270 or lower, more preferably falls within a range of 260 or lower, still more preferably falls within a range of 250 or lower, yet still more preferably falls within a range of 240 or lower, even more preferably falls within a range of 230 or lower, yet even more preferably falls within a range of 220 or lower, still even more preferably falls within a range of 210 or lower, and yet still even more preferably, falls within a range of 200 or lower. The lower limit of the degree of abrasion is not specifically limited. However, when the degree of abrasion is excessively low, the time required to polish away a given volume of glass increased. Thus, the degree of abrasion is at minimum 10 or higher, for example, desirably 30 or higher, and preferably, 50 or higher.

In the bismuth-phosphoric acid high refractive index, high dispersion optical glass of the present invention, within the above composition range, the Knoop hardness can be controlled to a desired value by determining a glass composition having the desired Knoop hardness by taking into account the effect on the Knoop hardness of the various compositions shown in FIGS. 1 and 2 based on the Knoop hardness and the glass compositions described in the embodiments. For example, the glass composition can be determined by determining the desired Knoop hardness based on (starting with) the glass of Embodiment 1, and taking into account the glass composition of Embodiment 1 and the effects of the various compositions, imparted on the Knoop hardness, shown in FIGS. 1 and 2. Specifically, when it is desirable to further increase the Knoop hardness of 406 of the glass of Embodiment 1, by varying the components indicated in FIG. 1, for example, by replacing Ti, which increases the Knoop hardness based on P (the rate of change of the Knoop hardness on the vertical axis in FIG. 1 increases) with W, in which this value is low, for example, a glass with a high Knoop hardness can be obtained. For example, a glass in which the Knoop hardness is raised by 11 to 417 can be obtained (see Embodiment 2) by changing the $Ti^{4+}$ of 12 mole % and the $W^{6+}$ of 12 mole % in Embodiment 1 by increasing the $Ti^{4+}$ by 4 mole % to 16 mole % and decreasing the $W^{6+}$ by 4 mole % to 8 mole %. When changing the components shown in FIG. 2, by replacing Ca, which increases the Knoop hardness based on Mg (the rate of change of the Knoop hardness on the vertical axis in FIG. 2 increases) with Mg, a glass with a high Knoop hardness can be obtained. For example, a glass in which the Knoop hardness is raised by 9 to 414 can be obtained (see Embodiment 15) by replacing the 4.255 mole % of $Ba^{2+}$ in the glass of Embodiment 17 (Knoop hardness 405) with 4.255 mole % of $Ca^{2+}$.

[The Liquidus Temperature and the Viscosity at the Liquidus Temperature]

In the optical glass of the present invention, it is desirable for the viscosity of the liquidus temperature to be 1 dPa·s or higher to achieve good moldability. The liquidus temperature tends to rise with the refractive index and dispersion of the glass, tending to reach an elevated temperature of 940° C. or higher. A rise in the liquidus temperature entails a rise in the melting temperature and molding temperature to prevent devitrification during manufacturing of the glass. As a result, the viscosity of the glass during molding drops sharply, striae are produced, and optical homogeneity ends up deteriorating sharply. Based on the above desirable optical glasses, even when the liquidus temperature rises with the refractive index and dispersion, it is possible to inhibit the generation of striae during glass molding by raising the viscosity per degree of temperature and provide a high-quality optical glass of good optical homogeneity.

In the present invention, the viscosity at the liquidus temperature desirably falls within a range of 1.0 dPa·s or higher, preferably within a range of 1.4 dPa·s or higher, more preferably within a range of 1.7 dPa·s or higher, still more preferably within a range of 2.0 dPa·s or higher, yet still more preferably within a range of 2.2 dPa·s or higher, even more preferably within a range of 2.5 dPa·s or higher, even still more preferably within a range of 2.7 dPa·s or higher, yet even more preferably within a range of 3.0 dPa·s or higher, and ideally, within a range of 3.2 dPa·s or higher. The upper limit of the viscosity at the liquidus temperature is not specifically limited. However, 20 dPa·s can be thought of as a yardstick. However, there is a risk of a drop in the refractive index and the like when the viscosity at the liquidus temperature is made excessively high. Thus, the upper limit of the viscosity at the liquidus temperature is desirably 10 dPa·s, preferably 7 dPa·s.

The liquidus temperature in the present invention desirably falls within a range of 1,100° C. or lower, preferably 1,050° C. or lower, and in order of increasing preference, 1,030° C. or lower, 1,020° C. or lower, 1,000° C. or lower, 990° C. or lower, 980° C. or lower, 970° C. or lower, and 960° C. or lower. By keeping the liquidus temperature within this range, it is possible to inhibit an excessive rise in the melting temperature and molding temperature, prevent coloration of the glass due to the crucible material melting into the glass during manufacturing of the glass, and prevent a reduction in the quality of the glass due to the mixing in of crucible material as foreign matter. It is also possible to inhibit volatization from the molten glass, and inhibit change in the composition and variation in optical characteristics due to volatization. From the perspective of incorporating large amounts of high melting point, high refractive index components, the lower limit of the liquidus temperature can be thought of with 800° C. or higher, preferably 900° C. or higher, as a yardstick. As set forth above, 940° C. can also be thought of as a yardstick.

In the present invention, the specific gravity is defined by the specific gravity of the glass obtained at a gradual cooling rate of −30° C./hour. However, the amount of change in the specific gravity relative to the cooling rate is as follows. The amount of increase in the specific gravity when the cooling rate is made 1/10 is 0.005 to 0.06%, desirably 0.01 to 0.04%. Thus, it can be thought of based on the cooling rate of the glass by adjusting the following numerical range to a cooling rate of −30° C./hour. The upper limit of the specific gravity is desirably 6.0, preferably 5.7, more preferably 5.5, still more preferably 5.4, and yet still more preferably 5.3. The lower limit is not specifically limited. However, when the specific gravity is made excessive low, there is a risk of the problem of a drop in the refractive index and the like. Thus, the lower limit of the specific gravity is desirably 3.0, preferably 4.0, more preferably 4.5, still more preferably 4.8, and yet still more preferably, 5.0.

[Light Transparency]

The optical glass of the present invention, while being an ultra high refractive index, high dispersion glass, also has a suitable transmittance characteristic as an optical element used in the image pickup optical systems of digital image pickup devices.

Conventionally, in the development of lens materials for light-sensitive film cameras, to achieve good color reproducibility, the focus has been on finding some means of expanding the wavelength region at which high transmittance is achieved into the short wavelength region. Generally, in the spectral transmittance characteristic of an optical glass, indexes based on specific wavelengths in the form of the λ70, the wavelength at which an external transmittance of 70% is exhibited, and the λ5, the wavelength at which an external transmittance of 5% is exhibited, have been employed as indexes indicating to what degree light of short wavelengths is being transmitted.

Generally, in the ultraviolet region of wavelengths of 400 nm or less, the spectral transmittance of an optical glass decreases as the wavelength being transmitted grows shorter. Thus, the relation of λ70>λ5 exists between λ70 and λ5. Up to this point, the specific wavelengths of most optical glasses have been 400 nm or lower, that is, in the UV radiation region. λ70 and λ5, which indicate the drop in transmittance, have been wavelengths in the UV range, so a drop in transmittance of visible light has not been a problem. However, the higher the dispersion that is achieved in a glass, the longer the wavelengths of λ70 and λ5 become. Among high dispersion glasses, as higher refractive indexes have been achieved, the wavelengths of λ70 and λ5 have become markedly longer. In the development of high dispersion lens materials, that is, in the development of high dispersion optical glasses, due to the relation of λ70>λ5, λ70 has often fallen into the visible region of 400 nm or more. As a result, the glass has developed a yellow to brown coloration. For that reason, shortening the wavelength of λ70, that is, reducing the coloration of the glass, has been deemed to be of great importance. The materials of the high dispersion lenses used in digital cameras have also undergone this trend, and shortening of the wavelength of λ70 has been made a priority.

Compared to a medium refractive index, medium or low dispersion glass, in an ultra high refractive index, high dispersion glass, the wavelength of the short wavelength absorption edge of the light ray transmitting region increases, and in addition to λ70, λ5 is also present in the visible region. Thus, to increase the refractive index of visible light rays, it becomes extremely important to shorten the wavelength of λ5 as well as to shorten the wavelength of λ70. In the ultra high refractive index, high dispersion glasses that have been fabricated thus far with the goal of reducing coloration, the wavelength of λ70 has mainly been shortened, and shortening of the wavelength of λ5 has been inadequate. When an image pickup element in which there is inadequate shortening of the wavelength of λ5 is employed, the wavelength of the threshold wavelength entering the image pickup element is lengthened and violet information and blue information are dropped from the image information, resulting in reduced color reproducibility.

By digitally processing the image signal in a digital camera, it is possible to electronically correct the color balance. Accordingly, even when information at some wavelengths is dropped, by directing the light to the image pickup elements while maintaining the intensity ratio of the three primary colors of light of blue, green, and red, it is possible to reproduce the colors to some degree. However, when the transmittance of some of the light among the three primary colors drops sharply and their intensity ratio cannot be maintained, color reproduction based on electronic correction also becomes difficult.

A desirable glass among the optical glasses of the present invention is prepared by paying attention to shortening the wavelength of λ5. That makes it possible to achieve a high degree of functionality and compactness in an image pickup system by utilizing the ultra high refractive index and high dispersion characteristic while maintaining good color reproducibility.

[Density and Specific Gravity]

In recent years, lenses such as image pickup lenses, particularly lenses mounted on portable image pickup devices, vehicle-mounted camera lenses, and pickup lenses, have tended to decrease in size. In such lenses, it is necessary to reduce the shift in focal position relative to the medium being read and image pickup elements such as CCDs. Thus, such modules have been equipped with various anti-vibration devices. Various vibration frequencies are being designed so as not to exceed the primary resonance point F0 (Hz) obtained from the resonance frequency of the module.

The primary resonance point F0 is inversely proportional to the square root $\sqrt{m}$ of the mass m of the module. Thus, as the weight of the module increases, F0 decreases and an additional anti-vibration device becomes necessary, which are undesirable.

Camera lenses are precisely driven by an actuator or the like. As the mass of the drive element increases, the load on the mechanisms related to driving and positioning increases and the amount of energy consumed goes up, which are undesirable.

Given the above background, in the course of achieving an ultra high refractive index in an optical element, it is necessary to inhibit an increase in the density of the optical glass serving as the material. Since the density is actually proportional to the specific gravity of the glass when gravitational acceleration is viewed as constant, to inhibit an increase in the density of the glass, it suffices to inhibit an increase in the specific gravity of the glass under identical gravitational acceleration.

Accordingly, what elements to be used as high refractive index, high dispersion components, and the determination of the component ratios of the various components are desirably resolved by taking into account the manufacturing stability of the glass, transmittance characteristics, density, and specific gravity.

To raise the refractive index of the glass, it is necessary to increase the molecular refraction of the glass. The molecular refractive of the glass is determined among ions by anions of high polarizability, that is, oxygen ions and fluorine ions. (The optical glass of the present invention is an oxide glass, so the anions are primarily oxygen ions.) Molecular refraction increases proportionally with the anion packing rate. Thus, raising the packing rate of these anions is effective. The anion packing rate is determined by the disposition of the outer shell electrons, coordination number, valence, ionic radius, and the like of the cations that are bonded to the anions. Accordingly, the disposition of the outer shell electrons, coordination number, valence, ionic radius, and the like of the cations affect the refractive index.

For example, Ta and Nb are of higher valence than La, which is a typical high refractive index component of optical glass. Thus, it is possible to raise the refractive index by replacing La with Ta and Nb. W is a component with a higher valence than Ta and is effective for raising the refractive index. Although the valance of Bi is the same as that of La, it has higher natural polarizability by itself and thus contributes to raising the refractive index, and has a greater effect on raising the refractive index per unit cation % than Nb and W.

Ti is an element with less oxygen atom packing than Ta and Nb. However, it absorbs certain wavelengths strongly (UV absorption) and can thus raise the refractive index of specific wavelengths (for example, the refractive index in the blue to ultraviolet region, referred to as the f line and g line refractive indexes). Since the mass of the Ti atom itself is low, it has a strong effect in raising the refractive index without increasing the density of the glass.

Although not to the extent of Ti, Nb has a lower mass than W and Bi, and is a component that raises the refractive index without increasing the density of the glass. Its incorporation in glass causes UV absorption at specific wavelengths, making it a component that increases dispersion and raises the refractive index at specific wavelengths. Compared to Ti, Nb has greater mass, and is thus somewhat disadvantageous from the perspective of inhibiting an increase in density. However, it is an advantageous component in terms of achieving a good transmittance characteristic.

When Bi, Nb, Ti, and W are jointly present as glass components, they lower the liquidus temperature and increase the stability of the glass, thereby contributing to enhancing manufacturing stability.

By comprehensively taking these points into account and adjusting the composition to within ranges yielding the desired optical characteristics and Knoop hardness, it is possible to obtain an optical glass having a high refractive index and high dispersion in which an increase in density, that is, an increase in specific gravity, is inhibited.

[Method of Manufacturing the Optical Glass]

The optical glass of the present invention can be manufactured by the melt method.

For example, compound starting materials corresponding to various components are weighed out in such as manner as to yield a glass of desired composition and thoroughly mixed to obtain a mixed starting material. The mixed starting material is charged to a crucible and melted for 0.5 to 4 hours while being stirred at 1,100 to 1,200° C. The glass melt is then caused to flow out into a prescribed container, cooled, and pulverized to obtain cullets. To prevent the reduction of reducing glass components, it is also possible to set the melting temperature to between the liquidus temperature LT, which is lower than the temperature at which the mixed starting materials are introduced, and 1,100° C., desirably between the liquidus temperature+20° C. and 1,050° C.

The cutlets are then charged to a crucible made of a noble metal and heated to from the liquidus temperature LT to 1,200° C., stirred, and melted. Next, the molten glass is clarified for from 0.5 to 6 hours at from the liquidus temperature LT to 1,200° C. Following clarification, the temperature of the glass is lowered from the clarifying temperature to from the liquidus temperature LT to 1,100° C., desirably to from the liquidus temperature LT to 1,080° C., preferably to from the liquidus temperature LT to 1,050° C., more preferably to from the liquidus temperature LT to 1,020° C., and still more preferably, to from the liquidus temperature LT to 1,000° C. Subsequently, the molten glass is caused to flow out through a pipe connected to the bottom of the crucible, or cast into a casting mold and molded, to obtain optical glass.

The above temperature conditions and the times required for individual steps can be suitably adjusted.

It is also possible to prepare multiple types of cutlets of differing optical characteristics by the above method, mix these cutlets to obtain desired optical characteristics, and then melt, clarify, and mold them to prepare an optical glass.

[The Glass Material for Press Molding]

The glass material for press molding of the present invention (referred to hereinafter as the "glass material") is comprised of the optical glass of the present invention set forth above. The glass material is obtained as follows. First, glass starting materials that have been mixed so as to yield the optical glass of the present invention are heated, melted, and molded. The molded member that has been prepared in this fashion is then processed to prepare a glass material corresponding to the weight of a single press molded article. In addition to this method, known methods of preparing glass materials for press molding from molten glass can also be employed. For example, molten glass can be cast into a mold and molded into plate or block form, annealed, and then mechanically processed, that is, cut, ground, and polished, to obtain a glass material free of surface scratches.

Since the glass material of the present invention is comprised of glass with a high Knoop hardness, it is not prone to scratching during processing or during handling as a glass material. As a result, it is desirably employed as a glass material for precision press molding, in which scratches on the glass material surface tend to remain on the optical element surface following press molding, particularly on optically functional surfaces.

It is also possible to manufacture press molded articles that tend not to be scratched by mechanical processing when the press molded articles are mechanically processed after press molding, that is, even when optical elements are prepared by grinding and polishing.

[The Optical Element]

The optical element of the present invention is comprised of the optical glass of the present invention set forth above.

Specific examples are aspherical lenses, spherical lenses, plano-concave lenses, plano-convex lenses, bi-concave lenses, bi-convex lenses, convex meniscus lenses, concave meniscus lenses, and other lenses; microlenses, lens arrays, lenses with diffraction gratings, and various other lenses; prisms; and prisms with lens functions. As needed, antireflective films, partially reflective films with wavelength selectivity or the like can be provided on the surface.

Since the optical element of the present invention is comprised of a glass having an ultra high refractive index and a high dispersion characteristic, it can be combined with optical elements comprised of other glasses to conduct good chromatic aberration correction. Since a glass of high Knoop hardness that tends not to score is employed, handling is facilitated. The optical element also tends not to scratch in the course of being secured. In centering and edging of the lens, there is an advantage in that scratching tends not to occur even when the lens surface is gripped from both sides and secured.

The optical glass of the present invention is also effective for achieving high zoom ratios, wide angles, and compactness in image pickup optical systems.

Since a glass having an ultra high refractive index and a high dispersion characteristic in which an increase in specific gravity has been inhibited is employed, it becomes possible to reduce the weight of optical elements. This is also useful for preventing displacement of the focal position due to vibration.

The use of a glass in which the wavelengths of the absorption edges in the spectral transmittance characteristics have been shortened makes it possible to prevent loss of image information in the visible short wavelength region, which is useful for enhancing the color reproducibility of digital image pickup devices.

The optical element of the present invention is suitable for the image pickup optical systems of various cameras, such as digital still cameras, digital video cameras, monitoring cameras, and vehicle-mounted cameras; and optical elements that direct light rays for reading and writing data to optical recording media such as DVDs and CDs, such as optical pickup lenses and collimator lenses. It is also preferred as an optical element for use in optical communication.

The above optical element can be manufactured by the method of processing the optical glass of the present invention and polishing the surface; the method of heating and press molding the glass material for press molding of the present invention to manufacture an optical element blank, and grinding and polishing the optical element blank; the method of heating and precision press molding the glass material for press molding of the present invention to obtain an optical element; and other known methods. In all of these cases, the problem of reduced productivity due to scratching is resolved by using a glass that tends not to undergo surface scratching even in the form of a glass product comprised of a high refractive index, high dispersion optical glass.

EMBODIMENTS

The present invention is described in greater detail below by means of embodiments.

Embodiment 1

Compound starting materials corresponding to various components were weighed out to yield glasses having composition Nos. 1 to 51 in Table 1 and thoroughly mixed to obtain mixed starting materials. The glass compositions indicated in Table 1 are based on values indicated as cation %. Values indicating mole % and mass % have all been converted to cation %.

Each mixed starting material was charged to a crucible, melted for 2 to 5 hours while being stirred at 1,100 to 1,200° C., rapidly cooled, and pulverized to obtain cullets.

Next, the cullets were charged to a crucible made of a noble metal, heated to 1,000 to 1,100° C., stirred, and melted. Next, the molten glass was clarified over 2 to 6 hours at 1,000 to 1,100° C. Following clarification, the temperature of the glass was lowered from the clarifying temperature to from the liquidus temperature LT to 1,050° C. The molten glass was then caused to flow out through a pipe connected to the bottom of the crucible, or cast into a casting mold, and glass blocks were molded.

Light rays were directed into each of the glass blocks obtained and the optical paths of the light rays in the glass were observed from the side. Optical glasses in which no foreign matter such as crystals was observed in the glass and that were of high homogeneity and high quality were obtained.

Optical glasses Nos. 1 to 51 that were obtained were measured as set forth below to determine the refractive index nd, Abbé number vd, Knoop hardness, degree of abrasion, liquidus temperature, viscosity at the liquidus temperature, glass transition temperature, specific gravity, $\lambda 70$, and $\lambda 5$. An empty column indicates that no measurement was made.

(1) The Refractive Index nd and Abbé Number vd

These were measured based on Japan Optical Glass Industrial Standard JOGIS-01. The measurement results are given in Table 1.

(2) The Knoop Hardness

Implemented in accordance with Japan Optical Glass Industrial Standard JOGIS-09. A Knoop indenter was pressed into a glass sample 2 to 20 mm in thickness with two polished surfaces. The Knoop hardness of the optical glass was measured based on the magnitude of the pressure mark. The measurement results are given in Table 1.

(3) The Degree of Abrasion $F_A$

A sample with a measurement surface area of 9 cm² was held at a fixed position 80 mm from the center of a cast iron flat dish rotating at 60 rpm horizontally. A lapping liquid obtained by adding 10 g of alumina abrasive grains with an average grain diameter of 20 μm to 20 mL of water was uniformly fed for 5 minutes, a 9.807 N load was applied, and lapping was conducted. The sample was weighed before and after lapping to obtain the abrasion mass m. The abrasion mass $m_0$ of a standard sample (BSC7) established by the Japan Optical Glass Industrial Standards was similarly measured, and the following calculation was made:

$$F_A = [(m/d)/(M_0/d_0)] \times 100$$

Here, d denotes the specific gravity of the sample and $d_0$ denotes the specific gravity of the standard sample (BSC7).

(4) The Liquidus Temperature and the Viscosity at the Liquidus Temperature

The glass sample was placed in a furnace that had been heated to a prescribed temperature and kept there for two hours. It was then cooled. The interior of the glass was observed at 100-fold magnification by optical microscopy and the liquidus temperature was determined based on whether or not crystals were present. The viscosity was measured with a coaxial double cylinder rotating viscometer by the viscosity measurement method of JIS Standard Z8803.

(5) The Glass Transition Temperature Tg

The glass transition temperature was measured from the endothermic curve when the temperature of solid glass was raised using a DSC3300SA differential scanning calorimeter. The Tg obtained by this measurement corresponded to the glass transition temperature Tg measured based on Japan Optical Glass Industrial Standard JOGIS-08. The measurement results are given in Table 1.

(6) The Specific Gravity

This was measured based on Japan Optical Glass Industrial Standard JOGIS-05. The measurement results are given in Table 1.

(7) λ70 and λ5

λ70 and λ5 were measured as follows. A glass sample 10 mm in thickness having parallel, optically polished flat surfaces was employed. The spectral transmittance was measured for the wavelength region of 280 nm to 700 nm. Light rays of intensity A were directed perpendicularly onto one of the optically polished flat surfaces, and the intensity B of the light rays exiting the other parallel surface was measured. The spectral transmittance was calculated as B/A. Accordingly, the spectral transmittance included losses due to reflection of light rays on the sample surface. The wavelength at which the spectral reflectance was 70% was adopted as λ70, and the wavelength at which the spectral reflectance was 5% was adopted as λ5. The measurement results are given in Table 1. The Molecular Weight and Molar Volume were Calculated by the Following Procedures (8) Molecular Weight For oxides $M_xO_y$ in which the structural ratio of cations M and anions (oxygen here) was X:Y, the total of the molecular weight of M×1 and the molecular weight×(y/x) of the anions (oxygen here) was adopted as the unit molecular weight (g/mole) of the oxide unit $MO_{y/x}$ of the cation base. For each element, the sum of (unit molecular weight (g/mole) of oxide unit $MO_{y/x}$, x the respective cation content (cation %))/100 became the molecular weight (g/mole).

(9) The Molar Volume

The molar volume (cm³/mole) was obtained by dividing the above molecular weight (g/mole) by the specific gravity expressed in units of density [g/cm³]. That is, the molecular weight (g/mole) divided by the density (g/cm³) at room temperature was adopted as the molar volume (cm³/mole).

TABLE 1

| | | No. 1 | | | No. 2 | | |
|---|---|---|---|---|---|---|---|
| | | Cation % | Mole % | Mass % | Cation % | Mole % | Mass % |
| Cationic components (Expressed as Oxide) | $P^{5+}$ ($P_2O_5$) | 29.87 | 26.000 | 16.070 | 29.87 | 26.000 | 16.510 |
| | $Bi^{3+}$ ($Bi_2O_3$) | 22.99 | 20.000 | 40.590 | 22.99 | 20.000 | 41.700 |
| | $Nb^{5+}$ ($Nb_2O_5$) | 22.99 | 20.000 | 23.160 | 22.99 | 20.000 | 23.800 |
| | $Ti^{4+}$ ($TiO_2$) | 6.90 | 12.000 | 4.180 | 9.20 | 16.000 | 5.720 |
| | $W^{6+}$ ($WO_3$) | 6.90 | 12.000 | 12.120 | 4.60 | 8.000 | 8.300 |
| | $Li^+$ ($Li_2O$) | 0.00 | 0.000 | 0.000 | 0.00 | 0.000 | 0.000 |
| | $Na^+$ ($Na_2O$) | 3.45 | 3.000 | 0.810 | 3.45 | 3.000 | 0.830 |
| | $K^+$ ($K_2O$) | 2.30 | 2.000 | 0.820 | 2.30 | 2.000 | 0.840 |
| | $B^{3+}$ ($B_2O_3$) | 3.45 | 3.000 | 0.910 | 3.45 | 3.000 | 0.930 |
| | $Ba^{2+}$ (BaO) | 1.15 | 2.000 | 1.340 | 1.15 | 2.000 | 1.370 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (CaO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |

TABLE 1-continued

|  |  | | | | | | |
|---|---|---|---|---|---|---|---|
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 59.78 | 64 | 80.05 | 59.78 | 64 | 79.52 |
| | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.385 | 0.313 | 0.507 | 0.385 | 0.313 | 0.524 |
| | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.115 | 0.188 | 0.052 | 0.154 | 0.250 | 0.072 |
| | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.500 | 0.500 | 0.342 | 0.538 | 0.563 | 0.371 |
| | $Li^+ + Na^+ + K^+$ ($Li_2O + Na_2O + K_2O$) | 5.75 | 5 | 1.63 | 5.75 | 5 | 1.67 |
| | $Na^+/(Li^+ + Na^+ + K^+)$ $Na_2O/(Li_2O + Na_2O + K_2O)$ | 0.60 | 0.600 | 0.497 | 0.60 | 0.600 | 0.497 |
| | $R_2O + RO$ | 6.90 | 7.000 | 2.970 | 6.90 | 7.000 | 3.040 |
| | $R_2O + RO + B$ | 10.35 | 10.00 | 3.88 | 10.35 | 10.00 | 3.97 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 98.85 | 98.00 | 98.66 | 98.85 | 98.00 | 98.63 |
| | $K^+ + Ba^{2+}$ ($K_2O + BaO$) | 3.45 | 4.00 | 2.16 | 3.45 | 4.00 | 2.21 |
| | $K^+ + Ba^{2+} + B^{3+}$ ($K_2O + BaO + B_2O_3$) | 6.90 | 7.00 | 3.07 | 6.90 | 7.00 | 3.14 |
| Anionic component | $O^{2-}$ | | 100 anion % | | | 100 anion % | |

| | | No. | | | | | |
|---|---|---|---|---|---|---|---|
| | | 3 | | | 4 | | |
| | | Cation % | Mole % | Mass % | Cation % | Mole % | Mass % |
| Cationic components (Expressed as Oxide) | $P^{5+}$ ($P_2O_5$) | 28.92 | 25.000 | 15.530 | 25.00 | 21.740 | 13.440 |
| | $Bi^{3+}$ ($Bi_2O_3$) | 24.10 | 20.830 | 42.470 | 25.00 | 21.740 | 44.110 |
| | $Nb^{5+}$ ($Nb_2O_5$) | 24.10 | 20.830 | 24.230 | 25.00 | 21.740 | 25.160 |
| | $Ti^{4+}$ ($TiO_2$) | 9.64 | 16.670 | 5.830 | 10.00 | 17.390 | 6.050 |
| | $W^{6+}$ ($WO_3$) | 4.82 | 8.340 | 8.450 | 5.00 | 8.700 | 8.780 |
| | $Li^+$ ($Li_2O$) | 0.00 | 0.000 | 0.000 | 0.00 | 0.000 | 0.000 |
| | $Na^+$ ($Na_2O$) | 1.20 | 1.040 | 0.280 | 6.25 | 5.430 | 1.470 |
| | $K^+$ ($K_2O$) | 2.41 | 2.080 | 0.860 | 0.00 | 0.000 | 0.000 |
| | $B^{3+}$ ($B_2O_3$) | 3.61 | 3.130 | 0.950 | 3.75 | 3.260 | 0.990 |
| | $Ba^{2+}$ ($BaO$) | 1.20 | 2.080 | 1.400 | 0.00 | 0.000 | 0.000 |
| | $Sr^{2+}$ ($SrO$) | 0.00 | 0.000 | 0.000 | 0.00 | 0.000 | 0.000 |
| | $Ca^{2+}$ ($CaO$) | 0.00 | 0.000 | 0.000 | 0.00 | 0.000 | 0.000 |
| | $Mg^{2+}$ ($CaO$) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 62.66 | 66.67 | 80.98 | 65 | 69.57 | 84.1 |
| | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.385 | 0.312 | 0.524 | 0.385 | 0.312 | 0.524 |
| | $Ti^{4+}/(Bi^{3+} + Nb^{5+} + Ti^{4+} + W^{6+})$ | 0.154 | 0.250 | 0.072 | 0.154 | 0.250 | 0.072 |

TABLE 1-continued

|  |  |  |  |  |  |  |
|---|---|---|---|---|---|---|
| TiO$_2$/(Bi$_2$O$_3$ + Nb$_2$O$_5$ + TiO$_2$ + WO$_3$) | | | | | | |
| (Nb$^{5+}$ + Ti$^{4+}$)/(Bi$^{3+}$ + Nb$^{5+}$ + Ti$^{4+}$ + W$^{6+}$) | 0.538 | 0.562 | 0.371 | 0.538 | 0.562 | 0.371 |
| (Nb$_2$O$_5$ + TiO$_2$)/(Bi$_2$O$_3$ + Nb$_2$O$_5$ + TiO$_2$ + WO$_3$) | | | | | | |
| Li$^+$ + Na$^+$ + K$^+$ | 3.61 | 3.12 | 1.14 | 6.25 | 5.43 | 1.47 |
| (Li$_2$O + Na$_2$O + K$_2$O) | | | | | | |
| Na$^+$/(Li$^+$ + Na$^+$ + K$^+$) | 0.33 | 0.333 | 0.246 | 1.00 | 1.000 | 1.000 |
| Na$_2$O/(Li$_2$O + Na$_2$O + K$_2$O) | | | | | | |
| R$_2$O + RO | 4.81 | 5.200 | 2.540 | 6.25 | 5.430 | 1.470 |
| R$_2$O + RO + B | 8.42 | 8.33 | 3.49 | 10.00 | 8.69 | 2.46 |
| P$^{5+}$ + Bi$^{3+}$ + Nb$^{5+}$ + Ti$^{4+}$ + W$^{6+}$ + Li$^+$ + Na$^+$ + K$^+$ + B$^{3+}$ + Si$^{4+}$ + Ba$^{2+}$ | 100.00 | 100.00 | 100.00 | 100.00 | 100.00 | 100.00 |
| (P$_2$O$_5$ + Bi$_2$O$_3$ + Nb$_2$O$_5$ + TiO$_2$ + WO$_3$ + Li$_2$O + Na$_2$O + K$_2$O + B$_2$O$_3$ + SiO$_2$ + BaO) | | | | | | |
| P$^{5+}$ + Bi$^{3+}$ + Nb$^{5+}$ + Ti$^{4+}$ + W$^{6+}$ + Li$^+$ + Na$^+$ + K$^+$ + Si$^{4+}$ + B$^{3+}$ | 98.80 | 97.92 | 98.60 | 100.00 | 100.00 | 100.00 |
| (P$_2$O$_5$ + Bi$_2$O$_3$ + Nb$_2$O$_5$ + TiO$_2$ + WO$_3$ + Li$_2$O + Na$_2$O + K$_2$O + SiO$_2$ + B$_2$O$_3$) | | | | | | |
| K$^+$ + Ba$^{2+}$ | 3.61 | 4.16 | 2.26 | 0.00 | 0.00 | 0.00 |
| (K$_2$O + BaO) | | | | | | |
| K$^+$ + Ba$^{2+}$ + B$^{3+}$ | 7.22 | 7.29 | 3.21 | 3.75 | 3.26 | 0.99 |
| (K$_2$O + BaO + B$_2$O$_3$) | | | | | | |
| Anionic component O$^{2-}$ | | 100 anion % | | | 100 anion % | |

|  |  | No. | | | | | |
|---|---|---|---|---|---|---|---|
|  |  | 5 | | | 6 | | |
|  |  | Cation % | Mole % | Mass % | Cation % | Mole % | Mass % |
| Cationic components (Expressed as Oxide) | P$^{5+}$ (P$_2$O$_5$) | 25.00 | 21.740 | 13.420 | 25.00 | 22.520 | 13.240 |
| | Bi$^{3+}$ (Bi$_2$O$_3$) | 25.00 | 21.740 | 44.050 | 25.00 | 22.520 | 43.460 |
| | Nb$^{5+}$ (Nb$_2$O$_5$) | 25.00 | 21.740 | 25.130 | 29.00 | 26.130 | 28.760 |
| | Ti$^{4+}$ (TiO$_2$) | 10.00 | 17.390 | 6.040 | 6.00 | 10.810 | 3.580 |
| | W$^{6+}$ (WO$_3$) | 5.00 | 8.700 | 8.770 | 5.00 | 9.010 | 8.650 |
| | Li$^+$ (Li$_2$O) | 0.00 | 0.000 | 0.000 | 0.00 | 0.000 | 0.000 |
| | Na$^+$ (Na$_2$O) | 1.25 | 1.090 | 0.290 | 10.00 | 9.010 | 2.310 |
| | K$^+$ (K$_2$O) | 0.00 | 0.000 | 0.000 | 0.00 | 0.000 | 0.000 |
| | B$^{3+}$ (B$_2$O$_3$) | 8.75 | 7.600 | 2.300 | 0.00 | 0.000 | 0.000 |
| | Ba$^{2+}$ (BaO) | 0.00 | 0.000 | 0.000 | 0.00 | 0.000 | 0.000 |
| | Sr$^{2+}$ (SrO) | 0.00 | 0.000 | 0.000 | 0.00 | 0.000 | 0.000 |
| | Ca$^{2+}$ (CaO) | 0.00 | 0.000 | 0.000 | 0.00 | 0.000 | 0.000 |
| | Mg$^{2+}$ (CaO) | 0.00 | 0.000 | 0.000 | 0.00 | 0.000 | 0.000 |
| | Si$^{4+}$ (SiO$_2$) | 0.00 | 0.000 | 0.000 | 0.00 | 0.000 | 0.000 |
| | Zr$^{4+}$ (ZrO$_2$) | 0.00 | 0.000 | 0.000 | 0.00 | 0.000 | 0.000 |
| | Total | 100.00 | 100.000 | 100.000 | 100.00 | 100.000 | 100.000 |
| | Sb$_2$O$_3$ (Note 2) | — | — | 0.1 | — | — | 0.1 |
| | Bi$^{3+}$ + Nb$^{5+}$ + Ti$^{4+}$ + W$^{6+}$ | 65 | 69.57 | 83.99 | 65 | 68.47 | 84.45 |
| | (Bi$_2$O$_3$ + Nb$_2$O$_5$ + TiO$_2$ + WO$_3$) | | | | | | |
| | Bi$^{3+}$/(Bi$^{3+}$ + Nb$^{5+}$ + Ti$^{4+}$ + W$^{6+}$) | 0.385 | 0.312 | 0.524 | 0.385 | 0.329 | 0.515 |
| | Bi$_2$O$_3$/(Bi$_2$O$_3$ + Nb$_2$O$_5$ + TiO$_2$ + WO$_3$) | | | | | | |
| | Ti$^{4+}$/(Bi$^{3+}$ + Nb$^{5+}$ + Ti$^{4+}$ + W$^{6+}$) | 0.154 | 0.250 | 0.072 | 0.092 | 0.158 | 0.042 |
| | TiO$_2$/(Bi$_2$O$_3$ + Nb$_2$O$_5$ + TiO$_2$ + WO$_3$) | | | | | | |
| | (Nb$^{5+}$ + Ti$^{4+}$)/(Bi$^{3+}$ + Nb$^{5+}$ + Ti$^{4+}$ + W$^{6+}$) | 0.538 | 0.562 | 0.371 | 0.538 | 0.540 | 0.383 |
| | (Nb$_2$O$_5$ + TiO$_2$)/(Bi$_2$O$_3$ + Nb$_2$O$_5$ + TiO$_2$ + WO$_3$) | | | | | | |
| | Li$^+$ + Na$^+$ + K$^+$ | 1.25 | 1.09 | 0.29 | 10 | 9.01 | 2.31 |
| | (Li$_2$O + Na$_2$O + K$_2$O) | | | | | | |
| | Na$^+$/(Li$^+$ + Na$^+$ + K$^+$) | 1.00 | 1.000 | 1.000 | 1.00 | 1.000 | 1.000 |
| | Na$_2$O/(Li$_2$O + Na$_2$O + K$_2$O) | | | | | | |
| | R$_2$O + RO | 1.25 | 1.090 | 0.290 | 10.00 | 9.010 | 2.310 |
| | R$_2$O + RO + B | 10.00 | 8.69 | 2.59 | 10.00 | 9.01 | 2.31 |
| | P$^{5+}$ + Bi$^{3+}$ + Nb$^{5+}$ + Ti$^{4+}$ + W$^{6+}$ + Li$^+$ + Na$^+$ + K$^+$ + B$^{3+}$ + Si$^{4+}$ + Ba$^{2+}$ | 100.00 | 100.00 | 100.00 | 100.00 | 100.00 | 100.00 |
| | (P$_2$O$_5$ + Bi$_2$O$_3$ + Nb$_2$O$_5$ + TiO$_2$ + WO$_3$ + Li$_2$O + Na$_2$O + K$_2$O + B$_2$O$_3$ + SiO$_2$ + BaO) | | | | | | |

TABLE 1-continued

|  |  | | | | | | |
|---|---|---|---|---|---|---|---|
| | $P^{5+} + Bi^{3+} + Nb^{5+} + Ti^{4+} + W^{6+} + Li^+ + Na^+ + K^+ + Si^{4+} + B^{3+}$<br>$(P_2O_5 + Bi_2O_3 + Nb_2O_5 + TiO_2 + WO_3 + Li_2O + Na_2O + K_2O +$<br>$SiO_2 + B_2O_3)$ | 100.00 | 100.00 | 100.00 | 100.00 | 100.00 | 100.00 |
| | $K^+ + Ba^{2+}$<br>$(K_2O + BaO)$ | 0.00 | 0.00 | 0.00 | 0.00 | 0.00 | 0.00 |
| | $K^+ + Ba^{2+} + B^{3+}$<br>$(K_2O + BaO + B_2O_3)$ | 8.75 | 7.60 | 2.30 | 0.00 | 0.00 | 0.00 |
| Anionic component | $O^{2-}$ | | 100 anion % | | | 100 anion % | |

|  |  | No. | | | | | |
|---|---|---|---|---|---|---|---|
| | | 7 | | | 8 | | |
| | | Cation % | Mole % | Mass % | Cation % | Mole % | Mass % |
| Cationic components (Expressed as Oxide) | $P^{5+}$<br>$(P_2O_5)$ | 25.00 | 23.590 | 13.230 | 25.00 | 21.740 | 13.320 |
| | $Bi^{3+}$<br>$(Bi_2O_3)$ | 30.00 | 28.300 | 52.140 | 25.00 | 21.740 | 43.730 |
| | $Nb^{5+}$<br>$(Nb_2O_5)$ | 29.00 | 27.360 | 28.750 | 25.00 | 21.740 | 24.950 |
| | $Ti^{4+}$<br>$(TiO_2)$ | 6.00 | 11.320 | 3.570 | 10.00 | 17.380 | 6.000 |
| | $W^{6+}$<br>$(WO_3)$ | 0.00 | 0.000 | 0.000 | 5.00 | 8.700 | 8.700 |
| | $Li^+$<br>$(Li_2O)$ | 0.00 | 0.000 | 0.000 | 0.00 | 0.000 | 0.000 |
| | $Na^+$<br>$(Na_2O)$ | 10.00 | 9.430 | 2.310 | 2.00 | 1.740 | 0.470 |
| | $K^+$<br>$(K_2O)$ | 0.00 | 0.000 | 0.000 | 8.00 | 6.960 | 2.830 |
| | $B^{3+}$<br>$(B_2O_3)$ | 0.00 | 0.000 | 0.000 | 0.00 | 0.000 | 0.000 |
| | $Ba^{2+}$<br>$(BaO)$ | 0.00 | 0.000 | 0.000 | 0.00 | 0.000 | 0.000 |
| | $Sr^{2+}$<br>$(SrO)$ | 0.00 | 0.000 | 0.000 | 0.00 | 0.000 | 0.000 |
| | $Ca^{2+}$<br>$(CaO)$ | 0.00 | 0.000 | 0.000 | 0.00 | 0.000 | 0.000 |
| | $Mg^{2+}$<br>$(CaO)$ | 0.00 | 0.000 | 0.000 | 0.00 | 0.000 | 0.000 |
| | $Si^{4+}$<br>$(SiO_2)$ | 0.00 | 0.000 | 0.000 | 0.00 | 0.000 | 0.000 |
| | $Zr^{4+}$<br>$(ZrO_2)$ | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.1 | — | — | 0.1 |
| | $Bi^{3+} + Nb^{5+} + Ti^{4+} + W^{6+}$<br>$(Bi_2O_3 + Nb_2O_5 + TiO_2 + WO_3)$ | 65 | 66.98 | 84.46 | 65 | 69.56 | 83.38 |
| | $Bi^{3+}/(Bi^{3+} + Nb^{5+} + Ti^{4+} + W^{6+})$<br>$Bi_2O_3/(Bi_2O_3 + Nb_2O_5 + TiO_2 + WO_3)$ | 0.462 | 0.423 | 0.617 | 0.385 | 0.313 | 0.524 |
| | $Ti^{4+}/(Bi^{3+} + Nb^{5+} + Ti^{4+} + W^{6+})$<br>$TiO_2/(Bi_2O_3 + Nb_2O_5 + TiO_2 + WO_3)$ | 0.092 | 0.169 | 0.042 | 0.154 | 0.250 | 0.072 |
| | $(Nb^{5+} + Ti^{4+})/(Bi^{3+} + Nb^{5+} + Ti^{4+} + W^{6+})$<br>$(Nb_2O_5 + TiO_2)/(Bi_2O_3 + Nb_2O_5 + TiO_2 + WO_3)$ | 0.538 | 0.577 | 0.383 | 0.538 | 0.562 | 0.371 |
| | $Li^+ + Na^+ + K^+$<br>$(Li_2O + Na_2O + K_2O)$ | 10 | 9.43 | 2.31 | 10 | 8.7 | 3.3 |
| | $Na^+/(Li^+ + Na^+ + K^+)$<br>$Na_2O/(Li_2O + Na_2O + K_2O)$ | 1.000 | 1.000 | 1.000 | 0.200 | 0.200 | 0.142 |
| | $R_2O + RO$ | 10.00 | 9.430 | 2.310 | 10.00 | 8.700 | 3.300 |
| | $R_2O + RO + B$ | 10.00 | 9.43 | 2.31 | 10.00 | 8.70 | 3.30 |
| | $P^{5+} + Bi^{3+} + Nb^{5+} + Ti^{4+} + W^{6+} + Li^+ + Na^+ + K^+ + B^{3+} + Si^{4+} + Ba^{2+}$<br>$(P_2O_5 + Bi_2O_3 + Nb_2O_5 + TiO_2 + WO_3 + Li_2O + Na_2O + K_2O +$<br>$B_2O_3 + SiO_2 + BaO)$ | 100.00 | 100.00 | 100.00 | 100.00 | 100.00 | 100.00 |
| | $P^{5+} + Bi^{3+} + Nb^{5+} + Ti^{4+} + W^{6+} + Li^+ + Na^+ + K^+ + Si^{4+} + B^{3+}$<br>$(P_2O_5 + Bi_2O_3 + Nb_2O_5 + TiO_2 + WO_3 + Li_2O + Na_2O + K_2O +$<br>$SiO_2 + B_2O_3)$ | 100.00 | 100.00 | 100.00 | 100.00 | 100.00 | 100.00 |
| | $K^+ + Ba^{2+}$<br>$(K_2O + BaO)$ | 0.00 | 0.00 | 0.00 | 8.00 | 6.96 | 2.83 |

TABLE 1-continued

|  |  | | | | | | |
|---|---|---|---|---|---|---|---|
| | $K^+ + Ba^{2+} + B^{3+}$ ($K_2O + BaO + B_2O_3$) | 0.00 | 0.00 | 0.00 | 8.00 | 6.96 | 2.83 |
| Anionic component | $O^{2-}$ | | 100 anion % | | | 100 anion % | |

| | | No. | | | | | |
|---|---|---|---|---|---|---|---|
| | | 9 | | | 10 | | |
| | | Cation % | Mole % | Mass % | Cation % | Mole % | Mass % |
| Cationic components (Expressed as Oxide) | $P^{5+}$ ($P_2O_5$) | 25.00 | 21.740 | 13.490 | 25.00 | 20.330 | 12.520 |
| | $Bi^{3+}$ ($Bi_2O_3$) | 25.00 | 21.740 | 44.270 | 25.00 | 20.330 | 41.110 |
| | $Nb^{5+}$ ($Nb_2O_5$) | 25.00 | 21.740 | 25.250 | 25.00 | 20.330 | 23.450 |
| | $Ti^{4+}$ ($TiO_2$) | 10.00 | 17.380 | 6.070 | 10.00 | 16.250 | 5.640 |
| | $W^{6+}$ ($WO_3$) | 5.00 | 8.700 | 8.810 | 5.00 | 8.120 | 8.180 |
| | $Li^+$ ($Li_2O$) | 2.00 | 1.740 | 0.230 | 0.00 | 0.000 | 0.000 |
| | $Na^+$ ($Na_2O$) | 8.00 | 6.960 | 1.880 | 2.00 | 1.630 | 0.440 |
| | $K^+$ ($K_2O$) | 0.00 | 0.000 | 0.000 | 0.00 | 0.000 | 0.000 |
| | $B^{3+}$ ($B_2O_3$) | 0.00 | 0.000 | 0.000 | 0.00 | 0.000 | 0.000 |
| | $Ba^{2+}$ (BaO) | 0.00 | 0.000 | 0.000 | 8.00 | 13.010 | 8.660 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (CaO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 65 | 69.56 | 84.4 | 65 | 65.03 | 78.38 |
| | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.385 | 0.313 | 0.525 | 0.385 | 0.313 | 0.524 |
| | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.154 | 0.250 | 0.072 | 0.154 | 0.250 | 0.072 |
| | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.538 | 0.562 | 0.371 | 0.538 | 0.563 | 0.371 |
| | $Li^+ + Na^+ + K^+$ ($Li_2O + Na_2O + K_2O$) | 10 | 8.7 | 2.11 | 2 | 1.63 | 0.44 |
| | $Na^+/(Li^+ + Na^+ + K^+)$ $Na_2O/(Li_2O + Na_2O + K_2O)$ | 0.800 | 0.800 | 0.891 | 1.000 | 1.000 | 1.000 |
| | $R_2O + RO$ | 10.00 | 8.700 | 2.110 | 10.00 | 14.640 | 9.100 |
| | $R_2O + RO + B$ | 10.00 | 8.70 | 2.11 | 10.00 | 14.64 | 9.10 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.00 | 100.00 | 92.00 | 86.99 | 91.34 |
| | $K^+ + Ba^{2+}$ ($K_2O + BaO$) | 0.00 | 0.00 | 0.00 | 8.00 | 13.01 | 8.66 |
| | $K^+ + Ba^{2+} + B^{3+}$ ($K_2O + BaO + B_2O_3$) | 0.00 | 0.00 | 0.00 | 8.00 | 13.01 | 8.66 |
| Anionic component | $O^{2-}$ | | 100 anion % | | | 100 anion % | |

| | | No. | | | | | |
|---|---|---|---|---|---|---|---|
| | | 11 | | | 12 | | |
| | | Cation % | Mole % | Mass % | Cation % | Mole % | Mass % |
| Cationic components | $P^{5+}$ ($P_2O_5$) | 25.00 | 21.740 | 13.720 | 27.50 | 23.900 | 15.580 |

TABLE 1-continued

|  |  |  |  |  |  |  |  |
|---|---|---|---|---|---|---|---|
| (Expressed as Oxide) | $Bi^{3+}$ ($Bi_2O_3$) | 25.00 | 21.740 | 45.030 | 22.50 | 19.570 | 41.830 |
|  | $Nb^{5+}$ ($Nb_2O_5$) | 22.50 | 19.560 | 23.120 | 22.50 | 19.570 | 23.870 |
|  | $Ti^{4+}$ ($TiO_2$) | 10.00 | 17.390 | 6.180 | 10.00 | 17.390 | 6.380 |
|  | $W^{6+}$ ($WO_3$) | 5.00 | 8.700 | 8.960 | 5.00 | 8.700 | 9.250 |
|  | $Li^+$ ($Li_2O$) | 0.00 | 0.000 | 0.000 | 0.00 | 0.000 | 0.000 |
|  | $Na^+$ ($Na_2O$) | 12.50 | 10.870 | 2.990 | 12.50 | 10.870 | 3.090 |
|  | $K^+$ ($K_2O$) | 0.00 | 0.000 | 0.000 | 0.00 | 0.000 | 0.000 |
|  | $B^{3+}$ ($B_2O_3$) | 0.00 | 0.000 | 0.000 | 0.00 | 0.000 | 0.000 |
|  | $Ba^{2+}$ (BaO) | 0.00 | 0.000 | 0.000 | 0.00 | 0.000 | 0.000 |
|  | $Sr^{2+}$ (SrO) | 0.00 | 0.000 | 0.000 | 0.00 | 0.000 | 0.000 |
|  | $Ca^{2+}$ (CaO) | 0.00 | 0.000 | 0.000 | 0.00 | 0.000 | 0.000 |
|  | $Mg^{2+}$ (CaO) | 0.00 | 0.000 | 0.000 | 0.00 | 0.000 | 0.000 |
|  | $Si^{4+}$ ($SiO_2$) | 0.00 | 0.000 | 0.000 | 0.00 | 0.000 | 0.000 |
|  | $Zr^{4+}$ ($ZrO_2$) | 0.00 | 0.000 | 0.000 | 0.00 | 0.000 | 0.000 |
|  | Total | 100.00 | 100.000 | 100.000 | 100.00 | 100.000 | 100.000 |
|  | $Sb_2O_3$ (Note 2) | — | — | 0.1 | — | — | 0.1 |
|  | $Bi^{3+} + Nb^{5+} + Ti^{4+} + W^{6+}$ ($Bi_2O_3 + Nb_2O_5 + TiO_2 + WO_3$) | 62.5 | 67.39 | 83.29 | 60 | 65.23 | 81.33 |
|  | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.400 | 0.323 | 0.541 | 0.375 | 0.300 | 0.514 |
|  | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.160 | 0.258 | 0.074 | 0.167 | 0.267 | 0.078 |
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.520 | 0.548 | 0.352 | 0.542 | 0.567 | 0.372 |
|  | $Li^+ + Na^+ + K^+$ ($Li_2O + Na_2O + K_2O$) | 12.5 | 10.87 | 2.99 | 12.5 | 10.87 | 3.09 |
|  | $Na^+/(Li^+ + Na^+ + K^+)$ $Na_2O/(Li_2O + Na_2O + K_2O)$ | 1.000 | 1.000 | 1.000 | 1.000 | 1.000 | 1.000 |
|  | $R_2O + RO$ | 12.50 | 10.870 | 2.990 | 12.50 | 10.870 | 3.090 |
|  | $R_2O + RO + B$ | 12.50 | 10.87 | 2.99 | 12.50 | 10.87 | 3.09 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
|  | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.00 | 100.00 | 100.00 | 100.00 | 100.00 |
|  | $K^+ + Ba^{2+}$ ($K_2O + BaO$) | 0.00 | 0.00 | 0.00 | 0.00 | 0.00 | 0.00 |
|  | $K^+ + Ba^{2+} + B^{3+}$ ($K_2O + BaO + B_2O_3$) | 0.00 | 0.00 | 0.00 | 0.00 | 0.00 | 0.00 |
| Anionic component | $O^{2-}$ |  | 100 anion % |  |  | 100 anion % |  |

|  |  | No. | | | | | |
|---|---|---|---|---|---|---|---|
|  |  | 13 | | | 14 | | |
|  |  | Cation % | Mole % | Mass % | Cation % | Mole % | Mass % |
| Cationic components (Expressed as Oxide) | $P^{5+}$ ($P_2O_5$) | 25.00 | 21.280 | 14.730 | 27.50 | 23.404 | 15.548 |
|  | $Bi^{3+}$ ($Bi_2O_3$) | 20.00 | 17.020 | 38.680 | 22.50 | 19.149 | 41.760 |
|  | $Nb^{5+}$ ($Nb_2O_5$) | 22.50 | 19.150 | 24.820 | 22.50 | 19.149 | 23.822 |
|  | $Ti^{4+}$ ($TiO_2$) | 12.50 | 21.270 | 8.290 | 10.00 | 17.021 | 6.364 |
|  | $W^{6+}$ ($WO_3$) | 5.00 | 8.510 | 9.620 | 5.00 | 8.511 | 9.235 |
|  | $Li^+$ ($Li_2O$) | 0.00 | 0.000 | 0.000 | 0.00 | 0.000 | 0.000 |
|  | $Na^+$ ($Na_2O$) | 15.00 | 12.770 | 3.860 | 10.00 | 8.511 | 2.469 |
|  | $K^+$ ($K_2O$) | 0.00 | 0.000 | 0.000 | 0.00 | 0.000 | 0.000 |

TABLE 1-continued

| | | | | | | | |
|---|---|---|---|---|---|---|---|
| | $B^{3+}$ ($B_2O_3$) | 0.00 | 0.000 | 0.000 | 0.00 | 0.000 | 0.000 |
| | $Ba^{2+}$ (BaO) | 0.00 | 0.000 | 0.000 | 0.00 | 0.000 | 0.000 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (CaO) | 0.00 | 0.000 | 0.000 | 2.50 | 4.255 | 0.803 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 60 | 65.95 | 81.41 | 60 | 63.830 | 81.180 |
| | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.333 | 0.258 | 0.475 | 0.375 | 0.300 | 0.514 |
| | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.208 | 0.323 | 0.102 | 0.167 | 0.267 | 0.078 |
| | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.583 | 0.613 | 0.407 | 0.542 | 0.567 | 0.372 |
| | $Li^+ + Na^+ + K^+$ ($Li_2O + Na_2O + K_2O$) | 15 | 12.77 | 3.86 | 10 | 8.511 | 2.469 |
| | $Na^+/(Li^+ + Na^+ + K^+)$ $Na_2O/(Li_2O + Na_2O + K_2O)$ | 1.000 | 1.000 | 1.000 | 1.000 | 1.000 | 1.000 |
| | $R_2O + RO$ | 15.00 | 12.770 | 3.860 | 12.50 | 12.766 | 3.271 |
| | $R_2O + RO + B$ | 15.00 | 12.77 | 3.86 | 12.50 | 12.77 | 3.27 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 97.50 | 95.74 | 99.20 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.00 | 100.00 | 97.50 | 95.74 | 99.20 |
| | $K^+ + Ba^{2+}$ ($K_2O + BaO$) | 0.00 | 0.00 | 0.00 | 0.00 | 0.00 | 0.00 |
| | $K^+ + Ba^{2+} + B^{3+}$ ($K_2O + BaO + B_2O_3$) | 0.00 | 0.00 | 0.00 | 0.00 | 0.00 | 0.00 |
| Anionic component | $O^{2-}$ | | 100 anion % | | | 100 anion % | |

| | | No. | | | | | |
|---|---|---|---|---|---|---|---|
| | | 15 | | | 16 | | |
| | | Cation % | Mole % | Mass % | Cation % | Mole % | Mass % |
| Cationic components (Expressed as Oxide) | $P^{5+}$ ($P_2O_5$) | 27.50 | 23.404 | 15.500 | 27.50 | 23.404 | 15.355 |
| | $Bi^{3+}$ ($Bi_2O_3$) | 22.50 | 19.149 | 41.629 | 22.50 | 19.149 | 41.240 |
| | $Nb^{5+}$ ($Nb_2O_5$) | 22.50 | 19.149 | 23.748 | 22.50 | 19.149 | 23.526 |
| | $Ti^{4+}$ ($TiO_2$) | 10.00 | 17.021 | 6.344 | 10.00 | 17.021 | 6.284 |
| | $W^{6+}$ ($WO_3$) | 5.00 | 8.511 | 9.206 | 5.00 | 8.511 | 9.120 |
| | $Li^+$ ($Li_2O$) | 0.00 | 0.000 | 0.000 | 0.00 | 0.000 | 0.000 |
| | $Na^+$ ($Na_2O$) | 10.00 | 8.511 | 2.461 | 10.00 | 8.511 | 2.438 |
| | $K^+$ ($K_2O$) | 0.00 | 0.000 | 0.000 | 0.00 | 0.000 | 0.000 |
| | $B^{3+}$ ($B_2O_3$) | 0.00 | 0.000 | 0.000 | 0.00 | 0.000 | 0.000 |
| | $Ba^{2+}$ (BaO) | 0.00 | 0.000 | 0.000 | 0.00 | 0.000 | 0.000 |
| | $Sr^{2+}$ (SrO) | 0.00 | 0.000 | 0.000 | 2.50 | 4.255 | 2.038 |
| | $Ca^{2+}$ (CaO) | 2.50 | 4.255 | 1.113 | 0.00 | 0.000 | 0.000 |
| | $Mg^{2+}$ | 0.00 | 0.000 | 0.000 | 0.00 | 0.000 | 0.000 |

TABLE 1-continued

| | | | | | | | |
|---|---|---|---|---|---|---|---|
| (CaO) | | | | | | | |
| Si⁴⁺ | | 0.00 | 0.000 | 0.000 | 0.00 | 0.000 | 0.000 |
| (SiO₂) | | | | | | | |
| Zr⁴⁺ | | 0.00 | 0.000 | 0.000 | 0.00 | 0.000 | 0.000 |
| (ZrO₂) | | | | | | | |
| Total | | 100.00 | 100.000 | 100.000 | 100.00 | 100.000 | 100.000 |
| Sb₂O₃ (Note 2) | | — | — | 0.1 | — | — | 0.1 |
| Bi³⁺ + Nb⁵⁺ + Ti⁴⁺ + W⁶⁺ (Bi₂O₃ + Nb₂O₅ + TiO₂ + WO₃) | | 60 | 63.830 | 80.926 | 60 | 63.830 | 80.169 |
| Bi³⁺/(Bi³⁺ + Nb⁵⁺ + Ti⁴⁺ + W⁶⁺) Bi₂O₃/(Bi₂O₃ + Nb₂O₅ + TiO₂ + WO₃) | | 0.375 | 0.300 | 0.514 | 0.375 | 0.300 | 0.514 |
| Ti⁴⁺/(Bi³⁺ + Nb⁵⁺ + Ti⁴⁺ + W⁶⁺) TiO₂/(Bi₂O₃ + Nb₂O₅ + TiO₂ + WO₃) | | 0.167 | 0.267 | 0.078 | 0.167 | 0.267 | 0.078 |
| (Nb⁵⁺ + Ti⁴⁺)/(Bi³⁺ + Nb⁵⁺ + Ti⁴⁺ + W⁶⁺) (Nb₂O₅ + TiO₂)/(Bi₂O₃ + Nb₂O₅ + TiO₂ + WO₃) | | 0.542 | 0.567 | 0.372 | 0.542 | 0.567 | 0.372 |
| Li⁺ + Na⁺ + K⁺ (Li₂O + Na₂O + K₂O) | | 10 | 8.511 | 2.461 | 10 | 8.511 | 2.44 |
| Na⁺/(Li⁺ + Na⁺ + K⁺) Na₂O/(Li₂O + Na₂O + K₂O) | | 1.000 | 1.000 | 1.000 | 1.000 | 1.000 | 1.000 |
| R₂O + RO | | 12.50 | 12.766 | 3.574 | 12.50 | 12.766 | 4.476 |
| R₂O + RO + B | | 12.50 | 12.77 | 3.57 | 12.50 | 12.77 | 4.48 |
| P⁵⁺ + Bi³⁺ + Nb⁵⁺ + Ti⁴⁺ + W⁶⁺ + Li⁺ + Na⁺ + K⁺ + B³⁺ + Si⁴⁺ + Ba²⁺ (P₂O₅ + Bi₂O₃ + Nb₂O₅ + TiO₂ + WO₃ + Li₂O + Na₂O + K₂O + B₂O₃ + SiO₂ + BaO) | | 97.50 | 95.74 | 98.89 | 97.50 | 95.74 | 97.96 |
| P⁵⁺ + Bi³⁺ + Nb⁵⁺ + Ti⁴⁺ + W⁶⁺ + Li⁺ + Na⁺ + K⁺ + Si⁴⁺ + B³⁺ (P₂O₅ + Bi₂O₃ + Nb₂O₅ + TiO₂ + WO₃ + Li₂O + Na₂O + K₂O + SiO₂ + B₂O₃) | | 97.50 | 95.74 | 98.89 | 97.50 | 95.74 | 97.96 |
| K⁺ + Ba²⁺ (K₂O + BaO) | | 0.00 | 0.00 | 0.00 | 0.00 | 0.00 | 0.00 |
| K⁺ + Ba²⁺ + B³⁺ (K₂O + BaO + B₂O₃) | | 0.00 | 0.00 | 0.00 | 0.00 | 0.00 | 0.00 |
| Anionic component | O²⁻ | | 100 anion % | | | 100 anion % | |

| | | No. | | | | | |
|---|---|---|---|---|---|---|---|
| | | 17 | | | 18 | | |
| | | Cation % | Mole % | Mass % | Cation % | Mole % | Mass % |
| Cationic components (Expressed as Oxide) | P⁵⁺ (P₂O₅) | 27.50 | 23.404 | 15.206 | 27.50 | 23.900 | 15.550 |
| | Bi³⁺ (Bi₂O₃) | 22.50 | 19.149 | 40.841 | 22.50 | 19.570 | 41.770 |
| | Nb⁵⁺ (Nb₂O₅) | 22.50 | 19.149 | 23.298 | 22.50 | 19.570 | 23.830 |
| | Ti⁴⁺ (TiO₂) | 10.00 | 17.021 | 6.224 | 10.00 | 17.390 | 6.370 |
| | W⁶⁺ (WO₃) | 5.00 | 8.511 | 9.031 | 5.00 | 8.700 | 9.240 |
| | Li⁺ (Li₂O) | 0.00 | 0.000 | 0.000 | 0.00 | 0.000 | 0.000 |
| | Na⁺ (Na₂O) | 10.00 | 8.511 | 2.414 | 7.50 | 6.520 | 1.850 |
| | K⁺ (K₂O) | 0.00 | 0.000 | 0.000 | 0.00 | 0.000 | 0.000 |
| | B³⁺ (B₂O₃) | 0.00 | 0.000 | 0.000 | 5.00 | 4.350 | 1.390 |
| | Ba²⁺ (BaO) | 2.50 | 4.255 | 2.986 | 0.00 | 0.000 | 0.000 |
| | Sr²⁺ (SrO) | 0.00 | 0.000 | 0.000 | 0.00 | 0.000 | 0.000 |
| | Ca²⁺ (CaO) | 0.00 | 0.000 | 0.000 | 0.00 | 0.000 | 0.000 |
| | Mg²⁺ (CaO) | 0.00 | 0.000 | 0.000 | 0.00 | 0.000 | 0.000 |
| | Si⁴⁺ (SiO₂) | 0.00 | 0.000 | 0.000 | 0.00 | 0.000 | 0.000 |
| | Zr⁴⁺ (ZrO₂) | 0.00 | 0.000 | 0.000 | 0.00 | 0.000 | 0.000 |
| | Total | 100.00 | 100.000 | 100.000 | 100.00 | 100.000 | 100.000 |
| | Sb₂O₃ (Note 2) | — | — | 0.1 | — | — | 0.1 |
| | Bi³⁺ + Nb⁵⁺ + Ti⁴⁺ + W⁶⁺ (Bi₂O₃ + Nb₂O₅ + TiO₂ + WO₃) | 60 | 63.830 | 79.393 | 60 | 65.23 | 81.21 |
| | Bi³⁺/(Bi³⁺ + Nb⁵⁺ + Ti⁴⁺ + W⁶⁺) Bi₂O₃/(Bi₂O₃ + Nb₂O₅ + TiO₂ + WO₃) | 0.375 | 0.300 | 0.514 | 0.375 | 0.300 | 0.514 |
| | Ti⁴⁺/(Bi³⁺ + Nb⁵⁺ + Ti⁴⁺ + W⁶⁺) TiO₂/(Bi₂O₃ + Nb₂O₅ + TiO₂ + WO₃) | 0.167 | 0.267 | 0.078 | 0.167 | 0.267 | 0.078 |

TABLE 1-continued

|  |  |  |  |  |  |  |  |
|---|---|---|---|---|---|---|---|
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.542 | 0.567 | 0.372 | 0.542 | 0.567 | 0.372 |
|  | $Li^+ + Na^+ + K^+$ $(Li_2O + Na_2O + K_2O)$ | 10 | 8.511 | 2.414 | 7.5 | 6.52 | 1.85 |
|  | $Na^+/(Li^+ + Na^+ + K^+)$ $Na_2O/(Li_2O + Na_2O + K_2O)$ | 1.000 | 1.000 | 1.000 | 1.000 | 1.000 | 1.000 |
|  | $R_2O + RO$ | 12.50 | 12.766 | 5.401 | 7.50 | 6.520 | 1.850 |
|  | $R_2O + RO + B$ | 12.50 | 12.77 | 5.40 | 12.50 | 10.87 | 3.24 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ $(P_2O_5 + Bi_2O_3 + Nb_2O_5 + TiO_2 + WO_3 + Li_2O + Na_2O + K_2O + B_2O_3 + SiO_2 + BaO)$ | 100.00 | 100.00 | 100.00 | 100.00 | 100.00 | 100.00 |
|  | $P^{5+} + Bi^{3+} + Nb^{5+} + Ti^{4+} + W^{6+} + Li^+ + Na^+ + K^+ + Si^{4+} + B^{3+}$ $(P_2O_5 + Bi_2O_3 + Nb_2O_5 + TiO_2 + WO_3 + Li_2O + Na_2O + K_2O + SiO_2 + B_2O_3)$ | 97.50 | 95.74 | 97.01 | 100.00 | 100.00 | 100.00 |
|  | $K^+ + Ba^{2+}$ $(K_2O + BaO)$ | 2.50 | 4.26 | 2.99 | 0.00 | 0.00 | 0.00 |
|  | $K^+ + Ba^{2+} + B^{3+}$ $(K_2O + BaO + B_2O_3)$ | 2.50 | 4.26 | 2.99 | 5.00 | 4.35 | 1.39 |
| Anionic component | $O^{2-}$ |  | 100 anion % |  |  | 100 anion % |  |

| | | No. 19 | | | No. 20 | | |
|---|---|---|---|---|---|---|---|
| | | Cation % | Mole % | Mass % | Cation % | Mole % | Mass % |
| Cationic components (Expressed as Oxide) | $P^{5+}$ $(P_2O_5)$ | 27.50 | 22.920 | 14.850 | 27.50 | 23.670 | 16.150 |
| | $Bi^{3+}$ $(Bi_2O_3)$ | 22.50 | 18.750 | 39.890 | 20.00 | 17.200 | 38.550 |
| | $Nb^{5+}$ $(Nb_2O_5)$ | 22.50 | 18.750 | 22.760 | 22.50 | 19.350 | 24.740 |
| | $Ti^{4+}$ $(TiO_2)$ | 10.00 | 16.670 | 6.080 | 11.25 | 19.350 | 7.440 |
| | $W^{6+}$ $(WO_3)$ | 5.00 | 8.330 | 8.820 | 5.00 | 8.600 | 9.590 |
| | $Li^+$ $(Li_2O)$ | 0.00 | 0.000 | 0.000 | 0.00 | 0.000 | 0.000 |
| | $Na^+$ $(Na_2O)$ | 7.50 | 6.250 | 1.770 | 13.75 | 11.830 | 3.530 |
| | $K^+$ $(K_2O)$ | 0.00 | 0.000 | 0.000 | 0.00 | 0.000 | 0.000 |
| | $B^{3+}$ $(B_2O_3)$ | 0.00 | 0.000 | 0.000 | 0.00 | 0.000 | 0.000 |
| | $Ba^{2+}$ $(BaO)$ | 5.00 | 8.330 | 5.830 | 0.00 | 0.000 | 0.000 |
| | $Sr^{2+}$ $(SrO)$ | 0.00 | 0.000 | 0.000 | 0.00 | 0.000 | 0.000 |
| | $Ca^{2+}$ $(CaO)$ | 0.00 | 0.000 | 0.000 | 0.00 | 0.000 | 0.000 |
| | $Mg^{2+}$ $(CaO)$ | 0.00 | 0.000 | 0.000 | 0.00 | 0.000 | 0.000 |
| | $Si^{4+}$ $(SiO_2)$ | 0.00 | 0.000 | 0.000 | 0.00 | 0.000 | 0.000 |
| | $Zr^{4+}$ $(ZrO_2)$ | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.1 | — | — | 0.1 |
| | $Bi^{3+} + Nb^{5+} + Ti^{4+} + W^{6+}$ $(Bi_2O_3 + Nb_2O_5 + TiO_2 + WO_3)$ | 60 | 62.5 | 77.55 | 58.75 | 64.5 | 80.32 |
| | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.375 | 0.300 | 0.514 | 0.340 | 0.267 | 0.480 |
| | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.167 | 0.267 | 0.078 | 0.191 | 0.300 | 0.093 |
| | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.542 | 0.567 | 0.372 | 0.574 | 0.600 | 0.401 |
| | $Li^+ + Na^+ + K^+$ $(Li_2O + Na_2O + K_2O)$ | 7.5 | 6.25 | 1.77 | 13.75 | 11.83 | 3.53 |
| | $Na^+/(Li^+ + Na^+ + K^+)$ $Na_2O/(Li_2O + Na_2O + K_2O)$ | 1.000 | 1.000 | 1.000 | 1.000 | 1.000 | 1.000 |
| | $R_2O + RO$ | 12.50 | 14.580 | 7.600 | 13.75 | 11.830 | 3.530 |
| | $R_2O + RO + B$ | 12.50 | 14.58 | 7.60 | 13.75 | 11.83 | 3.53 |
| | $P^{5+} + Bi^{3+} + Nb^{5+} + Ti^{4+} + W^{6+} + Li^+ + Na^+ + K^+ + B^{3+} + Si^{4+} + Ba^{2+}$ $(P_2O_5 + Bi_2O_3 + Nb_2O_5 + TiO_2 + WO_3 + Li_2O + Na_2O + K_2O + B_2O_3 + SiO_2 + BaO)$ | 100.00 | 100.00 | 100.00 | 100.00 | 100.00 | 100.00 |
| | $P^{5+} + Bi^{3+} + Nb^{5+} + Ti^{4+} + W^{6+} + Li^+ + Na^+ + K^+ + Si^{4+} + B^{3+}$ $(P_2O_5 + Bi_2O_3 + Nb_2O_5 + TiO_2 + WO_3 + Li_2O + Na_2O + K_2O + SiO_2 + B_2O_3)$ | 95.00 | 91.67 | 94.17 | 100.00 | 100.00 | 100.00 |

TABLE 1-continued

|  |  |  |  |  |  |  |
|---|---|---|---|---|---|---|
|  | $K^+ + Ba^{2+}$ ($K_2O + BaO$) | 5.00 | 8.33 | 5.83 | 0.00 | 0.00 | 0.00 |
|  | $K^+ + Ba^{2+} + B^{3+}$ ($K_2O + BaO + B_2O_3$) | 5.00 | 8.33 | 5.83 | 0.00 | 0.00 | 0.00 |
| Anionic component | $O^{2-}$ | 100 anion % | | | 100 anion % | | |

| | | No. 21 | | | No. 22 | | |
|---|---|---|---|---|---|---|---|
| | | Cation % | Mole % | Mass % | Cation % | Mole % | Mass % |
| Cationic components (Expressed as Oxide) | $P^{5+}$ ($P_2O_5$) | 27.50 | 23.670 | 16.110 | 27.50 | 23.670 | 16.100 |
| | $Bi^{3+}$ ($Bi_2O_3$) | 20.00 | 17.200 | 38.460 | 20.00 | 17.200 | 38.430 |
| | $Nb^{5+}$ ($Nb_2O_5$) | 22.50 | 19.350 | 24.680 | 22.50 | 19.350 | 24.670 |
| | $Ti^{4+}$ ($TiO_2$) | 11.25 | 19.350 | 7.420 | 11.25 | 19.350 | 7.410 |
| | $W^{6+}$ ($WO_3$) | 5.00 | 8.600 | 9.570 | 5.00 | 8.600 | 9.560 |
| | $Li^+$ ($Li_2O$) | 0.00 | 0.000 | 0.000 | 0.00 | 0.000 | 0.000 |
| | $Na^+$ ($Na_2O$) | 6.25 | 5.380 | 1.600 | 3.75 | 3.230 | 0.960 |
| | $K^+$ ($K_2O$) | 0.00 | 0.000 | 0.000 | 0.00 | 0.000 | 0.000 |
| | $B^{3+}$ ($B_2O_3$) | 7.50 | 6.450 | 2.160 | 10.00 | 8.600 | 2.870 |
| | $Ba^{2+}$ (BaO) | 0.00 | 0.000 | 0.000 | 0.00 | 0.000 | 0.000 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (CaO) | 0.00 | 0.000 | 0.000 | 0.00 | 0.000 | 0.000 |
| | $Si^{4+}$ ($SiO_2$) | 0.00 | 0.000 | 0.000 | 0.00 | 0.000 | 0.000 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.1 | — | — | 0.1 |
| | $Bi^{3+} + Nb^{5+} + Ti^{4+} + W^{6+}$ ($Bi_2O_3 + Nb_2O_5 + TiO_2 + WO_3$) | 58.75 | 64.5 | 80.13 | 58.75 | 64.5 | 80.07 |
| | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.340 | 0.267 | 0.480 | 0.340 | 0.267 | 0.480 |
| | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.191 | 0.300 | 0.093 | 0.191 | 0.300 | 0.093 |
| | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.574 | 0.600 | 0.401 | 0.574 | 0.600 | 0.401 |
| | $Li^+ + Na^+ + K^+$ ($Li_2O + Na_2O + K_2O$) | 6.25 | 5.38 | 1.6 | 3.75 | 3.23 | 0.96 |
| | $Na^+/(Li^+ + Na^+ + K^+)$ $Na_2O/(Li_2O + Na_2O + K_2O)$ | 1.000 | 1.000 | 1.000 | 1.000 | 1.000 | 1.000 |
| | $R_2O + RO$ | 6.25 | 5.380 | 1.600 | 3.75 | 3.230 | 0.960 |
| | $R_2O + RO + B$ | 13.75 | 11.83 | 3.76 | 13.75 | 11.83 | 3.83 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.00 | 100.00 | 100.00 | 100.00 | 100.00 |

TABLE 1-continued

|  |  |  |  |  |  |  |  |
|---|---|---|---|---|---|---|---|
|  | K$^+$ + Ba$^{2+}$ (K$_2$O + BaO) |  | 0.00 | 0.00 | 0.00 | 0.00 | 0.00 | 0.00 |
|  | K$^+$ + Ba$^{2+}$ + B$^{3+}$ (K$_2$O + BaO + B$_2$O$_3$) |  | 7.50 | 6.45 | 2.16 | 10.00 | 8.60 | 2.87 |
| Anionic component | O$^{2-}$ |  | 100 anion % | | | 100 anion % | | |

|  |  | No. | | | | | |
|---|---|---|---|---|---|---|---|
|  |  | 23 | | | 24 | | |
|  |  | Cation % | Mole % | Mass % | Cation % | Mole % | Mass % |
| Cationic components (Expressed as Oxide) | P$^{5+}$ (P$_2$O$_5$) | 27.49 | 23.520 | 16.350 | 27.49 | 23.140 | 15.990 |
|  | Bi$^{3+}$ (Bi$_2$O$_3$) | 20.00 | 17.110 | 39.030 | 20.00 | 16.820 | 38.170 |
|  | Nb$^{5+}$ (Nb$_2$O$_5$) | 21.88 | 18.720 | 24.350 | 21.88 | 18.400 | 23.820 |
|  | Ti$^{4+}$ (TiO$_2$) | 12.50 | 21.390 | 8.360 | 12.50 | 21.030 | 8.180 |
|  | W$^{6+}$ (WO$_3$) | 4.38 | 7.490 | 8.500 | 4.38 | 7.360 | 8.310 |
|  | Li$^+$ (Li$_2$O) | 3.00 | 2.570 | 0.380 | 1.00 | 0.840 | 0.120 |
|  | Na$^+$ (Na$_2$O) | 3.25 | 2.780 | 0.840 | 5.25 | 4.420 | 1.330 |
|  | K$^+$ (K$_2$O) | 0.00 | 0.000 | 0.000 | 0.00 | 0.000 | 0.000 |
|  | B$^{3+}$ (B$_2$O$_3$) | 7.50 | 6.420 | 2.190 | 5.50 | 4.630 | 1.570 |
|  | Ba$^{2+}$ (BaO) | 0.00 | 0.000 | 0.000 | 2.00 | 3.360 | 2.510 |
|  | Sr$^{2+}$ (SrO) | 0.00 | 0.000 | 0.000 | 0.00 | 0.000 | 0.000 |
|  | Ca$^{2+}$ (CaO) | 0.00 | 0.000 | 0.000 | 0.00 | 0.000 | 0.000 |
|  | Mg$^{2+}$ (CaO) | 0.00 | 0.000 | 0.000 | 0.00 | 0.000 | 0.000 |
|  | Si$^{4+}$ (SiO$_2$) | 0.00 | 0.000 | 0.000 | 0.00 | 0.000 | 0.000 |
|  | Zr$^{4+}$ (ZrO$_2$) | 0.00 | 0.000 | 0.000 | 0.00 | 0.000 | 0.000 |
|  | Total | 100.00 | 100.000 | 100.000 | 100.00 | 100.000 | 100.000 |
|  | Sb$_2$O$_3$ (Note 2) | — | — | 0.1 | — | — | 0.1 |
|  | Bi$^{3+}$ + Nb$^{5+}$ + Ti$^{4+}$ + W$^{6+}$ (Bi$_2$O$_3$ + Nb$_2$O$_5$ + TiO$_2$ + WO$_3$) | 58.76 | 64.71 | 80.24 | 58.76 | 63.61 | 78.48 |
|  | Bi$^{3+}$/(Bi$^{3+}$ + Nb$^{5+}$ + Ti$^{4+}$ + W$^{6+}$) Bi$_2$O$_3$/(Bi$_2$O$_3$ + Nb$_2$O$_5$ + TiO$_2$ + WO$_3$) | 0.340 | 0.264 | 0.486 | 0.340 | 0.264 | 0.486 |
|  | Ti$^{4+}$/(Bi$^{3+}$ + Nb$^{5+}$ + Ti$^{4+}$ + W$^{6+}$) TiO$_2$/(Bi$_2$O$_3$ + Nb$_2$O$_5$ + TiO$_2$ + WO$_3$) | 0.213 | 0.331 | 0.104 | 0.213 | 0.331 | 0.104 |
|  | (Nb$^{5+}$ + Ti$^{4+}$)/(Bi$^{3+}$ + Nb$^{5+}$ + Ti$^{4+}$ + W$^{6+}$) (Nb$_2$O$_5$ + TiO$_2$)/(Bi$_2$O$_3$ + Nb$_2$O$_5$ + TiO$_2$ + WO$_3$) | 0.585 | 0.620 | 0.408 | 0.585 | 0.620 | 0.408 |
|  | Li$^+$ + Na$^+$ + K$^+$ (Li$_2$O + Na$_2$O + K$_2$O) | 6.25 | 5.35 | 1.22 | 6.25 | 5.26 | 1.45 |
|  | Na$^+$/(Li$^+$ + Na$^+$ + K$^+$) Na$_2$O/(Li$_2$O + Na$_2$O + K$_2$O) | 0.520 | 0.520 | 0.689 | 0.840 | 0.840 | 0.917 |
|  | R$_2$O + RO | 6.25 | 5.350 | 1.220 | 8.25 | 8.620 | 3.960 |
|  | R$_2$O + RO + B | 13.75 | 11.77 | 3.41 | 13.75 | 13.25 | 5.53 |
|  | P$^{5+}$ + Bi$^{3+}$ + Nb$^{5+}$ + Ti$^{4+}$ + W$^{6+}$ + Li$^+$ + Na$^+$ + K$^+$ + B$^{3+}$ + Si$^{4+}$ + Ba$^{2+}$ (P$_2$O$_5$ + Bi$_2$O$_3$ + Nb$_2$O$_5$ + TiO$_2$ + WO$_3$ + Li$_2$O + Na$_2$O + K$_2$O + B$_2$O$_3$ + SiO$_2$ + BaO) | 100.00 | 100.00 | 100.00 | 100.00 | 100.00 | 100.00 |
|  | P$^{5+}$ + Bi$^{3+}$ + Nb$^{5+}$ + Ti$^{4+}$ + W$^{6+}$ + Li$^+$ + Na$^+$ + K$^+$ + Si$^{4+}$ + B$^{3+}$ (P$_2$O$_5$ + Bi$_2$O$_3$ + Nb$_2$O$_5$ + TiO$_2$ + WO$_3$ + Li$_2$O + Na$_2$O + K$_2$O + SiO$_2$ + B$_2$O$_3$) | 100.00 | 100.00 | 100.00 | 98.00 | 96.64 | 97.49 |

TABLE 1-continued

|  |  |  |  |  |  |  |  |
|---|---|---|---|---|---|---|---|
|  | $K^+ + Ba^{2+}$ ($K_2O + BaO$) |  | 0.00 | 0.00 | 0.00 | 2.00 | 3.36 | 2.51 |
|  | $K^+ + Ba^{2+} + B^{3+}$ ($K_2O + BaO + B_2O_3$) |  | 7.50 | 6.42 | 2.19 | 7.50 | 7.99 | 4.08 |
| Anionic component | $O^{2-}$ |  | 100 anion % | | | 100 anion % | | |

|  |  | No. | | | | | |
|---|---|---|---|---|---|---|---|
|  |  | 25 | | | 26 | | |
|  |  | Cation % | Mole % | Mass % | Cation % | Mole % | Mass % |
| Cationic components (Expressed as Oxide) | $P^{5+}$ ($P_2O_5$) | 28.50 | 24.520 | 15.630 | 28.64 | 24.510 | 15.270 |
|  | $Bi^{3+}$ ($Bi_2O_3$) | 24.00 | 20.650 | 43.220 | 25.00 | 21.380 | 43.740 |
|  | $Nb^{5+}$ ($Nb_2O_5$) | 22.50 | 19.350 | 23.110 | 23.44 | 20.040 | 23.400 |
|  | $Ti^{4+}$ ($TiO_2$) | 11.25 | 19.350 | 6.950 | 11.72 | 20.040 | 7.030 |
|  | $W^{6+}$ ($WO_3$) | 5.00 | 8.600 | 8.960 | 5.21 | 8.910 | 9.070 |
|  | $Li^+$ ($Li_2O$) | 0.00 | 0.000 | 0.000 | 0.00 | 0.000 | 0.000 |
|  | $Na^+$ ($Na_2O$) | 7.75 | 6.670 | 1.860 | 2.86 | 2.450 | 0.670 |
|  | $K^+$ ($K_2O$) | 0.00 | 0.000 | 0.000 | 0.00 | 0.000 | 0.000 |
|  | $B^{3+}$ ($B_2O_3$) | 1.00 | 0.860 | 0.270 | 3.13 | 2.670 | 0.820 |
|  | $Ba^{2+}$ (BaO) | 0.00 | 0.000 | 0.000 | 0.00 | 0.000 | 0.000 |
|  | $Sr^{2+}$ (SrO) | 0.00 | 0.000 | 0.000 | 0.00 | 0.000 | 0.000 |
|  | $Ca^{2+}$ (CaO) | 0.00 | 0.000 | 0.000 | 0.00 | 0.000 | 0.000 |
|  | $Mg^{2+}$ (CaO) | 0.00 | 0.000 | 0.000 | 0.00 | 0.000 | 0.000 |
|  | $Si^{4+}$ ($SiO_2$) | 0.00 | 0.000 | 0.000 | 0.00 | 0.000 | 0.000 |
|  | $Zr^{4+}$ ($ZrO_2$) | 0.00 | 0.000 | 0.000 | 0.00 | 0.000 | 0.000 |
|  | Total | 100.00 | 100.000 | 100.000 | 100.00 | 100.000 | 100.000 |
|  | $Sb_2O_3$ (Note 2) | — | — | 0.1 | — | — | 0.1 |
|  | $Bi^{3+} + Nb^{5+} + Ti^{4+} + W^{6+}$ ($Bi_2O_3 + Nb_2O_5 + TiO_2 + WO_3$) | 62.75 | 67.95 | 82.24 | 65.37 | 70.37 | 83.24 |
|  | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.382 | 0.304 | 0.526 | 0.382 | 0.304 | 0.525 |
|  | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.179 | 0.285 | 0.085 | 0.179 | 0.285 | 0.084 |
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.538 | 0.570 | 0.366 | 0.538 | 0.570 | 0.366 |
|  | $Li^+ + Na^+ + K^+$ ($Li_2O + Na_2O + K_2O$) | 7.75 | 6.67 | 1.86 | 2.86 | 2.45 | 0.67 |
|  | $Na^+/(Li^+ + Na^+ + K^+)$ $Na_2O/(Li_2O + Na_2O + K_2O)$ | 1.000 | 1.000 | 1.000 | 1.000 | 1.000 | 1.000 |
|  | $R_2O + RO$ | 7.75 | 6.670 | 1.860 | 2.86 | 2.450 | 0.670 |
|  | $R_2O + RO + B$ | 8.75 | 7.53 | 2.13 | 5.99 | 5.12 | 1.49 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
|  | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.00 | 100.00 | 100.00 | 100.00 | 100.00 |

TABLE 1-continued

|  |  |  |  |  |  |  |  |
|---|---|---|---|---|---|---|---|
|  | $K^+ + Ba^{2+}$ ($K_2O + BaO$) | 0.00 | 0.00 | 0.00 | 0.00 | 0.00 | 0.00 |
|  | $K^+ + Ba^{2+} + B^{3+}$ ($K_2O + BaO + B_2O_3$) | 1.00 | 0.86 | 0.27 | 3.13 | 2.67 | 0.82 |
| Anionic component | $O^{2-}$ | | 100 anion % | | | 100 anion % | |

|  |  | No. | | | | | |
|---|---|---|---|---|---|---|---|
|  |  | 27 | | | 28 | | |
|  |  | Cation % | Mole % | Mass % | Cation % | Mole % | Mass % |
| Cationic components (Expressed as Oxide) | $P^{5+}$ ($P_2O_5$) | 27.13 | 23.131 | 14.322 | 27.60 | 23.397 | 14.716 |
|  | $Bi^{3+}$ ($Bi_2O_3$) | 25.52 | 21.757 | 44.224 | 25.00 | 21.192 | 43.758 |
|  | $Nb^{5+}$ ($Nb_2O_5$) | 23.94 | 20.411 | 23.667 | 23.44 | 19.869 | 23.404 |
|  | $Ti^{4+}$ ($TiO_2$) | 11.97 | 20.411 | 7.112 | 11.72 | 19.869 | 7.034 |
|  | $W^{6+}$ ($WO_3$) | 5.32 | 9.072 | 9.174 | 5.21 | 8.833 | 9.074 |
|  | $Li^+$ ($Li_2O$) | 0.00 | 0.000 | 0.000 | 0.00 | 0.000 | 0.000 |
|  | $Na^+$ ($Na_2O$) | 2.93 | 2.498 | 0.675 | 0.78 | 0.661 | 0.182 |
|  | $K^+$ ($K_2O$) | 0.00 | 0.000 | 0.000 | 0.00 | 0.000 | 0.000 |
|  | $B^{3+}$ ($B_2O_3$) | 3.19 | 2.720 | 0.826 | 5.21 | 4.416 | 1.363 |
|  | $Ba^{2+}$ (BaO) | 0.00 | 0.000 | 0.000 | 0.00 | 0.000 | 0.000 |
|  | $Sr^{2+}$ (SrO) | 0.00 | 0.000 | 0.000 | 0.00 | 0.000 | 0.000 |
|  | $Ca^{2+}$ (CaO) | 0.00 | 0.000 | 0.000 | 0.00 | 0.000 | 0.000 |
|  | $Mg^{2+}$ (CaO) | 0.00 | 0.000 | 0.000 | 0.00 | 0.000 | 0.000 |
|  | $Si^{4+}$ ($SiO_2$) | 0.00 | 0.000 | 0.000 | 1.04 | 1.763 | 0.469 |
|  | $Zr^{4+}$ ($ZrO_2$) | 0.00 | 0.000 | 0.000 | 0.00 | 0.000 | 0.000 |
|  | Total | 100.00 | 100.000 | 100.000 | 100.00 | 100.000 | 100.000 |
|  | $Sb_2O_3$ (Note 2) | — | — | 0.1 | — | — | 0.1 |
|  | $Bi^{3+} + Nb^{5+} + Ti^{4+} + W^{6+}$ ($Bi_2O_3 + Nb_2O_5 + TiO_2 + WO_3$) | 66.75 | 71.651 | 84.177 | 65.37 | 69.763 | 83.27 |
|  | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.382 | 0.304 | 0.525 | 0.382 | 0.304 | 0.525 |
|  | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.179 | 0.285 | 0.084 | 0.179 | 0.285 | 0.084 |
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.538 | 0.570 | 0.366 | 0.538 | 0.570 | 0.366 |
|  | $Li^+ + Na^+ + K^+$ ($Li_2O + Na_2O + K_2O$) | 2.93 | 2.498 | 0.68 | 0.78 | 0.661 | 0.18 |
|  | $Na^+/(Li^+ + Na^+ + K^+)$ $Na_2O/(Li_2O + Na_2O + K_2O)$ | 1.000 | 1.000 | 1.000 | 1.000 | 1.000 | 1.000 |
|  | $R_2O + RO$ | 2.93 | 2.498 | 0.675 | 0.78 | 0.661 | 0.182 |
|  | $R_2O + RO + B$ | 6.12 | 5.22 | 1.50 | 5.99 | 5.08 | 1.55 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
|  | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.00 | 100.00 | 100.00 | 100.00 | 100.00 |

TABLE 1-continued

|  |  |  |  |  |  |  |  |
|---|---|---|---|---|---|---|---|
|  | $K^+ + Ba^{2+}$ ($K_2O + BaO$) | 0.00 | 0.00 | 0.00 | 0.00 | 0.00 | 0.00 |
|  | $K^+ + Ba^{2+} + B^{3+}$ ($K_2O + BaO + B_2O_3$) | 3.19 | 2.72 | 0.83 | 5.21 | 4.42 | 1.36 |
| Anionic component | $O^{2-}$ | 100 anion % | | | 100 anion % | | |

|  |  | No. | | | | | |
|---|---|---|---|---|---|---|---|
|  |  | 29 | | | 30 | | |
|  |  | Cation % | Mole % | Mass % | Cation % | Mole % | Mass % |
| Cationic components (Expressed as Oxide) | $P^{5+}$ ($P_2O_5$) | 27.46 | 23.192 | 14.690 | 28.65 | 24.073 | 14.862 |
|  | $Bi^{3+}$ ($Bi_2O_3$) | 24.86 | 20.997 | 43.656 | 27.08 | 22.754 | 46.115 |
|  | $Nb^{5+}$ ($Nb_2O_5$) | 23.32 | 19.696 | 23.362 | 21.35 | 17.940 | 20.740 |
|  | $Ti^{4+}$ ($TiO_2$) | 11.66 | 19.696 | 7.021 | 11.72 | 19.696 | 6.843 |
|  | $W^{6+}$ ($WO_3$) | 5.18 | 8.750 | 9.052 | 5.21 | 8.756 | 8.829 |
|  | $Li^+$ ($Li_2O$) | 0.00 | 0.000 | 0.000 | 0.00 | 0.000 | 0.000 |
|  | $Na^+$ ($Na_2O$) | 1.81 | 1.529 | 0.423 | 0.26 | 0.218 | 0.059 |
|  | $K^+$ ($K_2O$) | 0.00 | 0.000 | 0.000 | 0.00 | 0.000 | 0.000 |
|  | $B^{3+}$ ($B_2O_3$) | 4.15 | 3.505 | 1.089 | 3.65 | 3.067 | 0.929 |
|  | $Ba^{2+}$ (BaO) | 0.00 | 0.000 | 0.000 | 1.04 | 1.748 | 1.166 |
|  | $Sr^{2+}$ | 0.00 | 0.000 | 0.000 | 0.00 | 0.000 | 0.000 |
|  | $Ca^{2+}$ (CaO) | 0.00 | 0.000 | 0.000 | 0.00 | 0.000 | 0.000 |
|  | $Mg^{2+}$ (CaO) | 0.00 | 0.000 | 0.000 | 0.00 | 0.000 | 0.000 |
|  | $Si^{4+}$ ($SiO_2$) | 1.04 | 1.757 | 0.471 | 1.04 | 1.748 | 0.457 |
|  | $Zr^{4+}$ ($ZrO_2$) | 0.52 | 0.878 | 0.236 | 0.00 | 0.000 | 0.000 |
|  | Total | 100.00 | 100.000 | 100.000 | 100.00 | 100.000 | 100.000 |
|  | $Sb_2O_3$ (Note 2) | — | — | 0.08 | — | — | 0.08 |
|  | $Bi^{3+} + Nb^{5+} + Ti^{4+} + W^{6+}$ ($Bi_2O_3 + Nb_2O_5 + TiO_2 + WO_3$) | 65.02 | 69.139 | 83.091 | 65.36 | 69.146 | 82.527 |
|  | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.382 | 0.304 | 0.525 | 0.414 | 0.329 | 0.559 |
|  | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.179 | 0.285 | 0.084 | 0.179 | 0.285 | 0.083 |
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.538 | 0.570 | 0.366 | 0.506 | 0.544 | 0.334 |
|  | $Li^+ + Na^+ + K^+$ ($Li_2O + Na_2O + K_2O$) | 1.81 | 1.529 | 0.42 | 0.26 | 0.218 | 0.06 |
|  | $Na^+/(Li^+ + Na^+ + K^+)$ $Na_2O/(Li_2O + Na_2O + K_2O)$ | 1.000 | 1.000 | 1.000 | 1.000 | 1.000 | 1.000 |
|  | $R_2O + RO$ | 1.81 | 1.529 | 0.423 | 1.30 | 1.966 | 1.225 |
|  | $R_2O + RO + B$ | 5.96 | 5.03 | 1.51 | 4.95 | 5.03 | 2.15 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 99.48 | 99.12 | 99.76 | 100.00 | 100.00 | 100.00 |
|  | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 99.48 | 99.12 | 99.76 | 98.96 | 98.25 | 98.83 |

TABLE 1-continued

|  |  | | | | | | |
|---|---|---|---|---|---|---|---|
| | K⁺ + Ba²⁺ ($K_2O + BaO$) | 0.00 | 0.00 | 0.00 | 1.04 | 1.75 | 1.17 |
| | K⁺ + Ba²⁺ + B³⁺ ($K_2O + BaO + B_2O_3$) | 4.15 | 3.51 | 1.09 | 4.69 | 4.82 | 2.10 |
| Anionic component | O²⁻ | 100 anion % | | | 100 anion % | | |

| | | No. | | | | | |
|---|---|---|---|---|---|---|---|
| | | 31 | | | 32 | | |
| | | Cation % | Mole % | Mass % | Cation % | Mole % | Mass % |
| Cationic components (Expressed as Oxide) | P⁵⁺ ($P_2O_5$) | 27.72 | 22.579 | 13.989 | 27.72 | 22.220 | 14.094 |
| | Bi³⁺ ($Bi_2O_3$) | 25.74 | 20.966 | 42.643 | 25.74 | 20.633 | 42.965 |
| | Nb⁵⁺ ($Nb_2O_5$) | 20.30 | 16.535 | 19.184 | 18.32 | 14.685 | 17.443 |
| | Ti⁴⁺ ($TiO_2$) | 11.14 | 18.148 | 6.328 | 13.12 | 21.034 | 7.508 |
| | W⁶⁺ ($WO_3$) | 8.91 | 14.515 | 14.688 | 8.91 | 14.285 | 14.799 |
| | Li⁺ ($Li_2O$) | 0.00 | 0.000 | 0.000 | 0.00 | 0.000 | 0.000 |
| | Na⁺ ($Na_2O$) | 0.00 | 0.000 | 0.000 | 0.00 | 0.000 | 0.000 |
| | K⁺ ($K_2O$) | 0.00 | 0.000 | 0.000 | 0.00 | 0.000 | 0.000 |
| | B³⁺ ($B_2O_3$) | 3.47 | 2.826 | 0.859 | 3.47 | 2.782 | 0.865 |
| | Ba²⁺ (BaO) | 1.73 | 2.818 | 1.886 | 1.73 | 2.774 | 1.900 |
| | Sr²⁺ (SrO) | 0.00 | 0.000 | 0.000 | 0.00 | 0.000 | 0.000 |
| | Ca²⁺ (CaO) | 0.00 | 0.000 | 0.000 | 0.00 | 0.000 | 0.000 |
| | Mg²⁺ (CaO) | 0.00 | 0.000 | 0.000 | 0.00 | 0.000 | 0.000 |
| | Si⁴⁺ ($SiO_2$) | 0.99 | 1.613 | 0.423 | 0.99 | 1.587 | 0.426 |
| | Zr⁴⁺ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.08 | — | — | 0.08 |
| | Bi³⁺ + Nb⁵⁺ + Ti⁴⁺ + W⁶⁺ ($Bi_2O_3 + Nb_2O_5 + TiO_2 + WO_3$) | 66.09 | 70.164 | 82.843 | 66.09 | 70.637 | 82.715 |
| | Bi³⁺/(Bi³⁺ + Nb⁵⁺ + Ti⁴⁺ + W⁶⁺) $Bi_2O_3/(Bi_2O_3 + Nb_2O_5 + TiO_2 + WO_3)$ | 0.389 | 0.299 | 0.515 | 0.389 | 0.292 | 0.519 |
| | Ti⁴⁺/(Bi³⁺ + Nb⁵⁺ + Ti⁴⁺ + W⁶⁺) $TiO_2/(Bi_2O_3 + Nb_2O_5 + TiO_2 + WO_3)$ | 0.169 | 0.259 | 0.076 | 0.199 | 0.298 | 0.091 |
| | (Nb⁵⁺ + Ti⁴⁺)/(Bi³⁺ + Nb⁵⁺ + Ti⁴⁺ + W⁶⁺) $(Nb_2O_5 + TiO_2)/(Bi_2O_3 + Nb_2O_5 + TiO_2 + WO_3)$ | 0.476 | 0.494 | 0.308 | 0.476 | 0.506 | 0.302 |
| | Li⁺ + Na⁺ + K⁺ ($Li_2O + Na_2O + K_2O$) | 0 | 0 | 0.00 | 0 | 0 | 0.00 |
| | Na⁺/(Li⁺ + Na⁺ + K⁺) $Na_2O/(Li_2O + Na_2O + K_2O)$ | — | — | — | — | — | — |
| | $R_2O + RO$ | 1.73 | 2.818 | 1.886 | 1.73 | 2.774 | 1.900 |
| | $R_2O + RO + B$ | 5.20 | 5.64 | 2.75 | 5.20 | 5.56 | 2.77 |
| | P⁵⁺ + Bi³⁺ + Nb⁵⁺ + Ti⁴⁺ + W⁶⁺ + Li⁺ + Na⁺ + K⁺ + B³⁺ + Si⁴⁺ + Ba²⁺ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
| | P⁵⁺ + Bi³⁺ + Nb⁵⁺ + Ti⁴⁺ + W⁶⁺ + Li⁺ + Na⁺ + K⁺ + Si⁴⁺ + B³⁺ ($P_2O_5 + Bi_2O_3 + Nb_2O_5 + TiO_2 + WO_3 + Li_2O + Na_2O + K_2O + SiO_2 + B_2O_3$) | 98.27 | 97.18 | 98.11 | 98.27 | 97.23 | 98.10 |

TABLE 1-continued

|  |  | | | | | | |
|---|---|---|---|---|---|---|---|
|  | $K^+ + Ba^{2+}$ ($K_2O + BaO$) | 1.73 | 2.82 | 1.89 | 1.73 | 2.77 | 1.90 |
|  | $K^+ + Ba^{2+} + B^{3+}$ ($K_2O + BaO + B_2O_3$) | 5.20 | 5.64 | 2.75 | 5.20 | 5.56 | 2.77 |
| Anionic component | $O^{2-}$ | 100 anion % | | | 100 anion % | | |

|  |  | No. | | | | | |
|---|---|---|---|---|---|---|---|
|  |  | 33 | | | 34 | | |
|  |  | Cation % | Mole % | Mass % | Cation % | Mole % | Mass % |
| Cationic components (Expressed as Oxide) | $P^{5+}$ ($P_2O_5$) | 26.50 | 22.601 | 13.724 | 30.50 | 26.012 | 16.580 |
|  | $Bi^{3+}$ ($Bi_2O_3$) | 28.00 | 23.880 | 47.602 | 24.00 | 20.469 | 42.827 |
|  | $Nb^{5+}$ ($Nb_2O_5$) | 22.50 | 19.190 | 21.821 | 22.50 | 19.190 | 22.904 |
|  | $Ti^{4+}$ ($TiO_2$) | 11.25 | 19.190 | 6.558 | 11.25 | 19.190 | 6.883 |
|  | $W^{6+}$ ($WO_3$) | 5.00 | 8.529 | 8.459 | 5.00 | 8.529 | 8.879 |
|  | $Li^+$ ($Li_2O$) | 0.00 | 0.000 | 0.000 | 0.00 | 0.000 | 0.000 |
|  | $Na^+$ ($Na_2O$) | 2.25 | 1.919 | 0.509 | 2.25 | 1.919 | 0.534 |
|  | $K^+$ ($K_2O$) | 0.00 | 0.000 | 0.000 | 0.00 | 0.000 | 0.000 |
|  | $B^{3+}$ ($B_2O_3$) | 3.50 | 2.985 | 0.889 | 3.50 | 2.985 | 0.933 |
|  | $Ba^{2+}$ (BaO) | 0.00 | 0.000 | 0.000 | 0.00 | 0.000 | 0.000 |
|  | $Sr^{2+}$ (SrO) | 0.00 | 0.000 | 0.000 | 0.00 | 0.000 | 0.000 |
|  | $Ca^{2+}$ (CaO) | 0.00 | 0.000 | 0.000 | 0.00 | 0.000 | 0.000 |
|  | $Mg^{2+}$ (CaO) | 0.00 | 0.000 | 0.000 | 0.00 | 0.000 | 0.000 |
|  | $Si^{4+}$ ($SiO_2$) | 1.00 | 1.706 | 0.438 | 1.00 | 1.706 | 0.460 |
|  | $Zr^{4+}$ ($ZrO_2$) | 0.00 | 0.000 | 0.000 | 0.00 | 0.000 | 0.000 |
|  | Total | 100.00 | 100.000 | 100.000 | 100.00 | 100.000 | 100.000 |
|  | $Sb_2O_3$ (Note 2) | — | — | 0.8 | — | — | 0.08 |
|  | $Bi^{3+} + Nb^{5+} + Ti^{4+} + W^{6+}$ ($Bi_2O_3 + Nb_2O_5 + TiO_2 + WO_3$) | 66.75 | 70.789 | 84.44 | 62.75 | 67.378 | 81.493 |
|  | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.419 | 0.337 | 0.564 | 0.382 | 0.304 | 0.526 |
|  | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.169 | 0.271 | 0.078 | 0.179 | 0.285 | 0.084 |
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.506 | 0.542 | 0.336 | 0.538 | 0.570 | 0.366 |
|  | $Li^+ + Na^+ + K^+$ ($Li_2O + Na_2O + K_2O$) | 2.25 | 1.919 | 0.51 | 2.25 | 1.919 | 0.53 |
|  | $Na^+/(Li^+ + Na^+ + K^+)$ $Na_2O/(Li_2O + Na_2O + K_2O)$ | 1.000 | 1.000 | 1.000 | 1.000 | 1.000 | 1.000 |
|  | $R_2O + RO$ | 2.25 | 1.919 | 0.509 | 2.25 | 1.919 | 0.534 |
|  | $R_2O + RO + B$ | 5.75 | 4.90 | 1.40 | 5.75 | 4.90 | 1.47 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
|  | $P^{5+} + Bi^{2+} + Nb^{5+} + Ti^{4+} + W^{6+} + Li^+ + Na^+ + K^+ + Si^{4+} + B^{3+}$ ($P_2O_5 + Bi_3O_3 + Nb_2O_5 + TiO_2 + WO_3 + Li_2O + Na_2O + K_2O + SiO_2 + B_2O_3$) | 100.00 | 100.00 | 100.00 | 100.00 | 100.00 | 100.00 |

TABLE 1-continued

|  |  |  |  |  |  |  |
|---|---|---|---|---|---|---|
|  | $K^+ + Ba^{2+}$ ($K_2O + BaO$) | 0.00 | 0.00 | 0.00 | 0.00 | 0.00 | 0.00 |
|  | $K^+ + Ba^{2+} + B^{3+}$ ($K_2O + BaO + B_2O_3$) | 3.50 | 2.99 | 0.89 | 3.50 | 2.99 | 0.93 |
| Anionic component | $O^{2-}$ | 100 anion % | | | 100 anion % | | |

|  |  | No. | | | | | |
|---|---|---|---|---|---|---|---|
|  |  | 35 | | | 36 | | |
|  |  | Cation % | Mole % | Mass % | Cation % | Mole % | Mass % |
| Cationic components (Expressed as Oxide) | $P^{5+}$ ($P_2O_5$) | 24.46 | 20.598 | 12.790 | 25.96 | 20.609 | 12.723 |
|  | $Bi^{3+}$ ($Bi_2O_3$) | 26.08 | 21.962 | 44.768 | 25.00 | 19.848 | 40.220 |
|  | $Nb^{5+}$ ($Nb_2O_5$) | 24.46 | 20.598 | 23.952 | 19.71 | 15.648 | 18.089 |
|  | $Ti^{4+}$ ($TiO_2$) | 12.23 | 20.598 | 7.198 | 10.82 | 17.180 | 5.969 |
|  | $W^{6+}$ ($WO_3$) | 5.43 | 9.145 | 9.275 | 12.50 | 19.848 | 20.012 |
|  | $Li^+$ ($Li_2O$) | 0.00 | 0.000 | 0.000 | 0.00 | 0.000 | 0.000 |
|  | $Na^+$ ($Na_2O$) | 2.45 | 2.063 | 0.559 | 0.00 | 0.000 | 0.000 |
|  | $K^+$ ($K_2O$) | 0.00 | 0.000 | 0.000 | 0.00 | 0.000 | 0.000 |
|  | $B^{3+}$ ($B_2O_3$) | 3.80 | 3.200 | 0.975 | 3.37 | 2.675 | 0.810 |
|  | $Ba^{2+}$ (BaO) | 0.00 | 0.000 | 0.000 | 1.68 | 2.668 | 1.779 |
|  | $Sr^{2+}$ (SrO) | 0.00 | 0.000 | 0.000 | 0.00 | 0.000 | 0.000 |
|  | $Ca^{2+}$ (CaO) | 0.00 | 0.000 | 0.000 | 0.00 | 0.000 | 0.000 |
|  | $Mg^{2+}$ (CaO) | 0.00 | 0.000 | 0.000 | 0.00 | 0.000 | 0.000 |
|  | $Si^{4+}$ ($SiO_2$) | 1.09 | 1.836 | 0.483 | 0.96 | 1.524 | 0.398 |
|  | $Zr^{4+}$ ($ZrO_2$) | 0.00 | 0.000 | 0.000 | 0.00 | 0.000 | 0.000 |
|  | Total | 100.00 | 100.000 | 100.000 | 100.00 | 100.000 | 100.000 |
|  | $Sb_2O_3$ (Note 2) | — | — | 0.08 | — | — | 0.08 |
|  | $Bi^{3+} + Nb^{5+} + Ti^{4+} + W^{6+}$ ($Bi_2O_3 + Nb_2O_5 + TiO_2 + WO_3$) | 68.2 | 72.303 | 85.193 | 68.03 | 72.524 | 84.29 |
|  | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.382 | 0.304 | 0.525 | 0.367 | 0.274 | 0.477 |
|  | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.179 | 0.285 | 0.084 | 0.159 | 0.237 | 0.071 |
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.538 | 0.570 | 0.366 | 0.449 | 0.453 | 0.285 |
|  | $Li^+ + Na^+ + K^+$ ($Li_2O + Na_2O + K_2O$) | 2.45 | 2.063 | 0.56 | 0 | 0 | 0.00 |
|  | $Na^+/(Li^+ + Na^+ + K^+)$ $Na_2O/(Li_2O + Na_2O + K_2O)$ | 1.000 | 1.000 | 1.000 | — | — | — |
|  | $R_2O + RO$ | 2.45 | 2.063 | 0.559 | 1.68 | 2.668 | 1.779 |
|  | $R_2O + RO + B$ | 6.25 | 5.26 | 1.53 | 5.05 | 5.34 | 2.59 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
|  | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 100.00 | 100.00 | 100.00 | 98.32 | 97.33 | 98.22 |

TABLE 1-continued

|  |  | | | | | | |
|---|---|---|---|---|---|---|---|
|  | $K^+ + Ba^{2+}$ ($K_2O + BaO$) | 0.00 | 0.00 | 0.00 | 1.68 | 2.67 | 1.78 |
|  | $K^+ + Ba^{2+} + B^{3+}$ ($K_2O + BaO + B_2O_3$) | 3.80 | 3.20 | 0.98 | 5.05 | 5.34 | 2.59 |
| Anionic component | $O^{2-}$ | | 100 anion % | | | 100 anion % | |

|  |  | No. | | | | | |
|---|---|---|---|---|---|---|---|
|  |  | 37 | | | 38 | | |
|  |  | Cation % | Mole % | Mass % | Cation % | Mole % | Mass % |
| Cationic components (Expressed as Oxide) | $P^{5+}$ ($P_2O_5$) | 22.47 | 18.517 | 11.166 | 28.19 | 24.255 | 15.278 |
|  | $Bi^{3+}$ ($Bi_2O_3$) | 29.22 | 24.079 | 47.666 | 25.54 | 21.976 | 45.437 |
|  | $Nb^{5+}$ ($Nb_2O_5$) | 23.03 | 18.978 | 21.431 | 23.94 | 20.599 | 24.296 |
|  | $Ti^{4+}$ ($TiO_2$) | 12.64 | 20.832 | 7.070 | 11.97 | 20.599 | 7.301 |
|  | $W^{6+}$ ($WO_3$) | 5.62 | 9.262 | 9.123 | 3.19 | 5.490 | 5.647 |
|  | $Li^+$ ($Li_2O$) | 0.00 | 0.000 | 0.000 | 0.00 | 0.000 | 0.000 |
|  | $Na^+$ ($Na_2O$) | 0.00 | 0.000 | 0.000 | 2.39 | 2.056 | 0.566 |
|  | $K^+$ ($K_2O$) | 0.00 | 0.000 | 0.000 | 0.00 | 0.000 | 0.000 |
|  | $B^{3+}$ ($B_2O_3$) | 3.93 | 3.239 | 0.958 | 3.72 | 3.201 | 0.989 |
|  | $Ba^{2+}$ (BaO) | 1.97 | 3.247 | 2.115 | 0.00 | 0.000 | 0.000 |
|  | $Sr^{2+}$ (SrO) | 0.00 | 0.000 | 0.000 | 0.00 | 0.000 | 0.000 |
|  | $Ca^{2+}$ (CaO) | 0.00 | 0.000 | 0.000 | 0.00 | 0.000 | 0.000 |
|  | $Mg^{2+}$ (CaO) | 0.00 | 0.000 | 0.000 | 0.00 | 0.000 | 0.000 |
|  | $Si^{4+}$ ($SiO_2$) | 1.12 | 1.846 | 0.471 | 1.06 | 1.824 | 0.486 |
|  | $Zr^{4+}$ ($ZrO_2$) | 0.00 | 0.000 | 0.000 | 0.00 | 0.000 | 0.000 |
|  | Total | 100.00 | 100.000 | 100.000 | 100.00 | 100.000 | 100.000 |
|  | $Sb_2O_3$ (Note 2) | — | — | 0.08 | — | — | 0.08 |
|  | $Bi^{3+} + Nb^{5+} + Ti^{4+} + W^{6+}$ ($Bi_2O_3 + Nb_2O_5 + TiO_2 + WO_3$) | 70.51 | 73.151 | 85.29 | 64.64 | 68.664 | 82.681 |
|  | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.414 | 0.329 | 0.559 | 0.395 | 0.320 | 0.550 |
|  | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.179 | 0.285 | 0.083 | 0.185 | 0.300 | 0.088 |
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.506 | 0.544 | 0.334 | 0.556 | 0.600 | 0.382 |
|  | $Li^+ + Na^+ + K^+$ ($Li_2O + Na_2O + K_2O$) | 0 | 0 | 0.00 | 2.39 | 2.056 | 0.57 |
|  | $Na^+/(Li^+ + Na^+ + K^+)$ $Na_2O/(Li_2O + Na_2O + K_2O)$ | — | — | — | 1.000 | 1.000 | 1.000 |
|  | $R_2O + RO$ | 1.97 | 3.247 | 2.115 | 2.39 | 2.056 | 0.566 |
|  | $R_2O + RO + B$ | 5.90 | 6.49 | 3.07 | 6.11 | 5.26 | 1.56 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
|  | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 98.03 | 96.75 | 97.89 | 100.00 | 100.00 | 100.00 |

TABLE 1-continued

|  |  | | | | | | |
|---|---|---|---|---|---|---|---|
|  | $K^+ + Ba^{2+}$ ($K_2O + BaO$) | 1.97 | 3.25 | 2.12 | 0.00 | 0.00 | 0.00 |
|  | $K^+ + Ba^{2+} + B^{3+}$ ($K_2O + BaO + B_2O_3$) | 5.90 | 6.49 | 3.07 | 3.72 | 3.20 | 0.99 |
| Anionic component | $O^{2-}$ | | 100 anion % | | | 100 anion % | |

| | | No. | | | | | |
|---|---|---|---|---|---|---|---|
| | | 39 | | | 40 | | |
| | | Cation % | Mole % | Mass % | Cation % | Mole % | Mass % |
| Cationic components (Expressed as Oxide) | $P^{5+}$ ($P_2O_5$) | 26.63 | 21.628 | 13.941 | 24.11 | 18.371 | 11.329 |
| | $Bi^{3+}$ ($Bi_2O_3$) | 26.12 | 21.213 | 44.886 | 23.22 | 17.693 | 35.818 |
| | $Nb^{5+}$ ($Nb_2O_5$) | 20.60 | 16.730 | 20.195 | 18.30 | 13.944 | 16.103 |
| | $Ti^{4+}$ ($TiO_2$) | 15.33 | 24.900 | 9.033 | 10.04 | 15.300 | 5.310 |
| | $W^{6+}$ ($WO_3$) | 5.03 | 8.170 | 8.602 | 18.75 | 28.574 | 28.781 |
| | $Li^+$ ($Li_2O$) | 0.00 | 0.000 | 0.000 | 0.00 | 0.000 | 0.000 |
| | $Na^+$ ($Na_2O$) | 0.00 | 0.000 | 0.000 | 0.00 | 0.000 | 0.000 |
| | $K^+$ ($K_2O$) | 0.00 | 0.000 | 0.000 | 0.00 | 0.000 | 0.000 |
| | $B^{3+}$ ($B_2O_3$) | 3.52 | 2.859 | 0.904 | 3.13 | 2.385 | 0.721 |
| | $Ba^{2+}$ ($BaO$) | 1.76 | 2.859 | 1.991 | 1.56 | 2.377 | 1.584 |
| | $Sr^{2+}$ ($SrO$) | 0.00 | 0.000 | 0.000 | 0.00 | 0.000 | 0.000 |
| | $Ca^{2+}$ ($CaO$) | 0.00 | 0.000 | 0.000 | 0.00 | 0.000 | 0.000 |
| | $Mg^{2+}$ ($CaO$) | 0.00 | 0.000 | 0.000 | 0.00 | 0.000 | 0.000 |
| | $Si^{4+}$ ($SiO_2$) | 1.01 | 1.641 | 0.448 | 0.89 | 1.356 | 0.354 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.08 | — | — | 0.08 |
| | $Bi^{3+} + Nb^{5+} + Ti^{4+} + W^{6+}$ ($Bi_2O_3 + Nb_2O_5 + TiO_2 + WO_3$) | 67.08 | 71.013 | 82.716 | 70.31 | 75.511 | 86.012 |
| | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.389 | 0.299 | 0.543 | 0.330 | 0.234 | 0.416 |
| | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.229 | 0.351 | 0.109 | 0.143 | 0.203 | 0.062 |
| | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.536 | 0.586 | 0.353 | 0.403 | 0.387 | 0.249 |
| | $Li^+ + Na^+ + K^+$ ($Li_2O + Na_2O + K_2O$) | 0 | 0 | 0.00 | 0 | 0 | 0.00 |
| | $Na^+/(Li^+ + Na^+ + K^+)$ $Na_2O/(Li_2O + Na_2O + K_2O)$ | — | — | — | 0 | 0 | 0 |
| | $R_2O + RO$ | 1.76 | 2.859 | 1.991 | 1.56 | 2.377 | 1.584 |
| | $R_2O + RO + B$ | 5.28 | 5.72 | 2.90 | 4.69 | 4.76 | 2.31 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 98.24 | 97.14 | 98.01 | 98.44 | 97.62 | 98.42 |

TABLE 1-continued

|  |  |  |  |  |  |  |  |
|---|---|---|---|---|---|---|---|
|  | $K^+ + Ba^{2+}$ ($K_2O + BaO$) |  | 1.76 | 2.86 | 1.99 | 1.56 | 2.38 | 1.58 |
|  | $K^+ + Ba^{2+} + B^{3+}$ ($K_2O + BaO + B_2O_3$) |  | 5.28 | 5.72 | 2.90 | 4.69 | 4.76 | 2.31 |
| Anionic component | $O^{2-}$ |  | 100 anion % | | | 100 anion % | | |

| | | No. | | | | | |
|---|---|---|---|---|---|---|---|
| | | 41 | | | 42 | | |
| | | Cation % | Mole % | Mass % | Cation % | Mole % | Mass % |
| Cationic components (Expressed as Oxide) | $P^{5+}$ ($P_2O_5$) | 27.48 | 22.592 | 12.977 | 24.49 | 18.815 | 11.731 |
| | $Bi^{3+}$ ($Bi_2O_3$) | 26.46 | 21.755 | 41.016 | 23.59 | 18.124 | 37.094 |
| | $Nb^{5+}$ ($Nb_2O_5$) | 20.87 | 17.159 | 18.455 | 18.59 | 14.282 | 16.676 |
| | $Ti^{4+}$ ($TiO_2$) | 3.31 | 5.443 | 1.759 | 10.20 | 15.673 | 5.499 |
| | $W^{6+}$ ($WO_3$) | 13.23 | 21.755 | 20.408 | 15.42 | 23.695 | 24.129 |
| | $Li^+$ ($Li_2O$) | 0.00 | 0.000 | 0.000 | 0.00 | 0.000 | 0.000 |
| | $Na^+$ ($Na_2O$) | 0.00 | 0.000 | 0.000 | 0.00 | 0.000 | 0.000 |
| | $K^+$ ($K_2O$) | 0.00 | 0.000 | 0.000 | 0.00 | 0.000 | 0.000 |
| | $B^{3+}$ ($B_2O_3$) | 3.56 | 2.927 | 0.825 | 3.17 | 2.435 | 0.745 |
| | $Ba^{2+}$ (BaO) | 4.07 | 6.692 | 4.152 | 3.63 | 5.578 | 3.757 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (CaO) | 0.00 | 0.000 | 0.000 | 0.00 | 0.000 | 0.000 |
| | $Si^{4+}$ ($SiO_2$) | 1.02 | 1.677 | 0.408 | 0.91 | 1.398 | 0.369 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.08 | — | — | 0.08 |
| | $Bi^{3+} + Nb^{5+} + Ti^{4+} + W^{6+}$ ($Bi_2O_3 + Nb_2O_5 + TiO_2 + WO_3$) | 63.87 | 66.112 | 81.638 | 67.8 | 71.774 | 83.398 |
| | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.414 | 0.329 | 0.502 | 0.348 | 0.253 | 0.445 |
| | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.052 | 0.082 | 0.022 | 0.150 | 0.218 | 0.066 |
| | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.379 | 0.342 | 0.248 | 0.425 | 0.417 | 0.266 |
| | $Li^+ + Na^+ + K^+$ ($Li_2O + Na_2O + K_2O$) | 0 | 0 | 0.00 | 0 | 0 | 0.00 |
| | $Na^+/(Li^+ + Na^+ + K^+)$ $Na_2O/(Li_2O + Na_2O + K_2O)$ | — | — | — | — | — | — |
| | $R_2O + RO$ | 4.07 | 6.692 | 4.152 | 3.63 | 5.578 | 3.757 |
| | $R_2O + RO + B$ | 7.63 | 9.62 | 4.98 | 6.80 | 8.01 | 4.50 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 95.93 | 93.31 | 95.85 | 96.37 | 94.42 | 96.24 |

TABLE 1-continued

|  |  |  |  |  |  |  |  |
|---|---|---|---|---|---|---|---|
|  | $K^+ + Ba^{2+}$ | 4.07 | 6.69 | 4.15 | 3.63 | 5.58 | 3.76 |
|  | $(K_2O + BaO)$ |  |  |  |  |  |  |
|  | $K^+ + Ba^{2+} + B^{3+}$ | 7.63 | 9.62 | 4.98 | 6.80 | 8.01 | 4.50 |
|  | $(K_2O + BaO + B_2O_3)$ |  |  |  |  |  |  |
| Anionic component | $O^{2-}$ | 100 anion % | | | 100 anion % | | |

| | | No. | | | | | |
|---|---|---|---|---|---|---|---|
| | | 43 | | | 44 | | |
| | | Cation % | Mole % | Mass % | Cation % | Mole % | Mass % |
| Cationic components (Expressed as Oxide) | $P^{5+}$ ($P_2O_5$) | 19.46 | 16.125 | 10.546 | 27.48 | 21.512 | 13.547 |
| | $Bi^{3+}$ ($Bi_2O_3$) | 25.31 | 20.973 | 45.028 | 26.46 | 20.714 | 42.818 |
| | $Nb^{5+}$ ($Nb_2O_5$) | 19.95 | 16.531 | 20.246 | 14.76 | 11.555 | 13.625 |
| | $Ti^{4+}$ ($TiO_2$) | 10.95 | 18.147 | 6.679 | 11.45 | 17.927 | 6.353 |
| | $W^{6+}$ ($WO_3$) | 4.87 | 8.071 | 8.621 | 11.20 | 17.536 | 18.036 |
| | $Li^+$ ($Li_2O$) | 0.00 | 0.000 | 0.000 | 0.00 | 0.000 | 0.000 |
| | $Na^+$ ($Na_2O$) | 0.00 | 0.000 | 0.000 | 0.00 | 0.000 | 0.000 |
| | $K^+$ ($K_2O$) | 0.00 | 0.000 | 0.000 | 0.00 | 0.000 | 0.000 |
| | $B^{3+}$ ($B_2O_3$) | 14.60 | 12.098 | 3.881 | 3.56 | 2.787 | 0.861 |
| | $Ba^{2+}$ (BaO) | 3.89 | 6.447 | 4.554 | 4.07 | 6.372 | 4.334 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (CaO) | 0.00 | 0.000 | 0.000 | 0.00 | 0.000 | 0.000 |
| | $Si^{4+}$ ($SiO_2$) | 0.97 | 1.608 | 0.445 | 1.02 | 1.597 | 0.426 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.08 | — | — | 0.08 |
| | $Bi^{3+} + Nb^{5+} + Ti^{4+} + W^{6+}$ ($Bi_2O_3 + Nb_2O_5 + TiO_2 + WO_3$) | 61.08 | 63.722 | 80.574 | 63.87 | 67.732 | 80.832 |
| | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.414 | 0.329 | 0.559 | 0.414 | 0.306 | 0.530 |
| | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.179 | 0.285 | 0.083 | 0.179 | 0.265 | 0.079 |
| | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.506 | 0.544 | 0.334 | 0.410 | 0.435 | 0.247 |
| | $Li^+ + Na^+ + K^+$ ($Li_2O + Na_2O + K_2O$) | 0 | 0 | 0.00 | 0 | 0 | 0.00 |
| | $Na^+/(Li^+ + Na^+ + K^+)$ $Na_2O/(Li_2O + Na_2O + K_2O)$ | 0 | 0 | 0 | — | — | — |
| | $R_2O + RO$ | 3.89 | 6.447 | 4.554 | 4.07 | 6.372 | 4.334 |
| | $R_2O + RO + B$ | 18.49 | 18.55 | 8.44 | 7.63 | 9.16 | 5.20 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 96.11 | 93.55 | 95.45 | 95.93 | 93.63 | 95.67 |

TABLE 1-continued

|  |  |  |  |  |  |  |  |
|---|---|---|---|---|---|---|---|
|  | $K^+ + Ba^{2+}$ | 3.89 | 6.45 | 4.55 | 4.07 | 6.37 | 4.33 |
|  | ($K_2O + BaO$) |  |  |  |  |  |  |
|  | $K^+ + Ba^{2+} + B^{3+}$ | 18.49 | 18.55 | 8.44 | 7.63 | 9.16 | 5.20 |
|  | ($K_2O + BaO + B_2O_3$) |  |  |  |  |  |  |
| Anionic component | $O^{2-}$ | 100 anion % | | | 100 anion % | | |

|  |  | No. | | | | | |
|---|---|---|---|---|---|---|---|
|  |  | 45 | | | 46 | | |
|  |  | Cation % | Mole % | Mass % | Cation % | Mole % | Mass % |
| Cationic components (Expressed as Oxide) | $P^{5+}$ ($P_2O_5$) | 29.19 | 23.331 | 14.747 | 28.28 | 22.697 | 14.059 |
|  | $Bi^{3+}$ ($Bi_2O_3$) | 24.32 | 19.440 | 40.332 | 25.13 | 20.169 | 41.010 |
|  | $Nb^{5+}$ ($Nb_2O_5$) | 19.76 | 15.794 | 18.694 | 20.42 | 16.388 | 19.009 |
|  | $Ti^{4+}$ ($TiO_2$) | 11.40 | 18.224 | 6.482 | 11.78 | 18.909 | 6.591 |
|  | $W^{6+}$ ($WO_3$) | 9.12 | 14.579 | 15.051 | 9.42 | 15.120 | 15.297 |
|  | $Li^+$ ($Li_2O$) | 0.00 | 0.000 | 0.000 | 0.00 | 0.000 | 0.000 |
|  | $Na^+$ ($Na_2O$) | 0.00 | 0.000 | 0.000 | 0.00 | 0.000 | 0.000 |
|  | $K^+$ ($K_2O$) | 0.00 | 0.000 | 0.000 | 0.00 | 0.000 | 0.000 |
|  | $B^{3+}$ ($B_2O_3$) | 1.62 | 1.295 | 0.401 | 1.57 | 1.260 | 0.383 |
|  | $Ba^{2+}$ (BaO) | 3.51 | 5.611 | 3.831 | 3.40 | 5.457 | 3.651 |
|  | $Sr^{2+}$ (SrO) | 0.00 | 0.000 | 0.000 | 0.00 | 0.000 | 0.000 |
|  | $Ca^{2+}$ (CaO) | 0.00 | 0.000 | 0.000 | 0.00 | 0.000 | 0.000 |
|  | $Mg^{2+}$ (CaO) | 0.00 | 0.000 | 0.000 | 0.00 | 0.000 | 0.000 |
|  | $Si^{4+}$ ($SiO_2$) | 1.08 | 1.726 | 0.462 | 0.00 | 0.000 | 0.000 |
|  | $Zr^{4+}$ ($ZrO_2$) | 0.00 | 0.000 | 0.000 | 0.00 | 0.000 | 0.000 |
|  | Total | 100.00 | 100.000 | 100.000 | 100.00 | 100.000 | 100.000 |
|  | $Sb_2O_3$ (Note 2) | — | — | 0.08 | — | — | 0.08 |
|  | $Bi^{3+} + Nb^{5+} + Ti^{4+} + W^{6+}$ ($Bi_2O_3 + Nb_2O_5 + TiO_2 + WO_3$) | 64.6 | 68.037 | 80.559 | 66.75 | 70.586 | 81.907 |
|  | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.376 | 0.286 | 0.501 | 0.376 | 0.286 | 0.501 |
|  | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.176 | 0.268 | 0.080 | 0.176 | 0.268 | 0.080 |
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.482 | 0.500 | 0.313 | 0.482 | 0.500 | 0.313 |
|  | $Li^+ + Na^+ + K^+$ ($Li_2O + Na_2O + K_2O$) | 0 | 0 | 0.00 | 0 | 0 | 0.00 |
|  | $Na^+/(Li^+ + Na^+ + K^+)$ $Na_2O/(Li_2O + Na_2O + K_2O)$ | — | — | — | — | — | — |
|  | $R_2O + RO$ | 3.51 | 5.611 | 3.831 | 3.40 | 5.457 | 3.651 |
|  | $R_2O + RO + B$ | 5.13 | 6.91 | 4.23 | 4.97 | 6.72 | 4.03 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
|  | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 96.49 | 94.39 | 96.17 | 96.60 | 94.54 | 96.35 |

TABLE 1-continued

|  |  |  |  |  |  |  |  |
|---|---|---|---|---|---|---|---|
|  | $K^+ + Ba^{2+}$ |  | 3.51 | 5.61 | 3.83 | 3.40 | 5.46 | 3.65 |
|  | $(K_2O + BaO)$ |  |  |  |  |  |  |  |
|  | $K^+ + Ba^{2+} + B^{3+}$ |  | 5.13 | 6.91 | 4.23 | 4.97 | 6.72 | 4.03 |
|  | $(K_2O + BaO + B_2O_3)$ |  |  |  |  |  |  |  |
| Anionic component | $O^{2-}$ |  | 100 anion % | | | 100 anion % | | |

| | | No. | | | | | |
|---|---|---|---|---|---|---|---|
| | | 47 | | | 48 | | |
| | | Cation % | Mole % | Mass % | Cation % | Mole % | Mass % |
| Cationic components (Expressed as Oxide) | $P^{5+}$ ($P_2O_5$) | 26.34 | 21.010 | 13.223 | 28.19 | 22.697 | 14.266 |
| | $Bi^{3+}$ ($Bi_2O_3$) | 25.37 | 20.236 | 41.806 | 25.53 | 20.556 | 42.410 |
| | $Nb^{5+}$ ($Nb_2O_5$) | 19.51 | 15.562 | 18.341 | 20.48 | 16.490 | 19.408 |
| | $Ti^{4+}$ ($TiO_2$) | 11.46 | 18.282 | 6.475 | 12.23 | 19.693 | 6.966 |
| | $W^{6+}$ ($WO_3$) | 8.78 | 14.007 | 14.398 | 7.45 | 11.997 | 12.316 |
| | $Li^+$ ($Li_2O$) | 0.00 | 0.000 | 0.000 | 0.00 | 0.000 | 0.000 |
| | $Na^+$ ($Na_2O$) | 0.00 | 0.000 | 0.000 | 0.00 | 0.000 | 0.000 |
| | $K^+$ ($K_2O$) | 0.00 | 0.000 | 0.000 | 0.00 | 0.000 | 0.000 |
| | $B^{3+}$ ($B_2O_3$) | 3.41 | 2.720 | 0.840 | 1.60 | 1.288 | 0.397 |
| | $Ba^{2+}$ (BaO) | 4.15 | 6.620 | 4.501 | 3.46 | 5.572 | 3.783 |
| | $Sr^{2+}$ (SrO) | 0.00 | 0.000 | 0.000 | 0.00 | 0.000 | 0.000 |
| | $Ca^{2+}$ (CaO) | 0.00 | 0.000 | 0.000 | 0.00 | 0.000 | 0.000 |
| | $Mg^{2+}$ (CaO) | 0.00 | 0.000 | 0.000 | 0.00 | 0.000 | 0.000 |
| | $Si^{4+}$ ($SiO_2$) | 0.98 | 1.563 | 0.416 | 1.06 | 1.707 | 0.454 |
| | $Zr^{4+}$ ($ZrO_2$) | 0.00 | 0.000 | 0.000 | 0.00 | 0.000 | 0.000 |
| | Total | 100.00 | 100.000 | 100.000 | 100.00 | 100.000 | 100.000 |
| | $Sb_2O_3$ (Note 2) | — | — | 0.08 | — | — | 0.08 |
| | $Bi^{3+} + Nb^{5+} + Ti^{4+} + W^{6+}$ ($Bi_2O_3 + Nb_2O_5 + TiO_2 + WO_3$) | 65.12 | 68.087 | 81.02 | 65.69 | 68.736 | 81.1 |
| | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.390 | 0.297 | 0.516 | 0.389 | 0.299 | 0.523 |
| | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.176 | 0.269 | 0.080 | 0.186 | 0.287 | 0.086 |
| | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.476 | 0.497 | 0.306 | 0.498 | 0.526 | 0.325 |
| | $Li^+ + Na^+ + K^+$ ($Li_2O + Na_2O + K_2O$) | 0 | 0 | 0.00 | 0 | 0 | 0.00 |
| | $Na^+/(Li^+ + Na^+ + K^+)$ $Na_2O/(Li_2O + Na_2O + K_2O)$ | — | — | — | — | — | — |
| | $R_2O + RO$ | 4.15 | 6.620 | 4.501 | 3.46 | 5.572 | 3.783 |
| | $R_2O + RO + B$ | 7.56 | 9.34 | 5.34 | 5.06 | 6.86 | 4.18 |
| | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
| | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 95.85 | 93.38 | 95.50 | 96.54 | 94.43 | 96.22 |

TABLE 1-continued

|  |  |  |  |  |  |  |  |
|---|---|---|---|---|---|---|---|
|  | $K^+ + Ba^{2+}$ | 4.15 | 6.62 | 4.50 | 3.46 | 5.57 | 3.78 |
|  | ($K_2O + BaO$) |  |  |  |  |  |  |
|  | $K^+ + Ba^{2+} + B^{3+}$ | 7.56 | 9.34 | 5.34 | 5.06 | 6.86 | 4.18 |
|  | ($K_2O + BaO + B_2O_3$) |  |  |  |  |  |  |
| Anionic component | $O^{2-}$ |  | 100 anion % |  |  | 100 anion % |  |

|  |  | No. | | | | | |
|---|---|---|---|---|---|---|---|
|  |  | 49 | | | 50 | | |
|  |  | Cation % | Mole % | Mass % | Cation % | Mole % | Mass % |
| Cationic components (Expressed as Oxide) | $P^{5+}$ ($P_2O_5$) | 30.420 | 25.006 | 15.258 | 29.51 | 24.326 | 14.391 |
|  | $Bi^{3+}$ ($Bi_2O_3$) | 26.800 | 22.031 | 44.128 | 26.23 | 21.622 | 41.993 |
|  | $Nb^{5+}$ ($Nb_2O_5$) | 21.130 | 17.370 | 19.847 | 21.31 | 17.567 | 19.461 |
|  | $Ti^{4+}$ ($TiO_2$) | 11.600 | 19.071 | 6.549 | 7.92 | 13.057 | 4.347 |
|  | $W^{6+}$ ($WO_3$) | 7.220 | 11.870 | 11.830 | 9.84 | 16.223 | 15.676 |
|  | $Li^+$ ($Li_2O$) | 0.000 | 0.000 | 0.000 | 0.00 | 0.000 | 0.000 |
|  | $Na^+$ ($Na_2O$) | 0.000 | 0.000 | 0.000 | 0.00 | 0.000 | 0.000 |
|  | $K^+$ ($K_2O$) | 0.000 | 0.000 | 0.000 | 0.00 | 0.000 | 0.000 |
|  | $B^{3+}$ ($B_2O_3$) | 0.000 | 0.000 | 0.000 | 1.64 | 1.352 | 0.392 |
|  | $Ba^{2+}$ (BaO) | 1.800 | 2.959 | 1.951 | 3.55 | 5.853 | 3.740 |
|  | $Sr^{2+}$ (SrO) | 0.000 | 0.000 | 0.000 | 0.00 | 0.000 | 0.000 |
|  | $Ca^{2+}$ (CaO) | 0.000 | 0.000 | 0.000 | 0.00 | 0.000 | 0.000 |
|  | $Mg^{2+}$ (CaO) | 0.000 | 0.000 | 0.000 | 0.00 | 0.000 | 0.000 |
|  | $Si^{4+}$ ($SiO_2$) | 1.030 | 1.693 | 0.437 | 0.00 | 0.000 | 0.000 |
|  | $Zr^{4+}$ ($ZrO_2$) | 0.00 | 0.000 | 0.000 | 0.00 | 0.000 | 0.000 |
|  | Total | 100.00 | 100.000 | 100.000 | 100.00 | 100.000 | 100.000 |
|  | $Sb_2O_3$ (Note 2) | — | — | 0.08 | — | — | 0.08 |
|  | $Bi^{3+} + Nb^{5+} + Ti^{4+} + W^{6+}$ ($Bi_2O_3 + Nb_2O_5 + TiO_2 + WO_3$) | 66.75 | 70.342 | 82.354 | 65.3 | 68.469 | 81.477 |
|  | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.401 | 0.313 | 0.536 | 0.402 | 0.316 | 0.515 |
|  | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.174 | 0.271 | 0.080 | 0.121 | 0.191 | 0.053 |
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.490 | 0.518 | 0.321 | 0.448 | 0.447 | 0.292 |
|  | $Li^+ + Na^+ + K^+$ ($Li_2O + Na_2O + K_2O$) | 0 | 0 | 0.00 | 0 | 0 | 0.00 |
|  | $Na^+/(Li^+ + Na^+ + K^+)$ $Na_2O/(Li_2O + Na_2O + K_2O)$ | — | — | — | — | — | — |
|  | $R_2O + RO$ | 1.80 | 2.959 | 1.951 | 3.55 | 5.853 | 3.740 |
|  | $R_2O + RO + B$ | 1.80 | 2.96 | 1.95 | 5.19 | 7.21 | 4.13 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
|  | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 98.20 | 97.04 | 98.05 | 96.45 | 94.15 | 96.26 |

TABLE 1-continued

|  |  |  |  |  |  |  |  |
|---|---|---|---|---|---|---|---|
|  | $K^+ + Ba^{2+}$ ($K_2O + BaO$) |  | 1.80 | 2.96 | 1.95 | 3.55 | 5.85 | 3.74 |
|  | $K^+ + Ba^{2+} + B^{3+}$ ($K_2O + BaO + B_2O_3$) |  | 1.80 | 2.96 | 1.95 | 5.19 | 7.21 | 4.13 |
| Anionic component | $O^{2-}$ |  | 100 anion % | | | 100 anion % | | |

|  |  | No. | | | | | |
|---|---|---|---|---|---|---|---|
|  |  | 51 | | | Comparative example 1 | | |
|  |  | Cation % | Mole % | Mass % | Cation % | Mole % | Mass % |
| Cationic components (Expressed as Oxide) | $P^{5+}$ ($P_2O_5$) | 29.51 | 23.478 | 15.087 | 22.03 | 19.7460 | 12.0 |
|  | $Bi^{3+}$ ($Bi_2O_3$) | 21.85 | 17.384 | 36.669 | 22.37 | 20.0500 | 40.0 |
|  | $Nb^{5+}$ ($Nb_2O_5$) | 21.31 | 16.954 | 20.401 | 24.51 | 21.9680 | 25.0 |
|  | $Ti^{4+}$ ($TiO_2$) | 12.30 | 19.572 | 7.078 | 0.00 | 0.0000 | 0.0 |
|  | $W^{6+}$ ($WO_3$) | 9.84 | 15.658 | 16.433 | 5.61 | 10.0560 | 10.0 |
|  | $Li^+$ ($Li_2O$) | 0.00 | 0.000 | 0.000 | 0.00 | 0.0000 | 0.0 |
|  | $Na^+$ ($Na_2O$) | 0.00 | 0.000 | 0.000 | 0.00 | 0.0000 | 0.0 |
|  | $K^+$ ($K_2O$) | 0.00 | 0.000 | 0.000 | 8.29 | 7.4300 | 3.0 |
|  | $B^{3+}$ ($B_2O_3$) | 1.64 | 1.305 | 0.411 | 11.23 | 10.0660 | 3.0 |
|  | $Ba^{2+}$ ($BaO$) | 3.55 | 5.649 | 3.921 | 5.96 | 10.6840 | 7.0 |
|  | $Sr^{2+}$ ($SrO$) | 0.00 | 0.000 | 0.000 | 0.00 | 0.0000 | 0.0 |
|  | $Ca^{2+}$ ($CaO$) | 0.00 | 0.000 | 0.000 | 0.00 | 0.0000 | 0.0 |
|  | $Mg^{2+}$ ($CaO$) | 0.00 | 0.000 | 0.000 | 0.00 | 0.0000 | 0.0 |
|  | $Si^{4+}$ ($SiO_2$) | 0.00 | 0.000 | 0.000 | 0.00 | 0.0000 | 0.0 |
|  | $Zr^{4+}$ ($ZrO_2$) | 0.00 | 0.000 | 0.000 | 0.00 | 0.0000 | 0.0 |
|  | Total | 100.00 | 100.000 | 100.000 | 100.00 | 100.000 | 100.0 |
|  | $Sb_2O_3$ (Note 2) | — | — | 0.08 | — | — | 0.08 |
|  | $Bi^{3+} + Nb^{5+} + Ti^{4+} + W^{6+}$ ($Bi_2O_3 + Nb_2O_5 + TiO_2 + WO_3$) | 65.3 | 69.568 | 80.581 | 52.49 | 52.074 | 74.987 |
|  | $Bi^{3+}/(Bi^{3+} + Nb^{5+} + Ti^{4+} + W^{6+})$ $Bi_2O_3/(Bi_2O_3 + Nb_2O_5 + TiO_2 + WO_3)$ | 0.335 | 0.250 | 0.455 | 0.426 | 0.385 | 0.533 |
|  | $Ti^{4+}/(Bi^{3+} + Nb^{5+} + Ti^{4+} + W^{6+})$ $TiO_2/(Bi_2O_3 + Nb_2O_5 + TiO_2 + WO_3)$ | 0.188 | 0.281 | 0.088 | 0.000 | 0.000 | 0.000 |
|  | $(Nb^{5+} + Ti^{4+})/(Bi^{3+} + Nb^{5+} + Ti^{4+} + W^{6+})$ $(Nb_2O_5 + TiO_2)/(Bi_2O_3 + Nb_2O_5 + TiO_2 + WO_3)$ | 0.515 | 0.525 | 0.341 | 0.467 | 0.422 | 0.333 |
|  | $Li^+ + Na^+ + K^+$ ($Li_2O + Na_2O + K_2O$) | 0 | 0 | 0.00 | 8.29 | 7.43 | 3.00 |
|  | $Na^+/(Li^+ + Na^+ + K^+)$ $Na_2O/(Li_2O + Na_2O + K_2O)$ | — | — | — | 0.000 | 0.000 | 0.000 |
|  | $R_2O + RO$ | 3.55 | 5.649 | 3.921 | 14.25 | 18.114 | 10.011 |
|  | $R_2O + RO + B$ | 5.19 | 6.95 | 4.33 | 25.48 | 28.18 | 13.01 |
|  | $P^{5+} + Bi^{3+} + Nb^{5+} + Ti^{4+} + W^{6+} + Li^+ + Na^+ + K^+ + B^{3+} + Si^{4+} + Ba^{2+}$ ($P_2O_5 + Bi_2O_3 + Nb_2O_5 + TiO_2 + WO_3 + Li_2O + Na_2O + K_2O + B_2O_3 + SiO_2 + BaO$) | 100.00 | 100.00 | 100.00 | 100.00 | 100.00 | 100.00 |
|  | $P^{5+} + Bi^{3+} + Nb^{5+} + Ti^{4+} + W^{6+} + Li^+ + Na^+ + K^+ + Si^{4+} + B^{3+}$ ($P_2O_5 + Bi_2O_3 + Nb_2O_5 + TiO_2 + WO_3 + Li_2O + Na_2O + K_2O + SiO_2 + B_2O_3$) | 96.45 | 94.35 | 96.08 | 94.04 | 89.32 | 92.99 |
|  | $K^+ + Ba^{2+}$ ($K_2O + BaO$) | 3.55 | 5.65 | 3.92 | 14.25 | 18.11 | 10.01 |
|  | $K^+ + Ba^{2+} + B^{3+}$ ($K_2O + BaO + B_2O_3$) | 5.19 | 6.95 | 4.33 | 25.48 | 28.18 | 13.01 |
| Anionic component | $O^{2-}$ | 100 anion % | | | 100 anion % | | |

|  | No. | |
|---|---|---|
|  | 1 | 2 |
| Refractive index nd | 2.05452 | 2.05895 |
| Abbé number vd | 17.81 | 17.69 |

TABLE 1-continued

|  |  |  |
|---|---|---|
| Liquidus temperature [° C.] | 1000 | 1000 |
| Glass transition temperature [° C.] | 553 | 558.5 |
| Specific gravity | 5.19 | 5.12 |
| Viscosity at liquidus temperature [dPa · s] | 1.6 | 1.6 |
| λ5 [nm] | 414 | 416 |
| λ70 [nm] | 530 | 533 |
| Knoop hardness | 406 | 417 |
| Degree of abrasion |  |  |
| Molecular weight (g/mol) | 131.94 | 128.45 |
| Molar volume | 25.41 | 25.11 |

|  | No. | |
|---|---|---|
|  | 3 | 4 |
| Refractive index nd | 2.08022 | 2.11798 |
| Abbé number vd | 17.36 | 16.7 |
| Liquidus temperature [° C.] | 1010 | 1040 |
| Glass transition temperature [° C.] | 566.2 | 551.1 |
| Specific gravity | 5.20 | 5.34 |
| Viscosity at liquidus temperature [dPa · s] | 1.4 | 1.2 |
| λ5 [nm] | 419 | 426 |
| λ70 [nm] | 564 | 586 |
| Knoop hardness | 414 | 405 |
| Degree of abrasion |  |  |
| Molecular weight (g/mol) | 132.18 | 132.04 |
| Molar volume | 25.40 | 24.74 |

|  | No. | |
|---|---|---|
|  | 5 | 6 |
| Refractive index nd | 2.11404 | 2.1161 |
| Abbé number vd | 16.88 | 16.76 |
| Liquidus temperature [° C.] | 1040 | 1040 |
| Glass transition temperature [° C.] | 550.6 | 556.1 |
| Specific gravity | 5.30 | 5.39 |
| Viscosity at liquidus temperature [dPa · s] | 1.2 | 1.2 |
| λ5 [nm] | 422 | 428 |
| λ70 [nm] | 559 | 612 |
| Knoop hardness | 425 | 419 |
| Degree of abrasion |  |  |
| Molecular weight (g/mol) | 132.23 | 134.01 |
| Molar volume | 24.95 | 24.88 |

|  | No. | |
|---|---|---|
|  | 7 | 8 |
| Refractive index nd | 2.12996 | 2.10482 |
| Abbé number vd | 16.83 | 16.6 |
| Liquidus temperature [° C.] | 1040 | 1040 |
| Glass transition temperature [° C.] | 554.7 | 567.3 |
| Specific gravity | 5.51 | 5.29 |
| Viscosity at liquidus temperature [dPa · s] | 1.2 | 1.4 |
| λ5 [nm] | 420 | 426 |
| λ70 [nm] | 613 | 546 |
| Knoop hardness | 404 | 415 |
| Degree of abrasion |  |  |
| Molecular weight (g/mol) | 134.07 | 133.18 |
| Molar volume | 24.33 | 25.17 |

|  | No. | |
|---|---|---|
|  | 9 | 10 |
| Refractive index nd | 2.12476 | 2.12026 |
| Abbé number vd | 16.53 | 17.12 |
| Liquidus temperature [° C.] | 1040 | 1040 |
| Glass transition temperature [° C.] | 552 | 583 |
| Specific gravity | 5.37 | 5.58 |
| Viscosity at liquidus temperature [dPa · s] | 1.2 | 1.4 |
| λ5 [nm] | 431 | 427 |
| λ70 [nm] | 568 | 546 |
| Knoop hardness | 436 | 416 |
| Degree of abrasion | 220 |  |

TABLE 1-continued

|  | 131.57 | 141.68 |
|---|---|---|
| Molecular weight (g/mol) | 131.57 | 141.68 |
| Molar volume | 24.48 | 25.39 |

| | No. | |
|---|---|---|
| | 11 | 12 |
| Refractive index nd | 2.10414 | 2.07469 |
| Abbé number vd | 16.74 | 17.16 |
| Liquidus temperature [° C.] | 1010 | 990 |
| Glass transition temperature [° C.] | 547.6 | 555.4 |
| Specific gravity | 5.36 | 5.15 |
| Viscosity at liquidus temperature [dPa · s] | 1.4 | 1.9 |
| λ5 [nm] | 425 | 414 |
| λ70 [nm] | 543 | 524 |
| Knoop hardness | 408 | 421 |
| Degree of abrasion | | |
| Molecular weight (g/mol) | 129.35 | 125.30 |
| Molar volume | 24.14 | 24.31 |

| | No. | |
|---|---|---|
| | 13 | 14 |
| Refractive index nd | 2.08294 | 2.07779 |
| Abbé number vd | 16.79 | 17.23 |
| Liquidus temperature [° C.] | 1040 | 1030 |
| Glass transition temperature [° C.] | 556.2 | 556 |
| Specific gravity | 5.06 | 5.18 |
| Viscosity at liquidus temperature [dPa · s] | 1.2 | 1.3 |
| λ5 [nm] | 424 | 428 |
| λ70 [nm] | 544 | 565 |
| Knoop hardness | 413 | 409 |
| Degree of abrasion | | |
| Molecular weight (g/mol) | 120.47 | 125.53 |
| Molar volume | 23.80 | 24.26 |

| | No. | |
|---|---|---|
| | 15 | 16 |
| Refractive index nd | 2.0766 | 2.07501 |
| Abbé number vd | 17.3 | 17.36 |
| Liquidus temperature [° C.] | 1030 | 1020 |
| Glass transition temperature [° C.] | 558 | 560 |
| Specific gravity | 5.17 | 5.20 |
| Viscosity at liquidus temperature [dPa · s] | 1.3 | 1.4 |
| λ5 [nm] | 425 | 423 |
| λ70 [nm] | 549 | 553 |
| Knoop hardness | 414 | 414 |
| Degree of abrasion | | |
| Molecular weight (g/mol) | 125.92 | 127.11 |
| Molar volume | 24.34 | 24.44 |

| | No. | |
|---|---|---|
| | 17 | 18 |
| Refractive index nd | 2.07173 | 2.0764 |
| Abbé number vd | 17.55 | 17.59 |
| Liquidus temperature [° C.] | 1000 | 990 |
| Glass transition temperature [° C.] | 561 | 548.6 |
| Specific gravity | 5.26 | 5.12 |
| Viscosity at liquidus temperature [dPa · s] | 1.6 | 2 |
| λ5 [nm] | 422 | 437 |
| λ70 [nm] | 537 | |
| Knoop hardness | 405 | 422 |
| Degree of abrasion | | |
| Molecular weight (g/mol) | 128.35 | 125.49 |
| Molar volume | 24.41 | 24.50 |

| | No. | |
|---|---|---|
| | 19 | 20 |
| Refractive index nd | 2.0764 | 2.05737 |
| Abbé number vd | 17.59 | 17.24 |
| Liquidus temperature [° C.] | 990 | 1000 |
| Glass transition temperature [° C.] | 569.1 | 557.4 |
| Specific gravity | 5.30 | 4.98 |

TABLE 1-continued

|  | | |
|---|---|---|
| Viscosity at liquidus temperature [dPa · s] | 1.6 | 2.6 |
| λ5 [nm] | 423 | 414 |
| λ70 [nm] | 558 | 492 |
| Knoop hardness | 414 | 404 |
| Degree of abrasion | | |
| Molecular weight (g/mol) | 131.41 | 120.86 |
| Molar volume | 24.81 | 24.28 |

| | No. | |
|---|---|---|
| | 21 | 22 |
| Refractive index nd | 2.0613 | 2.0591 |
| Abbé number vd | 17.4 | 17.57 |
| Liquidus temperature [° C.] | 990 | 1030 |
| Glass transition temperature [° C.] | 550.1 | 550.4 |
| Specific gravity | 4.95 | 4.93 |
| Viscosity at liquidus temperature [dPa · s] | 3.4 | 2 |
| λ5 [nm] | 426 | 414 |
| λ70 [nm] | 668 | 544 |
| Knoop hardness | 410 | 392 |
| Degree of abrasion | | |
| Molecular weight (g/mol) | 121.14 | 121.24 |
| Molar volume | 24.45 | 24.58 |

| | No. | |
|---|---|---|
| | 23 | 24 |
| Refractive index nd | 2.07019 | 2.06785 |
| Abbé number vd | 17.34 | 17.43 |
| Liquidus temperature [° C.] | 1010 | 1020 |
| Glass transition temperature [° C.] | 540.2 | 550.8 |
| Specific gravity | 4.99 | 5.01 |
| Viscosity at liquidus temperature [dPa · s] | 2 | 1.8 |
| λ5 [nm] | 416 | 418 |
| λ70 [nm] | 531 | 531 |
| Knoop hardness | 414 | 412 |
| Degree of abrasion | | |
| Molecular weight (g/mol) | 119.39 | 122.08 |
| Molar volume | 23.92 | 24.35 |

| | No. | |
|---|---|---|
| | 25 | 26 |
| Refractive index nd | 2.09018 | 2.10496 |
| Abbé number vd | 17.03 | 16.89 |
| Liquidus temperature [° C.] | 990 | 1000 |
| Glass transition temperature [° C.] | 557.6 | 559.8 |
| Specific gravity | 5.22 | 526 |
| Viscosity at liquidus temperature [dPa · s] | 2.6 | 2.2 |
| λ5 [nm] | 423 | 416 |
| λ70 [nm] | 550 | 500 |
| Knoop hardness | 394 | 391 |
| Degree of abrasion | | |
| Molecular weight (g/mol) | 129.37 | 133.14 |
| Molar volume | 24.80 | 25.31 |

| | No. | |
|---|---|---|
| | 27 | 28 |
| Refractive index nd | 2.12125 | 2.10027 |
| Abbé number vd | 16.63 | 17.01 |
| Liquidus temperature [° C.] | 1030 | 1000 |
| Glass transition temperature [° C.] | 558 | 561 |
| Specific gravity | 5.33 | 5.24 |
| Viscosity at liquidus temperature [dPa · s] | 1.6 | 2.6 |
| λ5 [nm] | 423 | 422 |
| λ70 [nm] | 558 | 568 |
| Knoop hardness | 392 | 413 |
| Degree of abrasion | | 200 |

TABLE 1-continued

|  | | |
|---|---|---|
| Molecular weight (g/mol) | 134.44 | 133.11 |
| Molar volume | 25.22 | 25.39 |

| | No. | |
|---|---|---|
| | 29 | 30 |
| Refractive index nd | 2.10429 | 2.10124 |
| Abbé number vd | 16.97 | 17.17 |
| Liquidus temperature [° C.] | 1040 | 970 |
| Glass transition temperature [° C.] | 565 | 551.4 |
| Specific gravity | 5.25 | 5.36 |
| Viscosity at liquidus temperature [dPa · s] | 1.6 | 3.5 |
| λ5 [nm] | 424 | 418 |
| λ70 [nm] | 563 | |
| Knoop hardness | 397 | 390 |
| Degree of abrasion | | |
| Molecular weight (g/mol) | 132.99 | 136.81 |
| Molar volume | 25.34 | 25.52 |

| | No. | |
|---|---|---|
| | 31 | 32 |
| Refractive index nd | 2.10639 | 2.10791 |
| Abbé number vd | 17.01 | 16.9 |
| Liquidus temperature [° C.] | 970 | 990 |
| Glass transition temperature [° C.] | 562.5 | 562.8 |
| Specific gravity | 5.46 | 5.46 |
| Viscosity at liquidus temperature [dPa · s] | 3.4 | 2.6 |
| λ5 [nm] | 424 | 428 |
| λ70 [nm] | 579 | |
| Knoop hardness | 415 | 414 |
| Degree of abrasion | 210 | |
| Molecular weight (g/mol) | 140.63 | 139.58 |
| Molar volume | 25.75 | 25.59 |

| | No. | |
|---|---|---|
| | 33 | 34 |
| Refractive index nd | 2.12197 | 2.0768 |
| Abbé number vd | 16.74 | 17.36 |
| Liquidus temperature [° C.] | 980 | 1000 |
| Glass transition temperature [° C.] | 551 | 559 |
| Specific gravity | 5.44 | 5.12 |
| Viscosity at liquidus temperature [dPa · s] | 3 | 2.3 |
| λ5 [nm] | 435 | 430 |
| λ70 [nm] | | |
| Knoop hardness | 390 | 397 |
| Degree of abrasion | | |
| Molecular weight (g/mol) | 137.04 | 130.56 |
| Molar volume | 25.18 | 25.50 |

| | No. | |
|---|---|---|
| | 35 | 36 |
| Refractive index nd | 2.13917 | 2.12126 |
| Abbé number vd | 16.37 | 16.58 |
| Liquidus temperature [° C.] | 1040 | 990 |
| Glass transition temperature [° C.] | 552 | 554.6 |
| Specific gravity | 5.41 | 5.56 |
| Viscosity at liquidus temperature [dPa · s] | 1.4 | 2.6 |
| λ5 [nm] | 426 | 427 |
| λ70 [nm] | | 577 |
| Knoop hardness | 408 | 400 |
| Degree of abrasion | | |
| Molecular weight (g/mol) | 135.72 | 144.81 |
| Molar volume | 25.09 | 26.03 |

| | No. | |
|---|---|---|
| | 37 | 38 |
| Refractive index nd | 2.16658 | 2.10204 |
| Abbé number vd | 16.23 | 17.05 |
| Liquidus temperature [° C.] | 1050 | 1010 |
| Glass transition temperature [° C.] | 558.4 | 559 |
| Specific gravity | 5.69 | 5.22 |

TABLE 1-continued

|  | | |
|---|---|---|
| Viscosity at liquidus temperature [dPa · s] | 1.2 | 2 |
| λ5 [nm] | 430 | 421 |
| λ70 [nm] | | |
| Knoop hardness | 400 | 386 |
| Degree of abrasion | | |
| Molecular weight (g/mol) | 142.82 | 130.96 |
| Molar volume | 25.12 | 25.10 |

| | No. | |
|---|---|---|
| | 39 | 40 |
| Refractive index nd | 2.12012 | 2.13211 |
| Abbé number vd | 16.5 | 16.17 |
| Liquidus temperature [° C.] | 1040 | 1020 |
| Glass transition temperature [° C.] | 563 | 550 |
| Specific gravity | 5.21 | 5.68 |
| Viscosity at liquidus temperature [dPa · s] | 1.4 | 1.8 |
| λ5 [nm] | 421 | 455 |
| λ70 [nm] | | |
| Knoop hardness | 409 | 390 |
| Degree of abrasion | | |
| Molecular weight (g/mol) | 135.57 | 151.04 |
| Molar volume | 26.01 | 26.59 |

| | No. | |
|---|---|---|
| | 41 | 42 |
| Refractive index nd | 2.08103 | 2.12016 |
| Abbé number vd | 17.74 | 16.62 |
| Liquidus temperature [° C.] | 980 | 990 |
| Glass transition temperature [° C.] | 552 | 559 |
| Specific gravity | 5.70 | 5.66 |
| Viscosity at liquidus temperature [dPa · s] | 2.8 | 2.6 |
| λ5 [nm] | 427 | 439 |
| λ70 [nm] | 615 | |
| Knoop hardness | 375 | |
| Degree of abrasion | 250 | |
| Molecular weight (g/mol) | 150.30 | 148.16 |
| Molar volume | 26.37 | 26.20 |

| | No. | |
|---|---|---|
| | 43 | 44 |
| Refractive index nd | 2.11198 | 2.09439 |
| Abbé number vd | 17.21 | 17.3 |
| Liquidus temperature [° C.] | 1040 | 980 |
| Glass transition temperature [° C.] | 543.8 | 556 |
| Specific gravity | 5.48 | 5.63 |
| Viscosity at liquidus temperature [dPa · s] | 1.2 | 2.8 |
| λ5 [nm] | 421 | 431 |
| λ70 [nm] | 541 | 648 |
| Knoop hardness | 416 | 381 |
| Degree of abrasion | | |
| Molecular weight (g/mol) | 130.96 | 143.97 |
| Molar volume | 23.89 | 25.59 |

| | No. | |
|---|---|---|
| | 45 | 46 |
| Refractive index nd | 2.09041 | 2.10958 |
| Abbé number vd | 17.24 | 16.93 |
| Liquidus temperature [° C.] | 970 | 970 |
| Glass transition temperature [° C.] | 574 | 572 |
| Specific gravity | 5.41 | 5.51 |
| Viscosity at liquidus temperature [dPa · s] | 3.2 | 3.4 |
| λ5 [nm] | 415 | 419 |
| λ70 [nm] | 469 | 482 |
| Knoop hardness | 411 | 405 |
| Degree of abrasion | | 210 |

TABLE 1-continued

|  | | |
|---|---|---|
| Molecular weight (g/mol) | 140.48 | 142.77 |
| Molar volume | 25.97 | 25.91 |

| | No. | |
|---|---|---|
| | 47 | 48 |
| Refractive index nd | 2.10795 | 2.10523 |
| Abbé number vd | 17.07 | 17.04 |
| Liquidus temperature [° C.] | 980 | 975 |
| Glass transition temperature [° C.] | 565 | 576 |
| Specific gravity | 5.54 | 5.42 |
| Viscosity at liquidus temperature [dPa · s] | 2.4 | 3.2 |
| λ5 [nm] | 423 | 423 |
| λ70 [nm] | 532 | 534 |
| Knoop hardness | 428 | 425 |
| Degree of abrasion | | |
| Molecular weight (g/mol) | 141.38 | 140.25 |
| Molar volume | 25.52 | 25.88 |

| | No. | |
|---|---|---|
| | 49 | 50 |
| Refractive index nd | 2.1031 | 2.10795 |
| Abbé number vd | 17.05 | 17.07 |
| Liquidus temperature [° C.] | 980 | 1000 |
| Glass transition temperature [° C.] | 579 | 567 |
| Specific gravity | 5.43 | 5.55 |
| Viscosity at liquidus temperature [dPa · s] | 3.0 | 2.6 |
| λ5 [nm] | 425 | 416 |
| λ70 [nm] | 612 | 644 |
| Knoop hardness | 415 | 384 |
| Degree of abrasion | | 230 |
| Molecular weight (g/mol) | 141.49 | 145.53 |
| Molar volume | 26.06 | 26.22 |

| | No. | |
|---|---|---|
| | 51 | Comparative example 1 |
| Refractive index nd | 2.10523 | 2.017 |
| Abbé number vd | 17.04 | 19.3 |
| Liquidus temperature [° C.] | 975 | |
| Glass transition temperature [° C.] | 581 | 536 |
| Specific gravity | 5.30 | 5.38 |
| Viscosity at liquidus temperature [dPa · s] | 3.0 | |
| λ5 [nm] | 416 | 409 |
| λ70 [nm] | 499 | 505 |
| Knoop hardness | 413 | 346 |
| Degree of abrasion | | |
| Molecular weight (g/mol) | 138.82 | 130.29 |
| Molar volume | 26.19 | 24.22 |

(Note 1) The contents, total content, and content ratios given as mole % and mass % are based on oxides.
(Note 2) $Sb_2O_3$ is given as just the quantity added based on the total amount of the glass components denoted as a mass %.

Comparative Example 1

When the glass having the composition of Embodiment 3 of Patent Reference 2 was reproduced and the Knoop hardness thereof was measured, the Knoop hardness was 346. The refractive index nd was measured at 2.017 and the Abbé number vd was measured at 19.3.

Embodiment 2

Glass starting materials that had been weighed out so as to obtain optical glass Nos. 1 to 51 in the same manner as in Embodiment 1 were heated, melted, clarified, and homogenized. The molten glasses obtained were caused to flow into casting molds, rapidly cooled, and molded into glass blocks. After annealing the glass blocks, they were cut and ground to prepare glass materials for press molding.

Embodiment 3

The glass materials for press molding prepared in Embodiment 2 were heated and softened. Press molding was conducted by a known method using a pressing mold to prepare optical element blanks such as lens blanks and prism blanks.

The optical element blanks obtained were precision annealed and the refractive indexes thereof were precision adjusted to obtain the desired refractive indexes. Known grinding and polishing methods were then used to finish lenses and prisms. It was possible to employ abrasive grains such as cerium oxide and zirconium oxide in polishing. When the optically functional surfaces of the lenses and prisms obtained were examined, no scratching was found. This made it possible to provide high-quality optical elements with high productivity.

Embodiment 4

Next, the surfaces of the glass materials for press molding prepared in Embodiment 2 were polished to obtain press molding glass materials (preforms) for precision press molding. Examination of the preform surfaces revealed no scratching. These preforms were heated and precision press molded to obtain aspherical lenses. The precision press molding was conducted by a known method. The aspherical lenses obtained by precision press molding were gripped from both sides, and centering and edging were conducted by the usual methods to prepare centered and edged lenses. Examination of the optically functional surfaces of the lenses obtained revealed no scratching, nor was scratching found at the spots where holding had been conducted during centering and edging. That made it possible to provide high-quality optical elements with high productivity.

Embodiment 5

Glass starting materials were heated, melted, clarified, and homogenized in such a manner as to yield optical glass Nos. 1 to 51 in the same manner as in Embodiment 1. The molten glass obtained was caused to flow into a casting mold and rapidly cooled, and glass blocks were molded. The glass blocks were annealed, cut, ground, and polished to prepare optical elements such as spherical lenses and prisms. The polishing was conducted using abrasive grains such as cerium oxide and zirconium oxide.

Inspection of the optically functional surfaces of the various optical elements revealed no scratching.

The lenses obtained were employed to construct an image pickup optical system, and an image pickup device with good color reproducibility was obtained.

When image pickup units and optical pickup units mounted on portable telephones were prepared using the lenses obtained, units with extremely small focal position displacement for vibration were achieved.

The optical element of the present embodiment permitted good chromatic aberration correction when combined with optical elements made of low diffusion glass. It was also effective for increasing the functionality and compactness of various optical apparatus, including image pickup devices.

Comparative Example 2

When glass reproducing the composition recorded in Patent Reference 2 that was obtained in Comparative Example 1 was ground and polished to obtain a lens shape, scratching was observed on surfaces corresponding to optically functional surfaces, precluding use as a lens. Based on these results, the preform surface scratched even when a preform was fabricated by grinding and polishing the glass of Comparative Example 1. Were such a preform to be used in precision press molding, scratches imparted during manufacturing of the preform would clearly remain on the surface of the precision press molded article.

What is claimed is:

1. An optical glass in the form of an oxide glass, denoted as cation percentages:

| | |
|---|---|
| $P^{5+}$ | 14 to 36%; |
| $Bi^{3+}$ | 12 to 34%; |
| $Nb^{5+}$ | 12 to 34%; |
| $Ti^{4+}$ | 5 to 20%; |
| $Zn^{2+}$ | 0 to 2%, and |
| $W^{6+}$ | 0 to 22%; | wherein the total content of $Bi^{3+}$, $Nb^{5+}$, $Ti^{4+}$, and $W^{6+}$ is equal to or greater than 50%; and in that the Knoop hardness is equal to or higher than 370, the refractive index nd is equal to or higher than 2.02, and the Abbé number vd is equal to or lower than 19.0.

2. The optical glass according to claim 1, wherein the total content of $K^+$ and $Ba^{2+}$ is equal to or lower than 16%.

3. The optical glass according to claim 1, wherein the total content of $K^+$, $Ba^2$, and $B^{3+}$ is equal to or lower than 22%.

4. The optical glass according to claim 1, wherein the cation ratio $(Bi^{3+}/(Bi^{3+}+Nb^{5+}+Ti^{4+}+W^{6+}))$ of the content of $Bi^{3+}$ to the total content of $Bi^{3+}$, $Nb^{5+}$, $Ti^{4+}$, and $W^{6+}$ $(Bi^{3+}+Nb^{5+}+Ti^{4+}+W^{6+})$ is equal to or lower than 0.6.

5. A glass material for press molding comprised of an optical glass comprising, denoted as cation percentages:

| | |
|---|---|
| $P^{5+}$ | 14 to 36%; |
| $Bi^{3+}$ | 12 to 34%; |
| $Nb^{5+}$ | 12 to 34%; |
| $Ti^{4+}$ | 5 to 20%; |
| $Zn^{2+}$ | 0 to 2%; and |
| $W^{6+}$ | 0 to 22%; | wherein the total content of $Bi^{3+}$, $Nb^{5+}$, $Ti^{4+}$, and $W^{6+}$ is equal to or greater than 50%; and wherein the Knoop hardness is equal to or higher than 370, the refractive index nd is equal to or higher than 2.02, and the Abbé number vd is equal to or lower than 19.0.

6. An optical element comprised of an optical glass comprising, denoted as cation percentages:

| | |
|---|---|
| $P^{5+}$ | 14 to 36%; |
| $Bi^{3+}$ | 12 to 34%; |
| $Nb^{5+}$ | 12 to 34%; |
| $Ti^{4+}$ | 5 to 20%; |
| $Zn^{2+}$ | 0 to 2%; and |
| $W^{6+}$ | 0 to 22%; | wherein the total content of $Bi^{3+}$, $Nb^{5+}$, $Ti^{4+}$, and $W^{6+}$ is equal to or greater than 50%; and wherein the Knoop hardness is equal to or higher than 370, the refractive index nd is equal to or higher than 2.02, and the Abbé number vd is equal to or lower than 19.0.

7. A method for manufacturing a glass material for press molding comprising a step of mechanically processing an optical glass comprising, denoted as cation percentages:

| | |
|---|---|
| $P^{5+}$ | 14 to 36%; |
| $Bi^{3+}$ | 12 to 34%; |
| $Nb^{5+}$ | 12 to 34%; |
| $Ti^{4+}$ | 5 to 20%; |
| $Zn^{2+}$ | 0 to 2%; and |
| $W^{6+}$ | 0 to 22%; | wherein the total content of $Bi^{3+}$, $Nb^{5+}$, $Ti^{4+}$, and $W^{6+}$ is equal to or greater than 50%; and wherein the Knoop hardness is equal to or higher than 370, the refractive index nd is equal to or higher than 2.02, and the Abbe number vd is equal to or lower than 19.0.

8. A method for manufacturing an optical element comprising a step of press molding a glass material for press molding comprised of an optical glass comprising, denoted as cation percentages:

| | |
|---|---|
| $P^{5+}$ | 14 to 36%; |
| $Bi^{3+}$ | 12 to 34%; |
| $Nb^{5+}$ | 12 to 34%; |
| $Ti^{4+}$ | 5 to 20%; and |
| $W^{6+}$ | 0 to 22%; | wherein the total content of $Bi^{3+}$, $Nb^{5+}$, $Ti^{4+}$, and $W^{6+}$ is equal to or greater than 50%; and wherein the Knoop hardness is equal to or higher than 370, the refractive index nd is equal to or higher than 2.02, and the Abbé number vd is equal to or lower than 19.0.

9. A method for manufacturing an optical element comprising a step of mechanical processing an optical glass comprising, denoted as cation percentages:

| | |
|---|---|
| $P^{5+}$ | 14 to 36%; |
| $Bi^{3+}$ | 12 to 34%; |
| $Nb^{5+}$ | 12 to 34%; |
| $Ti^{4+}$ | 5 to 20%; and |
| $W^{6+}$ | 0 to 22%; | wherein the total content of $Bi^{3+}$, $Nb^{5+}$, $Ti^{4+}$, and $W^{6+}$ is equal to or greater than 50%; and wherein the Knoop hardness is equal to or higher than 370, the refractive index nd is equal to or higher than 2.02, and the Abbe number vd is equal to or lower than 19.0.

10. The optical glass according to claim 2, wherein the total content of $K^+$, $Ba^2$, and $B^{3+}$ is equal to or lower than 22%.

* * * * *